United States Patent
Hamada et al.

(10) Patent No.: US 6,247,727 B1
(45) Date of Patent: *Jun. 19, 2001

(54) AIR BAG APPARATUS FOR PASSENGER SEAT

(75) Inventors: Makoto Hamada, Toyota; Osamu Fukawatase, Nishikamo-gun; Koushi Kumagai, Seto, all of (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 13 days.

(21) Appl. No.: 09/154,223

(22) Filed: Sep. 16, 1998

(30) Foreign Application Priority Data

Dec. 9, 1997 (JP) .................................... 9-338846

(51) Int. Cl.[7] .................................... B60R 21/24
(52) U.S. Cl. .................................... 280/743.2; 280/743.1
(58) Field of Search ................. 280/735, 743.2, 280/743.1, 732, 734, 729

(56) References Cited

U.S. PATENT DOCUMENTS

| 5,246,250 | 9/1993 | Wolanin et al. ............. 280/739 |
| 5,282,646 | * 2/1994 | Melvin et al. ............. 280/729 |
| 5,308,113 | 5/1994 | Moriset ............. 280/743 |
| 5,382,048 | 1/1995 | Paxton et al. . |
| 5,494,314 | 2/1996 | Kriska et al. . |
| 5,913,535 | * 6/1999 | Taguchi et al. ............. 280/729 |
| 5,951,038 | * 9/1999 | Taguchi et al. ............. 280/729 |

FOREIGN PATENT DOCUMENTS

| 4142326 | 6/1993 | (DE) . |
| 4235761 | 4/1994 | (DE) . |
| 9-48307 | 2/1997 | (JP) . |
| 9-207699 | 8/1997 | (JP) . |

* cited by examiner

*Primary Examiner*—Brian L. Johnson
*Assistant Examiner*—Tony Winner
(74) *Attorney, Agent, or Firm*—Pillsbury Winthrop LLP

(57) ABSTRACT

An air bag apparatus for a passenger seat has reduced deploying speed and reduces the impact of the air bag on an occupant moving forward at the time of a crash of a vehicle. A gas generator is disposed in a case of the air bag apparatus, extending in a fore-to-aft direction relative to the vehicle. The gas generator case contains a cylindrical inflator extending in the fore-to-aft direction. An air bag is disposed in the apparatus case, folded in a predetermined manner. An inner bag for controlling gas flow is disposed in the air bag, folded in a predetermined manner. An auxiliary inner bag is sewed to an outside surface of a bag of the inner bag. When the inner bag is inflated and deployed, the bag of the inner bag presses a portion of the air bag against the windshield, and the auxiliary inner bag presses another portion of the air bag against the instrument panel.

22 Claims, 49 Drawing Sheets

AIR BAG APPARATUS FOR PASSENGER SEAT

INCORPORATION BY REFERENCE

The disclosure of Japanese Patent Application No. HEI 9-338846 filed on Dec. 9, 1997 including the specification, drawings and abstract is incorporated herein by reference in its entirety.

BACKGROUND OF THE INVENTION

1. Field of the Invention

The present invention relates to an air bag apparatus for a passenger seat for protecting an occupant in the passenger seat in a vehicle such as a motor vehicle and the like.

2. Description of the Related Art

A known air bag apparatus for a passenger seat is described in, for example, Japanese Patent Application Laid-Open No. Hei 7-215151.

In conjunction with the air bag apparatus for a passenger seat, the laid-open patent application proposes an air bag folding manner such that the air bag will be deployed toward an occupant's torso during an early period of deployment. Furthermore, in this air bag apparatus for a passenger seat, the resistance or drag that occurs when the air bag is unfolded from the folded state is utilized to reduce the deploying speed of the air bag.

However, in a typical air bag apparatus for a passenger seat, the air bag needs to be tightly folded in order to minimize the size of the entire apparatus. Therefore, there is a danger that at the time of an impact on the vehicle, the air bag may not completely unfold but may remain partially folded or packed when an occupant moves forward by inertia and contacts the air bag. Also, in a typical air bag arrangement, gas is directly jetted into the air bag from the inflator, so that it is difficult to control the direction of gas flow in the air bag. Therefore, it is difficult to control the direction of deployment of the air bag.

SUMMARY OF THE INVENTION

Accordingly, it is an object of the present invention to provide a passenger seat air bag arrangement having a reduced deploying speed.

According to a first aspect of the invention, there is provided an air bag apparatus for a passenger seat disposed in a passenger seat-side instrument panel. The air bag apparatus includes an air bag folded and disposed in a case having at one side thereof an opening, and an inner bag disposed in the air bag so that the inner bag is inflated prior to inflation of the air bag. The inner bag is designed to press a portion of the air bag against at least one of a front glass pane and an instrument panel when inflated.

With this construction, the air bag is inflated and deployed, dragging between the inner bag and the front glass pane and/or between the inner bag and the instrument panel. Sliding friction that occurs at the dragging portions reduces the deploying speed of the air bag with respect to conventional air bag arrangements. Therefore, even if an occupant comes into contact with the air bag before the deployment is completed (during the deployment), the air bag will not strongly contact the occupant.

One alternative construction features providing a supply hole in the inner bag for supplying gas to the air bag.

This construction makes it possible to adjust the deploying speed of the air bag by suitably selecting the size and number of supplying holes formed in the inner bag.

According to an alternative construction, the inner bag may be designed to press a portion of the air bag against each of the front glass pane and the instrument panel. The air bag is inflated and deployed, dragging between the inner bag and the front glass pane and between the inner bag and the instrument panel. Sliding friction that occurs on the dragging portions further reduces the deploying speed of the air bag. According to another alternative construction, the inner bag may have an upper inflating portion and a lower inflating portion. The upper inflating portion is formed so as to inflate to a greater size than the lower inflating portion.

This optional construction ensures that a large area of the inner bag presses against the front glass pane even if the front glass pane is far apart from the instrument panel. Therefore, the deploying speed of the upper portion of the air bag can be effectively reduced.

According to an alternative construction, a restriction member may be disposed in the inner bag. The restriction member restricts inflation of a central portion of the inner bag to a predetermined amount and defines, at least partially, two inflating portions in the inner bag.

This construction enhances the pressing of the inner bag against the front glass pane and the instrument panel, thereby more reliably reducing the deploying speed of the air bag.

The inner bag may be formed by sewing an upper face to a lower face cloth. The upper face cloth is inflated and deployed in an upward direction relative to the vehicle. The lower face cloth is inflated and deployed in a downward direction relative the vehicle.

This construction ensures that the upper face cloth will press a portion of the air bag against the front glass pane and the lower face cloth will press another portion of the air bag against the instrument panel. Therefore, the deploying speed of the air bag can be reliably reduced.

The restriction member may extend from an end of at least one of the upper face cloth and the lower face cloth. This construction facilitates production of the inner bag.

The restriction member may be disposed in the inner bag at a lower position therein so that an upward deploying portion of the inner bag is inflated and deployed to a greater size than a downward deploying portion of the inner bag.

This construction ensures that the upper face cloth will press a portion of the air bag against the front glass pane, thereby reliably reducing the deploying speed of the air bag.

The inner bag may be formed by two base cloths so that when the inner bag is inflated and deployed, the base cloths face each other in transverse directions relative to the vehicle and the inner bag is inflated and deployed in upward and downward directions relative to the vehicle.

This construction makes it possible to sufficiently inflate and deploy the inner bag in the upward and downward directions relative to the vehicle and therefore reduce the deploying speed of the air bag, without requiring a restriction member or the like that is disposed in the inner bag for restricting the amount of inflation of a central portion of the inner bag. Therefore, the structure of the inner bag can be simplified.

The inner bag may assume a generally gourd shape in a side view when it is inflated. With this construction, when the inner bag is inflated and deployed, the tensions on the bag portions of the inner bag repel each other at a constricted portion therebetween and therefore resist collapse in vertical directions. Therefore, the inner bag continues pressing portions of the air bag against the front glass pane and the instrument panel until the inflating deployment of the bag 32 is completed. Consequently, the deploying speed of the air bag will be more effectively reduced.

The inner bag may contact the front glass pane and the instrument panel so as to curve into a generally crescent shape in a side view when it is inflated. When the inner bag contacts the front glass pane and the instrument panel, gas pressure inside the inner bag urges the inner bag to inflate into a designed deployment shape, so that the force of the inner bag pressing against the front glass pane and the instrument panel is increased. Since the sliding friction caused on portions of the air bag that drag between the inner bag and the front glass pane and between the inner bag and the instrument panel is also increased, the deploying speed of the air bag will be more effectively reduced.

The inner bag may have an extension portion that extends in a rearward direction relative to the vehicle. The extension portion presses a portion of the air bag against the instrument panel. The extension portion actively presses a portion of the air bag against the instrument panel, so that a portion of the air bag will be reliably sandwiched between the extension portion and the instrument panel. Therefore, the deploying speed of the air bag will be reliably reduced.

The inner bag may have a forward ejection hole for ejecting gas in a forward direction relative to the vehicle.

With this construction, when the inner bag is inflated, the air bag is deployed also in the forward direction by gas supplied through the forward ejection hole. Therefore, a forward portion of the air bag is additionally pressed against the front glass pane and the instrument panel by gas supplied thereinto. Consequently, the sliding resistance occurring when the air bag is deployed is further increased, thereby further reducing the deploying speed of the air bag.

During assembly of the air bag apparatus, before it is put into its case, the air bag may be folded by folding portions of the air bag that face in forward and rearward directions relative to the vehicle and then folding portions of the air bag that face in transverse directions relative to the vehicle.

This construction enables smooth inflation and deployment of the air bag in the transverse directions relative to the vehicle. Furthermore, since the portions of the air bag that face in forward and rearward directions relative to the vehicle are folded before the portions of the air bag that face in transverse directions relative to the vehicle are folded, the air bag is deployed in the transverse directions prior to the deployment in the fore-to-aft directions. Therefore, the deploying speed of the air bag toward the occupant side is further reduced.

The inner bag may be folded by folding opposite end portions thereof that face in the transverse directions relative to the vehicle while avoiding folding a central portion of the air bag relative to the case, in the transverse directions.

During an early period of deployment of the air bag, the entire folded portions facing in the fore-to-aft directions are quickly protruded from the upper surface of the instrument panel as the inner bag is inflated and deployed. Therefore, the air bag is inflated and deployed more smoothly in the transverse directions, so that the deploying speed of the air bag toward the occupant side will be reliably reduced.

An inflator having a cylindrical shape may be disposed so that an axis thereof extends substantially in a fore-to-aft direction relative to the vehicle.

During an early period of deployment of the air bag, the entire folded portions of the air bag facing in the fore-to-aft directions are reliably protruded from the upper surface of the instrument panel as the inner bag is inflated and deployed. Therefore, the deploying speed of the air bag toward the occupant side will be more reliably reduced.

A portion of the air bag may be disposed between an inner wall face of the case and right and left sides of the inflator. This construction enables compact packaging of the air bag in the case.

The air bag apparatus for a passenger seat may be constructed to include a fixing portion at which the air bag is fixed to the case and a mouth portion that guides gas into the air bag. The mouth portion is disposed in a central portion of the case. An upward deploying portion of the air bag and a downward deploying portion of the air bag are folded and disposed in a space between the mouth portion and one of opposite inner surfaces of the case that face the mouth portion and a space between the mouth portion and the other one of the opposite inner surfaces of the case, respectively.

This construction enables compact packaging of the air bag in the case while improving the deploying performance of the air bag.

An air bag cover may be disposed at the opening of the case. The air bag cover can be opened in transverse directions relative to the vehicle in a manner of a double-hinged door.

With this construction, the air bag cover will not interfere with the inflating deployment of the inner bag and the air bag toward the occupant side. Furthermore, this construction reliably prevents the cover from contacting an occupant when the cover breaks open.

The air bag apparatus can be constructed to include an outlet hole for exhausting gas, and the inner bag has a supply hole for supplying gas to the air bag. The air bag and the inner bag are disposed in the case in such a manner that the outlet hole of the air bag and the supply hole of the inner bag correspond to each other, and so that, during inflation of the inner bag and the air bag, the supply hole and the outlet hole become separate from each other.

With this construction, during an early period of the deployment of the inner bag, gas introduced into the inner bag flows out through the supply hole of the inner bag and through the outlet hole of the air bag, so that the gas pressure inside the inner bag decreases and, therefore, the deploying speed of the inner bag also decreases. Therefore, if an occupant contacts the air bag and presses the inner bag during the deployment of the inner bag, the inflation of the air bag afterwards is weakened, thereby substantially preventing strong contact of the air bag with the occupant.

According to the first aspect of the invention, the outlet hole of the air bag and the supply hole of the inner bag may be sewed together at peripheral portions thereof so as to correspond to each other, using a thread that breaks when the air bag and the inner bag are inflated.

With this construction, during an early period of the deployment of the inner bag, gas flows out of the inner bag through the supply hole of the inner bag and through the outlet hole of the air bag without fail, so that the gas pressure inside the inner bag reliably decreases and, therefore, the deploying speed of the inner bag reliably decreases. Therefore, even if an occupant contacts the air bag and thus presses the inner bag during an early period of the deployment of the inner bag, strong contact of the inner bag with the occupant will be substantially prevented.

A site in the inner bag and a site in the air bag that come closest to an occupant side at the time of completion of inflation and deployment of the inner bag and the air bag may be interconnected so that the sites remain interconnected during an early period of the inflation of the inner bag and the air bag, and so that the sites are disconnected from each other as the inner bag and the air bag are further inflated.

The interconnection between the aforementioned sites reduces the deploying speed of the air bag toward the occupant side. Therefore, even if at the time of a vehicle crash, an occupant moves forward and comes into contact with the air bag before it is completely deployed, strong contact of the air bag with the occupant will be prevented.

A second aspect of the invention provides an air bag apparatus for a passenger seat disposed in a passenger seat-side instrument panel. The air bag apparatus includes an air bag having an outlet hole for exhausting gas. The air bag is folded and disposed in a case having at one side thereof an opening. The inner bag has a supply hole for supplying gas to the air bag. The inner bag is disposed in the air bag so that the inner bag is inflated prior to inflation of the air bag. The air bag and the inner bag are disposed in the case in such a manner that the outlet hole of the air bag and the supply hole of the inner bag correspond to each other. During inflation of the inner bag and the air bag, the supply hole and the outlet hole become separate from each other.

Early during deployment of the inner bag, gas introduced into the inner bag flows out through the supply hole of the inner bag and through the outlet hole of the air bag, so that the gas pressure inside the inner bag decreases and, therefore, the deploying speed of the inner bag also decreases. Therefore, if an occupant contacts the air bag and presses the inner bag during the deployment of the inner bag, the inflation of the air bag afterwards is weakened, thereby substantially preventing strong contact of the air bag with the occupant.

In this second aspect of the invention, the outlet hole of the air bag and the supply hole of the inner bag may be sewed together at peripheral portions thereof so as to correspond to each other, using a thread that breaks when the air bag and the inner bag are inflated.

With this construction, during an early period of deployment of the inner bag, gas flows out of the inner bag through the supply hole of the inner bag and through the outlet hole of the air bag without fail, so that the gas pressure inside the inner bag reliably decreases and, therefore, the deploying speed of the inner bag reliably decreases. Therefore, even if an occupant contacts the air bag and thus presses the inner bag during an early period of the deployment of the inner bag, strong contact of the inner bag with the occupant will be substantially prevented.

The inner bag may be provided with a duct extending therefrom corresponding to the supply hole. In this case, the inner bag and the air bag are folded and disposed in the case in such a manner that the duct protrudes out from the outlet hole of the air bag.

With this construction, there is no need to sew a peripheral portion of the supply hole of the inner bag to a peripheral portion of the outlet hole of the air bag. Therefore, the production efficiency of the air bag apparatus for a passenger seat can be improved.

As a construction alternative, a site in the inner bag and a site in the air bag that come closest to an occupant side at the time of completion of inflation and deployment of the inner bag and the air bag may be interconnected so that the sites remain interconnected during an early period of the inflation of the inner bag and the air bag, and so that the sites are disconnected from each other as the inner bag and the air bag are further inflated.

The interconnection between the aforementioned sites reduces the deploying speed of the air bag toward the occupant side. Therefore, even if at the time of a vehicle crash, an occupant moves forward and comes into contact with the air bag before it is completely deployed, strong contact of the air bag with the occupant will be prevented.

According to a third aspect of the invention, there is provided an air bag apparatus for a passenger seat disposed in a passenger seat-side instrument panel. The air bag apparatus includes an air bag folded and disposed in a case having at one side thereof an opening, and an inner bag disposed in the air bag so that the inner bag is inflated prior to inflation of the air bag. A site in the inner bag and a site in the air bag that come closest to an occupant side at the time of completion of inflation and deployment of the inner bag and the air bag are interconnected so that the sites remain interconnected during an early period of the inflation of the inner bag and the air bag, and so that the sites are disconnected from each other as the inner bag and the air bag are further inflated.

The interconnection between the aforementioned sites reduces the deploying speed of the air bag toward the occupant side. Therefore, even if at the time of a vehicle crash, an occupant moves forward and comes into contact with the air bag before it is completely deployed, strong contact of the air bag with the occupant will be prevented.

The inner bag has a supply hole for supplying gas to the air bag. This construction makes it possible to adjust the deploying speed of the air bag by suitably selecting the size and number of supplying holes.

A site in the inner bag and a site in the air bag that come closest to an occupant side at the time of completion of inflation and deployment of the inner bag and the air bag may be interconnected by a restriction member that is folded and sewed with a breakable thread so that the folded sections of the restriction member are joined together.

With this construction, during an early period of the deployment of the air bag, the deploying direction of the air bag is restricted by the restriction member after the breakable thread joining the folded sections thereof breaks.

The interconnected sites in the inner bag and the air bag may be directly sewed together using a thread that breaks when the inner bag and the air bag are inflated.

This construction reduces the deploying speed of the air bag without requiring a complicated arrangement. Furthermore, during an early period of the deployment of the air bag, since the deploying direction of the air bag is restricted by the site connected to the inner bag, the air bag is stably inflated and deployed.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF THE PREFERRED EMBODIMENTS

Preferred embodiments of the present invention will be described in detail hereinafter with reference to the accompanying drawings.

First Embodiment

A first embodiment of the invention will be described with reference to FIGS. 1 through 10.

Figure 1:
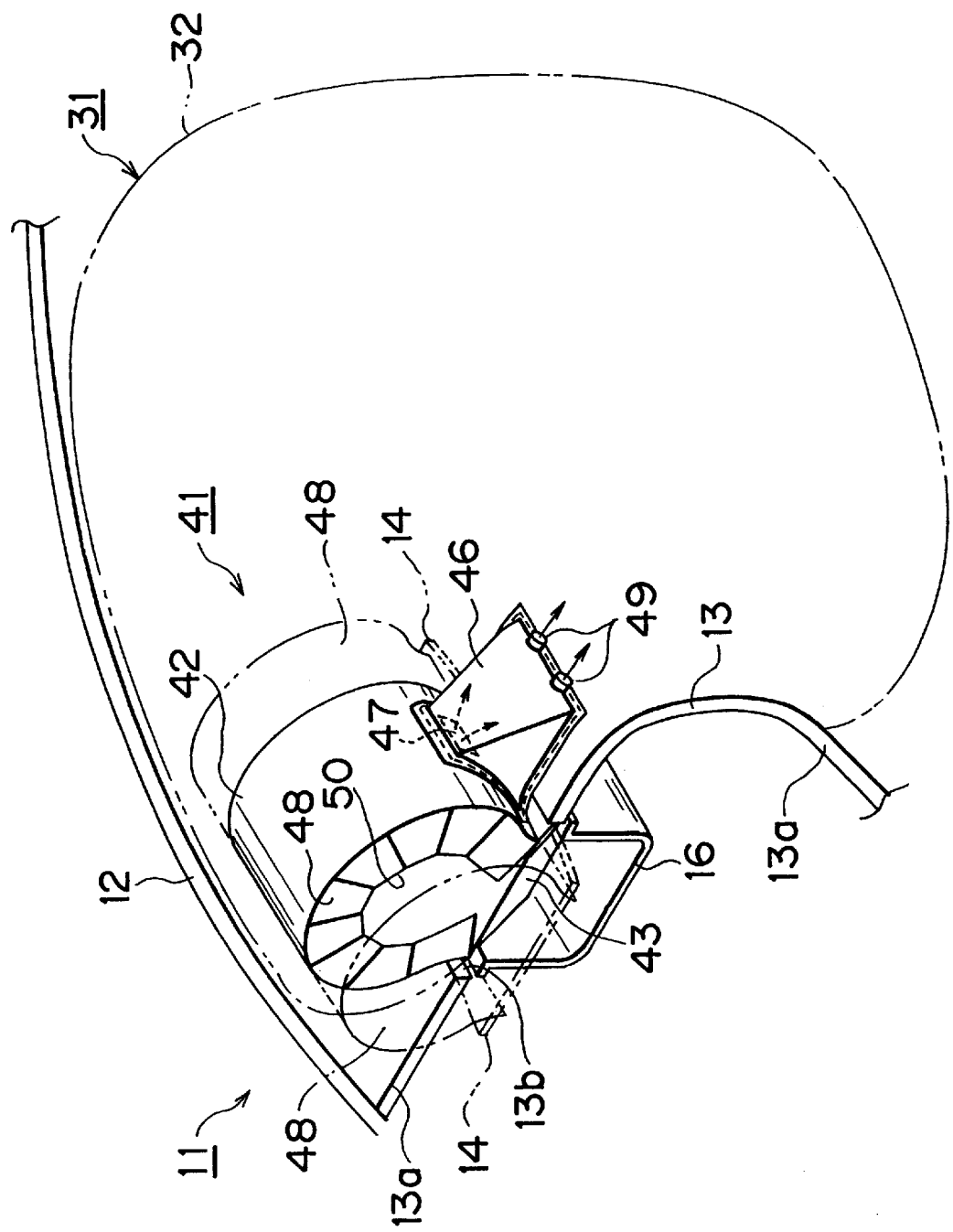
FIG. 1 is a perspective view of an air bag apparatus for a passenger seat according to a first embodiment of the invention.
Figure 2:
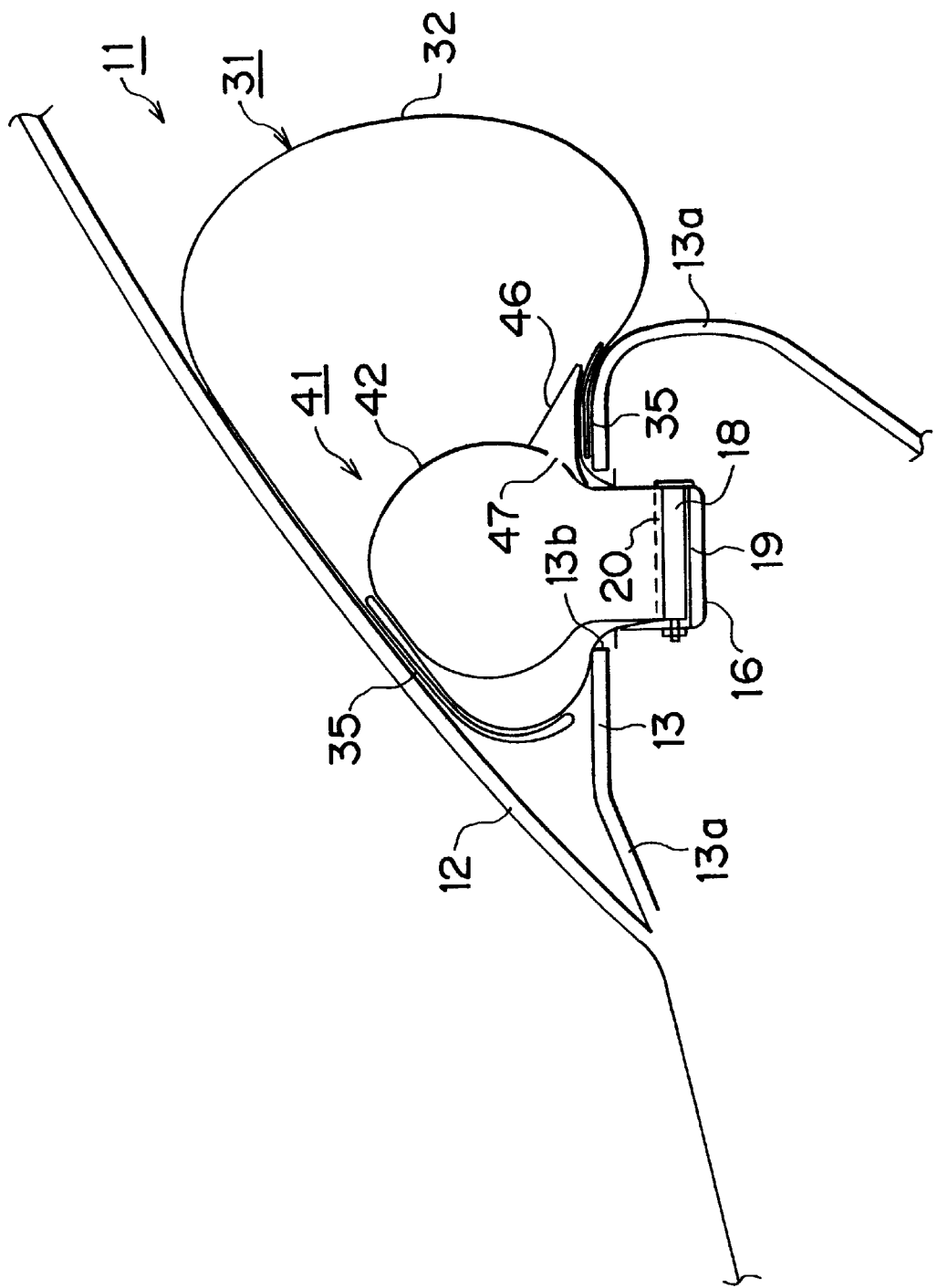
FIG. 2 is a schematic longitudinal sectional view of the apparatus illustrated in FIG. 1, taken along a plane extending in a fore-to-aft direction relative to the vehicle, wherein the air bag is deployed.

Referring to FIGS. 1 and 2, an air bag apparatus for a passenger seat (hereinafter, referred to as "passenger seat-side air bag apparatus") 11 is disposed in an upper portion of a passenger seat-side portion of an instrument panel 13 that faces a front windshield 12 of a vehicle such as a motor vehicle and the like. The instrument panel 13 has an outer shell 13a and an opening 13b.

Figure 3:
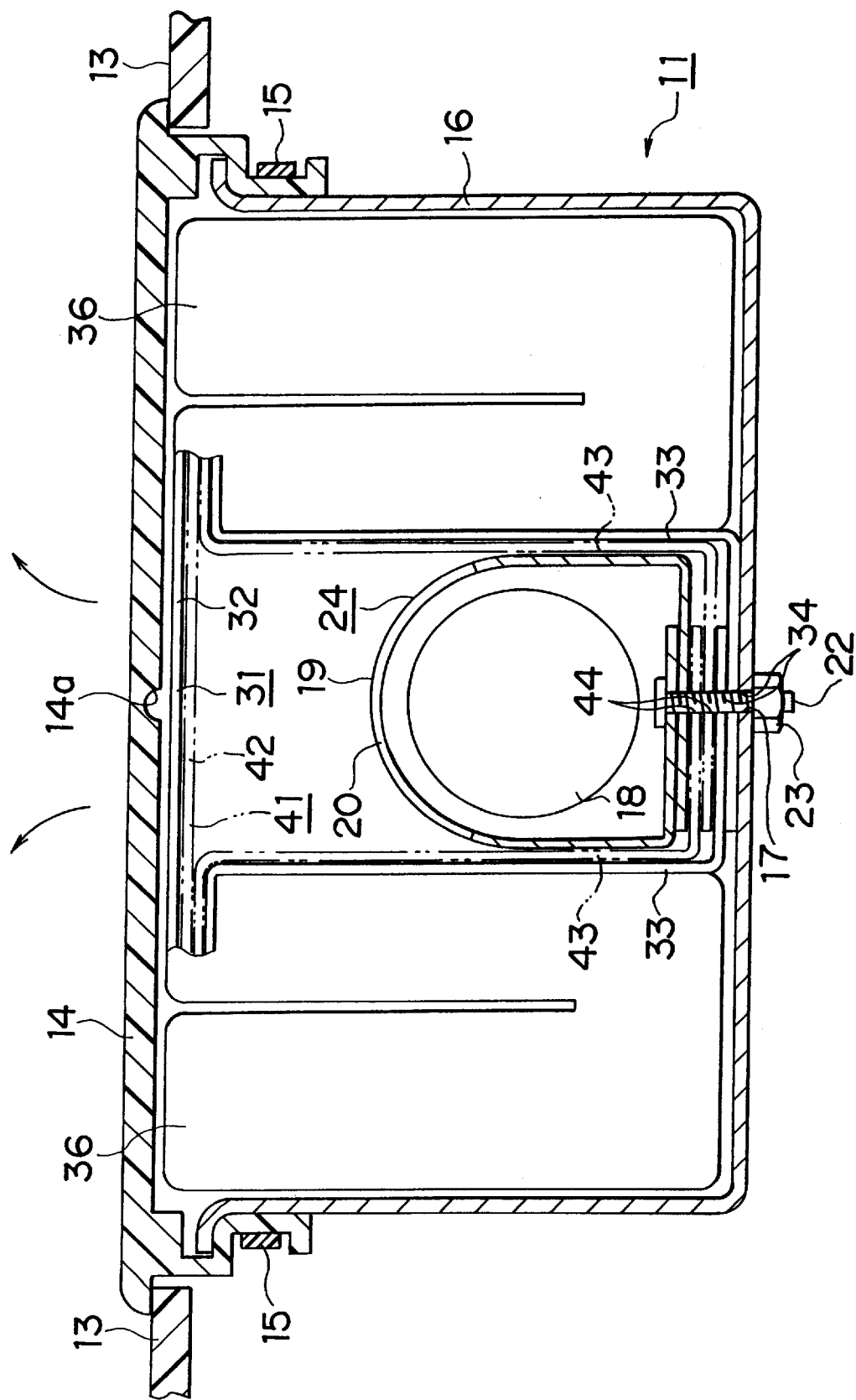
FIG. 3 is an enlarged transverse sectional view of the apparatus illustrated in FIG. 1, taken along a right-to-left extending plane, wherein the air bag apparatus is installed.

The passenger seat-side air bag apparatus 11 is fixed inside the instrument panel 13, at a position corresponding to the opening 13b of the instrument panel 13. As shown in FIG. 3, a case 16 of the passenger seat-side air bag apparatus 11 has the shape of a box without a lid, and an upper opening portion of the case 16 is provided with a cover 14 firmly attached thereto by a band 15. A breakable groove 14a extends in the fore-to-aft direction relative the vehicle in a lower surface of a central portion of the cover 14.

A gas generator 24 is disposed inside the case 16, extending in the fore-to-aft direction relative to the vehicle. Disposed inside a case 19 of the gas generator 24 is a cylindrical or tubular inflator 18 (hereinafter inflator 18) whose axis extends also in the fore-to-aft direction. The inflator 18 generates gas by burning a gas generating agent or the like disposed therein. The case 19 of the gas generator 24 has a plurality of gas ejecting openings 20 for releasing gas while rectifying gas flow. Thus, the case 19 of the gas generator 24 also functions as a diffuser. Hereinafter, the case 19 is termed "diffuser". A plurality of bolts 22 are fixed to the diffuser 19. Each bolt 22 extends through a through hole 17 that extends through a bottom portion of the case 16, and a nut 23 is fastened to a distal end portion of the bolt 22 protruding from the outer surface of the case 16. Therefore, the gas generator 24 is fixed to the case 16 by the bolts 22 and the nuts 23.

Figure 4:
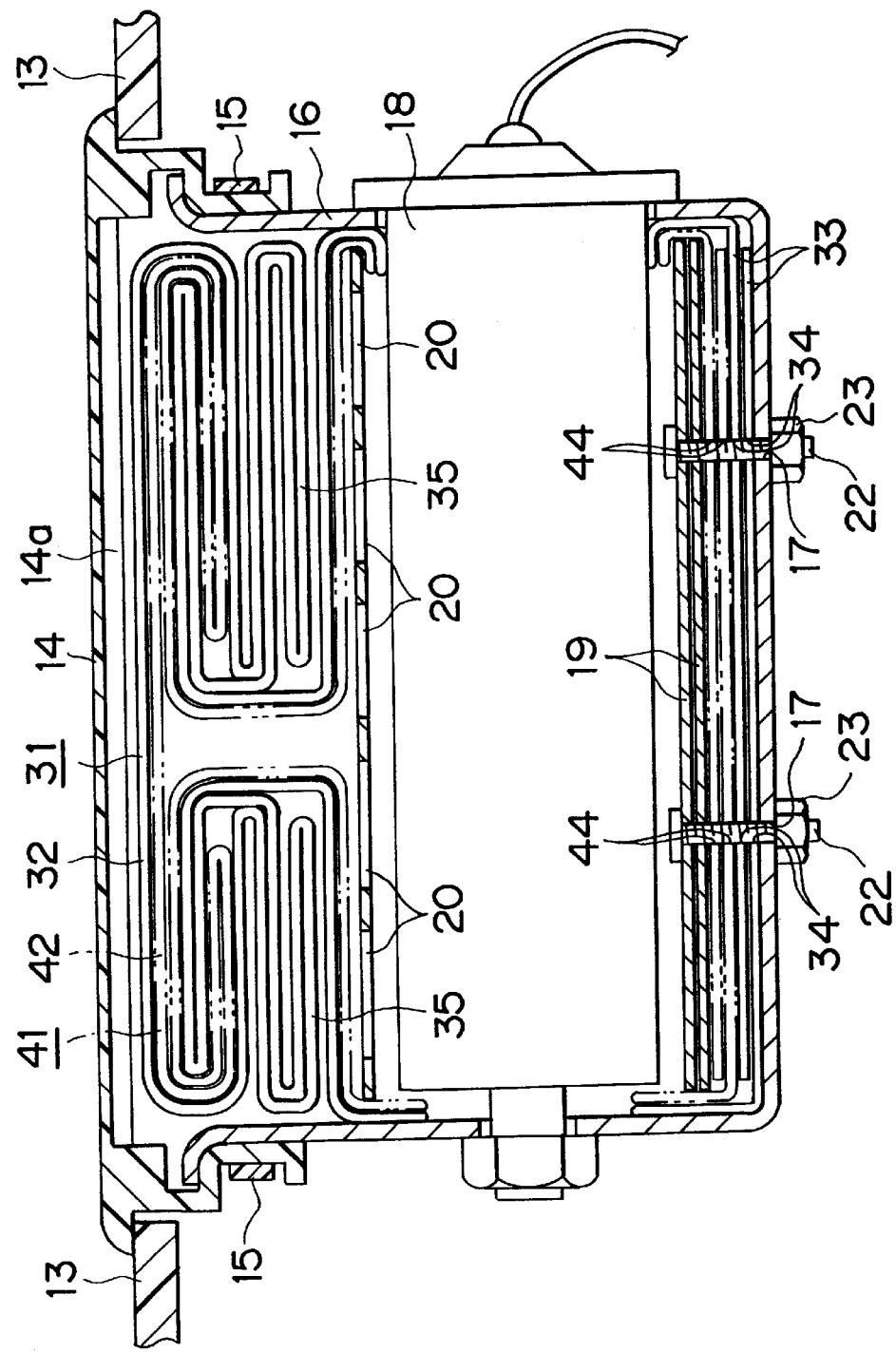
FIG. 4 is an enlarged sectional view taken along a fore-to-aft extending plane, that is, a plane perpendicular to the plane employed in FIG. 3.

An air bag 31 is housed in the case 16, facing the inflator 18, as shown in FIGS. 3 and 4. The air bag 31 is folded in a predetermined folding manner described below. The air bag 31 has a bag 32 and a mounting portion 33 that is formed at an opening edge of the bag 32. The mounting portion 33 has a plurality of insert holes 34 that are fitted over the bolts 22.

An inner bag 41 for controlling gas flow is disposed inside the air bag 31, in a predetermined folded state. The inner bag 41 has a bag 42 and a mounting portion 43. The mounting portion 43 of the inner bag 41 also has a plurality of insert holes 44 that are fitted over the bolts 22.

When the gas generator 24 is fixed to the case 16 by the bolts 22 and the nuts 23, the air bag 31 and the inner bag 41 are also fixed in such a manner that the mounting portions 33, 43 thereof are fastened by the bolts 22 and therefore firmly clamped between the case 16 and the diffuser 19. Therefore, the air bag 31 and the inner bag 41 surround the gas generator 24.

The bag 42 of the inner bag 41 is open at opposite ends thereof, as shown in FIG. 1. Each opening edge portion 48 is folded so as to form pleats. The pleated or overlapping portions of each opening edge portion 48 are adhered to each other. Therefore, each of the two ends of the bag 42 has opposite side openings 50 that are reduced in size, as shown in FIG. 1.

The bag 42 of the inner bag 41 has a communication hole 47 for communication with an auxiliary inner bag 46 provided as an extended portion of the inner bag 41, as shown in FIGS. 1 and 2. The auxiliary inner bag 46 has a generally triangular sectional shape, and is sewed onto the outer surface of the bag 42 of the inner bag 41 at a position corresponding to the communication hole 47. The auxiliary inner bag 46 is disposed on a passenger-side face of the bag 42, at such a position that when the air bag 31 is deployed, a lower face of the auxiliary inner bag 46 abuts on the instrument panel 13 with the air bag 31 intervening therebetween. The auxiliary inner bag 46 has in a passenger-side end portion thereof two communication holes 49 for communication with the interior of the air bag 31. The communication holes 49 are designed to be smaller than the opposite side openings 50 of the inner bag 41.

Figure 6:
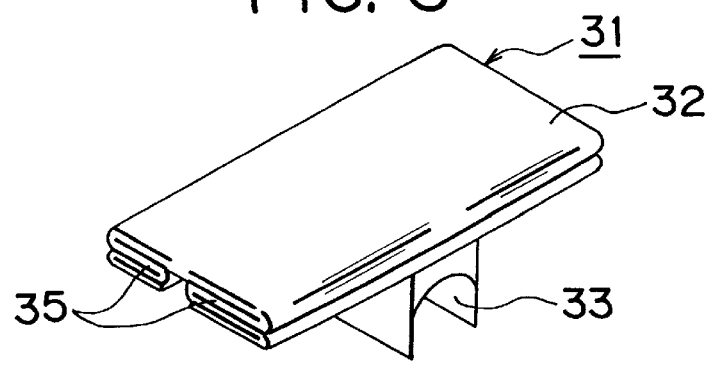
FIG. 6 is a perspective view illustrating the procedure of folding the air bag that follows the procedure shown in FIG. 5.
Figure 7:
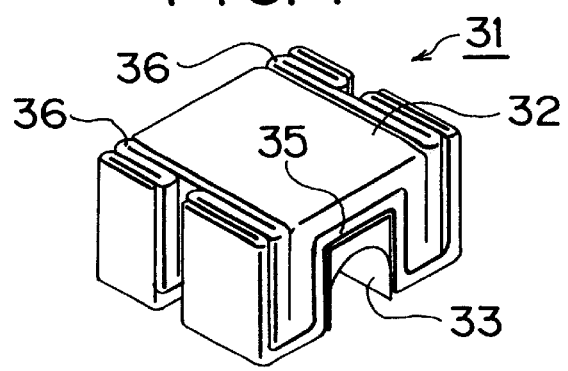
FIG. 7 is a perspective view illustrating the procedure of folding the air bag that follows the procedure shown in FIG. 6.

The procedure of folding the air bag 31 and the inner bag 41 when they are housed into the case 16 will be described with reference to FIGS. 5–7. In this procedure, the inner bag 41 is folded together with the air bag 31, so that the inner bag 41 is not shown in FIGS. 5–7 and will not be described below.

Figure 5:
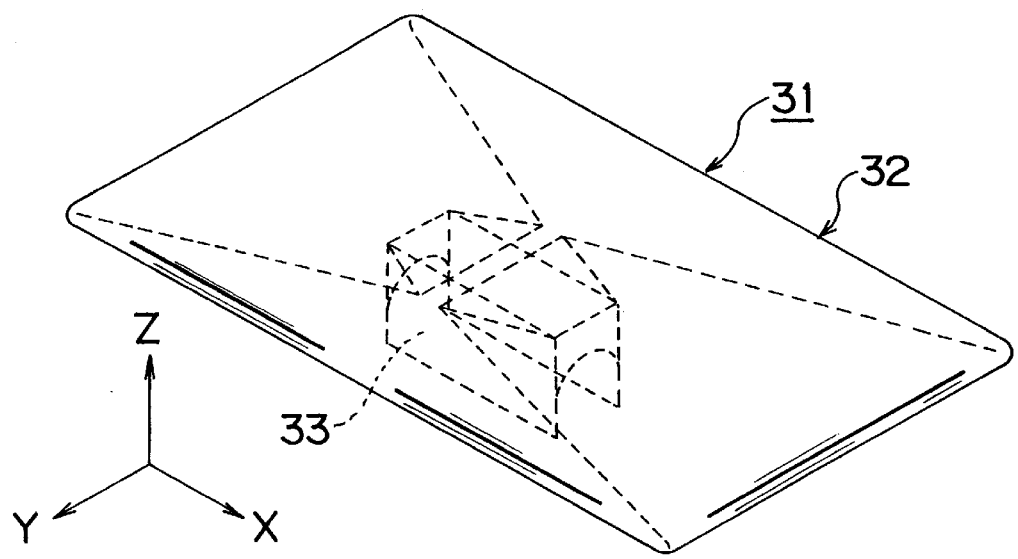
FIG. 5 is a perspective view of the air bag of the air bag apparatus for a passenger seat, illustrating the procedure of folding the air bag.

The air bag 31 is first flattened in a top-to-bottom direction relative to the vehicle as shown in FIG. 5 (in the direction indicated by arrow Z in FIG. 5). Subsequently, opposite end portions of the air bag 31 in the fore-to-aft direction (the direction indicated by arrow X) are folded onto lower surface of the air bag 31 into the form of bellows, thereby forming first folded portions 35. Opposite end portions of the air bag 31 in the transverse direction relative to the vehicle (direction indicated by arrow Y) are folded into the form of bellows so that the folded portions embrace the mounting portion 33 on three sides thereof, as shown in FIG. 7, thereby forming second folded portions 36. The second folded portions 36 are disposed between the gas generator 24 and the inner wall surface of the case 16, as shown also in FIG. 3. Central portions of the first folded portions 35 are disposed over the gas generator 24 as shown in FIG. 4. When the air bag 31 is folded so as to decrease in length in the fore-to-aft directions as shown in FIGS. 4 and 6, the folding is performed so that the amount of sheet of the air bag 31 folded is greater in the rearward folded portion (a rightward portion in FIG. 4) of the first folded portions 35 than in the forward folded portion (leftward portion in FIG. 4). In this manner, the air bag 31 and the inner bag 41 are folded and housed in the case 16 without leaving any substantial space therein.

The operation and deployment manner of the passenger seat-side air bag apparatus 11 of this embodiment will be described.

When the inflator 18 of the passenger seat-side air bag apparatus 11 produces gas at the time of an impact on the vehicle, gas is introduced into the inner bag 41 through the gas ejecting openings 20 of the diffuser 19, and temporarily held in the inner bag 41. Therefore, the pressure inside the small-capacity inner bag 41 increases so that the inner bag 41 is inflated and deployed while pressing the air bag 31 upward. Then, the cover 14, closing the opening of the case 16, is broken along the breakable groove 14a so that the cover 14 is forced to open as in a double-hinged door in the transverse directions relative to the vehicle. Gas flows from the bag 42 of the inner bag 41 into the auxiliary inner bag 46 through the communication hole 47, so that the auxiliary inner bag 46 is inflated and deployed.

Immediately, an upper portion of the bag 42 of the inner bag 41 presses a portion of the air bag 31 against the inner surface of the front windshield 12, and a lower portion of the auxiliary inner bag 46 presses a portion of the air bag 31 against an upper surface of the instrument panel 13.

When the pressure inside the bag 42 of the inner bag 41 exceeds a predetermined value, the opening edge portions 48 of the bag 42 are expanded from the pleated and adhered state so that the openings 50 increase in diameter. Therefore, gas flow into the air bag 31 becomes easier.

The bag 32, folded inside the case 16, is projected from the upper surface of the instrument panel 13 as the inner bag 41 is inflated and deployed. In this process, a portion of the first folded portions 35 located over the inflator 18 readily protrudes from the upper surface of the instrument panel 13 as indicated by point P1 in FIG. 8 together with the inflation and deployment of the inner bag 41, since the inflator 18 is disposed in the case 16 in such a posture that the axis of the inflator 18 extends in the fore-to-aft direction. Furthermore, since the bag 42 of the inner bag 41 is provided with the auxiliary inner bag 46, the inflation and deployment of the auxiliary inner bag 46 ensures that the first folded portions 35, disposed over the auxiliary inner bag 46, will be protruded from the upper surface of instrument panel 13.

The second folded portions 36 of the bag 32 of the air bag 31 are folded in on the right and left sides of the inflator 18 so as to sandwich the inflator 18, as described above. Therefore, when the inner bag 41 is inflated and deployed, only small portions of the second folded portions 36 are protruded from the upper surface of the instrument panel 13, and large portions of the second folded portions 36 remain inside the case 16, as indicated by point P2 in FIG. 8. In other words, during an early period of the operation of the passenger seat-side air bag apparatus 11, the deployment of a portion of the air bag 31 disposed over the inflator 18, that is, over the gas generator 24, in the fore-to-aft directions occurs to greater extents than the deployment of the air bag 31 in the transverse directions relative to the vehicle.

Forward and rearward end portions of the first folded portions 35 of the air bag 31 become sandwiched between the bag 42 of the inner bag 41 and the front windshield 12 and between the auxiliary inner bag 46 of the inner bag 41 and the instrument panel 13, respectively, while remaining in a folded state, as shown in FIG. 2. Therefore, excessively early deployment of the air bag 31 toward the occupant is prevented.

Subsequently, when the deployment of the inner bag 41 is substantially completed, large amounts of gas flow out of the bag 42 of the inner bag 41 into the air bag 31 through the opposite end openings 50 of the bag 42 and through the communication holes 49 of the auxiliary inner bag 46.

Figure 8:
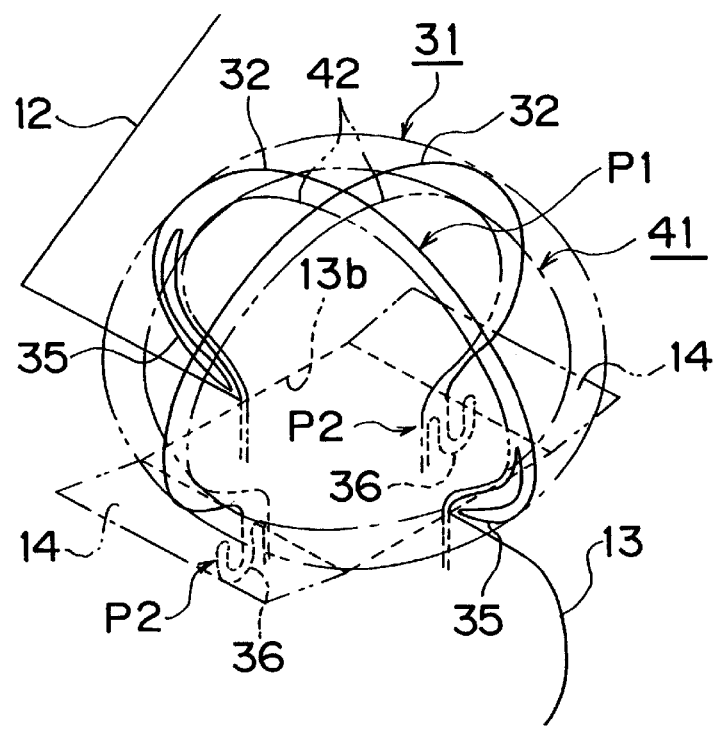
FIG. 8 is a schematic perspective view of the air bag apparatus, illustrating an early state of deployment.
Figure 9:
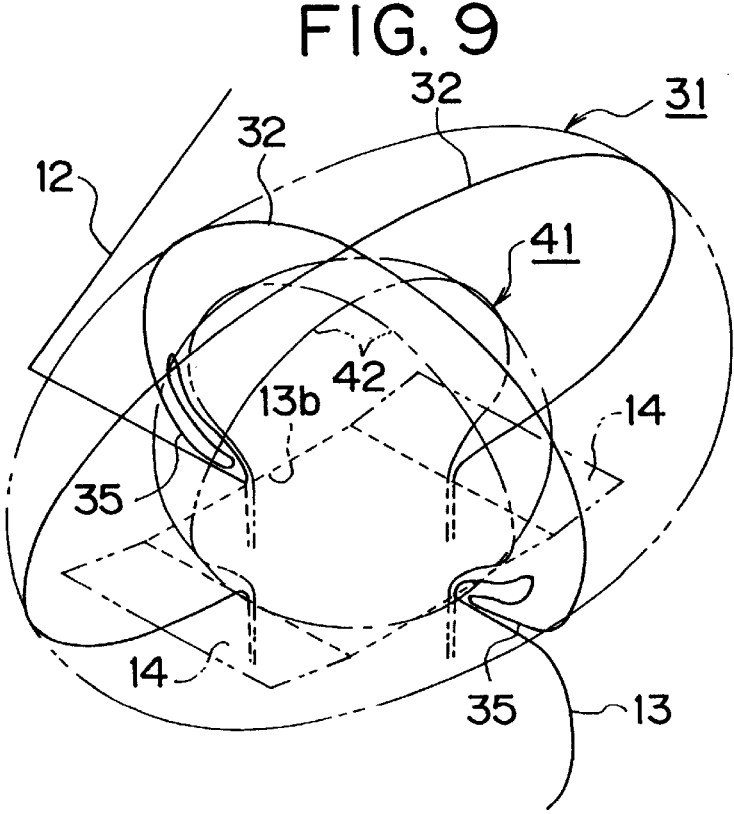
FIG. 9 is a schematic perspective view illustrating a deploying state that follows the state shown in FIG. 8.

In this process, the air bag 31 tends to be deployed in the transverse directions relative to the vehicle more easily than in the fore-to-aft directions because, in the assembly process, the transversely opposite end portions of the air bag 31 were folded after the opposite end portions thereof in the fore-to-aft directions were folded as described above. Furthermore, since the transversely opposite side openings 50 of the bag 42 of the inner bag 41 are larger in diameter than the communication holes 49 of the auxiliary inner bag 46, greater amounts of gas are supplied through opposite side openings 50 than through the communication holes 49, so that the air bag 31 is inflated and deployed at greater rates and to greater extents in the transverse directions than in the fore-to-aft directions, as indicated in FIG. 8. Moreover, when the opening edge portions 48 of the inner bag 41 are expanded from the pleated and adhered state so as to increase their diameters, the inflating deployment of the air bag 31 in the transverse directions is further accelerated. Thus, during an intermediate deployment period after the air bag 31 of the passenger seat-side air bag apparatus 11 has been protruded upward from the instrument panel 13, the deployment of the air bag 31 in the transverse direction relative to the vehicle occurs at greater rates or to greater extents than the deployment thereof in the fore-to-aft directions.

The first folded portions 35 of the air bag 31, sandwiched between the inner bag 41 and the front windshield 12 and between the auxiliary inner bag 46 and the instrument panel 13, are also deployed dragging though gaps therebetween. The second folded portions 36 left in the case 16 are pulled out therefrom over the instrument panel 13, dragging through gaps between the inner bag 41 and the case 16. The dragging through gaps produces sliding resistance, so that the deploying speed is reduced. Simultaneously, however, gas is supplied into the air bag 31 though the communication holes 49 of the auxiliary inner bag 46 as well as the opposite side openings 50 of the inner bag 41. Therefore, the air bag 31 is gradually deployed in the fore-to-aft directions, particularly, in the aft direction, as well as in the transverse directions, but at less deploying speeds in the fore-to-aft directions than in the transverse directions.

Figure 10:
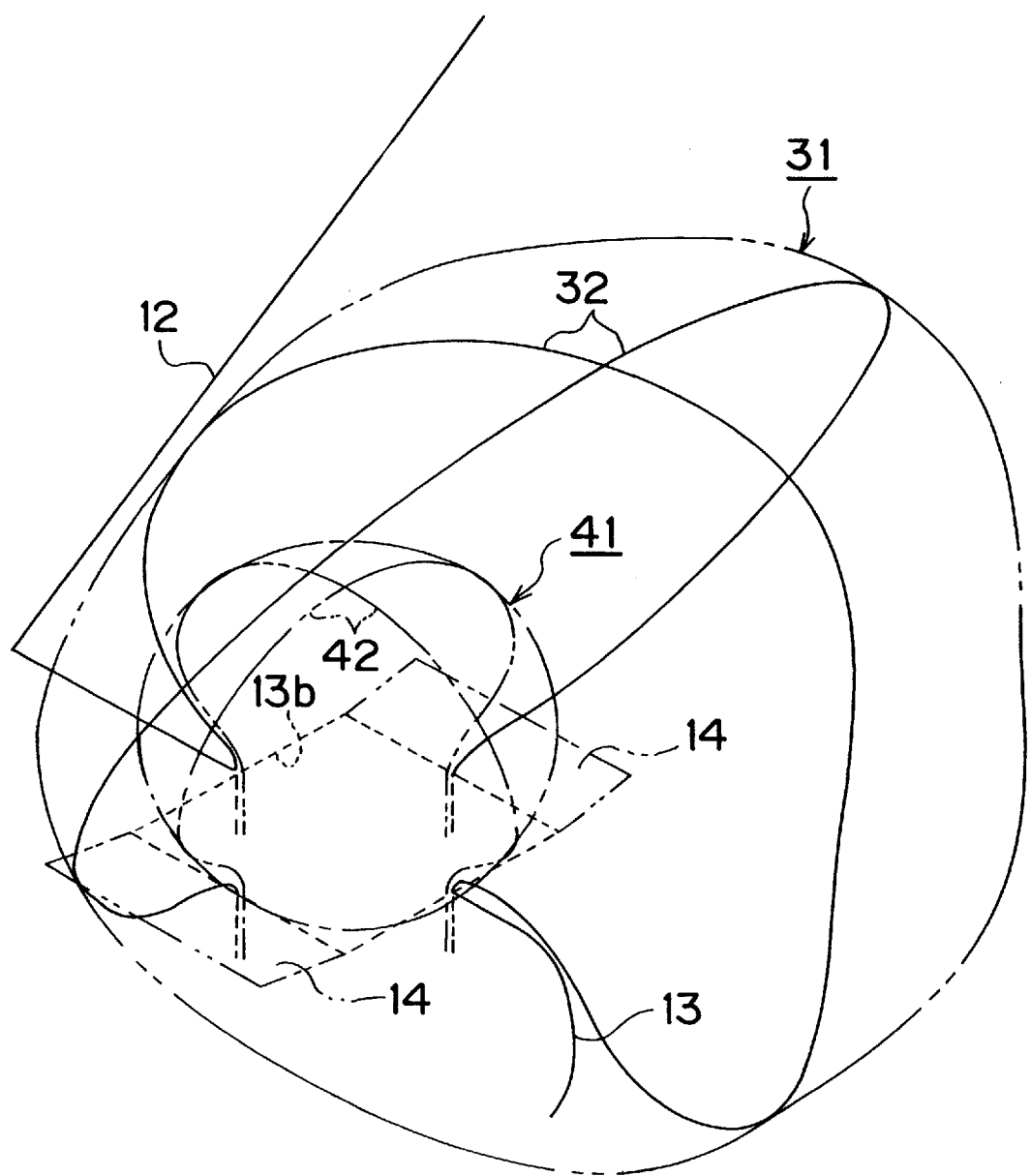
FIG. 10 is a schematic perspective view illustrating a deploying state that follows the state shown in FIG. 9.

When the deployment of the air bag 31 in the transverse directions relative to the vehicle is completed, the air bag 31 is immediately inflated and deployed in the fore-to-aft directions to assume a final deployment shape, as indicated in FIG. 10. Prior to the final deployment shape, the air bag 31 is deployed toward an occupant at reduced speeds while dragging between the bag 42 of the inner bag 41 and the front windshield 12 and between the auxiliary inner bag 46 and the instrument panel 13, as described above. In addition, a lower portion of the auxiliary inner bag 46 actively presses the dragging portion of the air bag 31 against the instrument panel 13. Therefore, the deploying speed of the air bag 31 toward an occupant is reduced without fail.

The passenger seat-side air bag apparatus 11 of the first embodiment achieves the following advantages.

When the inner bag 41 is inflated and deployed, the bag 42 presses a forward portion of the air bag 31 against the front windshield 12, and the auxiliary inner bag 46 presses a rearward portion of the air bag 31 against the instrument panel 13. The air bag 31 thus becomes sandwiched between the inner bag 41 and the front windshield 12 and between the auxiliary inner bag 46 and the instrument panel 13, so that sliding resistance occurs as the air bag 31 is deployed. Therefore, the deploying speed of the air bag 31 toward an occupant is reduced, so that strong contact of the air bag 31 with the occupant can be avoided if the occupant comes into contact with the air bag 31 by inertia or the like before the air bag 31 is completely deployed.

Furthermore, since the air bag 31 is sandwiched between the inner bag 41 and the front windshield 12 and between the auxiliary inner bag 46 and the instrument panel 13 during an early deployment period, it is possible to reduce the protrusion of the first folded portions 35 of the air bag 31 toward an occupant during the early period. Therefore, it is possible to reduce the danger that if an occupant comes into contact with the air bag 31 before the air bag 31 is completely deployed, the first folded portions 35, still remaining in a folded state, may contact the occupant.

While being inflated and deployed, the air bag 31 drags between the inner bag 41 and the front windshield 12 and between the auxiliary inner bag 46 and the instrument panel 13. Tension is thereby applied to the air bag 31 during the deployment thereof. Therefore, it becomes possible to prevent the air bag 31 to be protruded in a nearly packed state.

During deployment, the auxiliary inner bag 46, attached to the bag 42 of the inner bag 41, becomes pressed against the upper surface of the instrument panel 13, with a rearward portion of the first folded portions 35 of the air bag 31 being sandwiched between the auxiliary inner bag 46 and the instrument panel 13. Therefore, it is possible to reliably prevent the first folded portions 35 of the air bag 31 from being protruded toward an occupant during an early period of the deployment of the air bag 31.

Since a lower portion of the auxiliary inner bag 46 actively presses a corresponding portion of the air bag 31 against the instrument panel 13, a rearward portion of the first folded portions 35 of the air bag 31 will be highly reliably sandwiched between the auxiliary inner bag 46 and the instrument panel 13. Furthermore, since the auxiliary inner bag 46 has a generally triangular shape with a relatively long bottom side when viewed from the side thereof, a sufficiently large area of contact between the auxiliary inner bag 46 and the instrument panel 13 is secured.

As for the folding of the air bag 31, the opposite end portions thereof in the fore-to-aft directions relative to the vehicle are folded before the transversely opposite end portions thereof are folded. Therefore, when deployed, the air bag 31 is first deployed in the transverse directions, and then in the fore-to-aft directions, so that the deploying speed of the air bag 31 toward an occupant is reduced. Therefore, even if the occupant comes into contact with the air bag 31 before the deployment of the air bag 31 is completed, strong contact of the air bag 31 with the occupant will be highly reliably prevented. Further, since the entire first folded portions 35 of the air bag 31, that is, the end portions thereof in the fore-to-aft directions, are protruded from the upper surface of the instrument panel 13 during an early deployment period, the air bag 31 can be smoothly deployed in the transverse directions relative to the vehicle.

In an early period of the deployment of the air bag 31, the inflating deployment of the auxiliary inner bag 46 ensures that the first folded portions 35 of the air bag 31 will be protruded from the upper surface of the instrument panel 13. Therefore, the air bag 31 can be smoothly deployed in the transverse directions relative to the vehicle.

The two communication holes 49 for communication with the interior of the air bag 31 are formed in an occupant-side end portion of the auxiliary inner bag 46. Therefore, while the air bag 31 is being inflated and deployed in the transverse directions, the air bag 31 is gradually inflated and deployed in the fore-to-aft directions relative the vehicle. Consequently, it is possible to highly reliably prevent strong contact of the air bag 31 with an occupant even if the occupant comes into contact with the air bag 31 before the complete deployment of the air bag 31.

The air bag 31 is folded so that second folded portions 36 of the air bag 31, that is, the transversely opposite-side folded portions, will not interfere with a central portion of the air bag 31. Therefore, in an early deployment period, the entire first folded portions 35, that is, the opposite-side folded portions in the fore-to-aft directions, are readily protruded from the upper surface of the inner bag 41 as the inner bag 41 is inflated and deployed. As a result, the air bag 31 will be smoothly deployed in the transverse directions relative to the vehicle.

The inflator 18 is disposed in the case 16 so that the axis of the inflator 18 lies in the fore-to-aft directions, and the first folded portions 35 of the air bag 31, that is, the opposite-end folded portions in the fore-to-aft directions, are located over the inflator 18. Therefore, in an early period of the deployment of the air bag 31, the substantially entire first folded portions 35 will be reliably protruded from the upper surface of the instrument panel 13 as the inner bag 41 is inflated and deployed. Then, the air bag 31 will be smoothly deployed in the transverse directions relative to the vehicle.

The air bag 31 and the inner bag 41 are housed in the case 16 without any substantial free space therein. Therefore, this embodiment achieves compact containment of the air bag 31 in the case 16 while retaining the air-bag deploying performance as described above.

The cover 14 breaks open in the transverse directions as the inner bag 41 is inflated and deployed. Therefore, the cover 14 does not interfere with the auxiliary inner bag 46 of the inner bag 41, so that the auxiliary inner bag 46 will be reliably deployed rearward into a downwardly pressing state as described above. Furthermore, the cover 14 is reliably prevented from contacting an occupant when it is broken open.

The amount of gas to be supplied from the inner bag 41 into the air bag 31 per unit time can be adjusted by changing the diameter of the opposite side openings of the inner bag 41. Thereby, the inflating-deploying speed of the air bag 31 can be adjusted. Consequently, it is possible to adjust the restraint performance on an occupant in accordance with types of vehicles.

The first embodiment may also be modified as follows.

The shape of the auxiliary inner bag 46 may also be a shape other than a triangular shape in a side view, for example, a circular shape, an elliptical shape, rectangular shape and the like.

Although in the first embodiment, the bag 42 is formed separately from the inner bag 41 and then sewed onto the inner bag 41, the auxiliary inner bag 46 and the inner bag 41 may also be formed together.

The auxiliary inner bag 46 may also be adhered to the bag 42 instead of being sewed thereto.

Although in the foregoing embodiment, the opening edge portions 48 of the inner bag 41 are pleated and adhered in order to reduce the diameter of opposite side openings 50 at the transversely opposite ends of the inner bag 41, the pleats of the opening edge portions 48 may instead be sewed together using a thread that breaks when the internal pressure of the inner bag 41 reaches or exceeds a predetermined value (tear seam).

The communication holes 49 of the auxiliary inner bag 46 may be changed in position to, for example, side surfaces of the auxiliary inner bag 46, upper or lower surfaces thereof, or the like.

Second Embodiment

A second embodiment of the invention will be described with reference to FIGS. 11–24. Portions of the second embodiment comparable to those of the first embodiment are represented by comparable reference characters in the drawings, and will not be described again. In each of the embodiments described below, the cover 14 for covering an air bag apparatus for a passenger seat is substantially the same as that in the first embodiment, and is not shown in the drawings.

Figure 11:
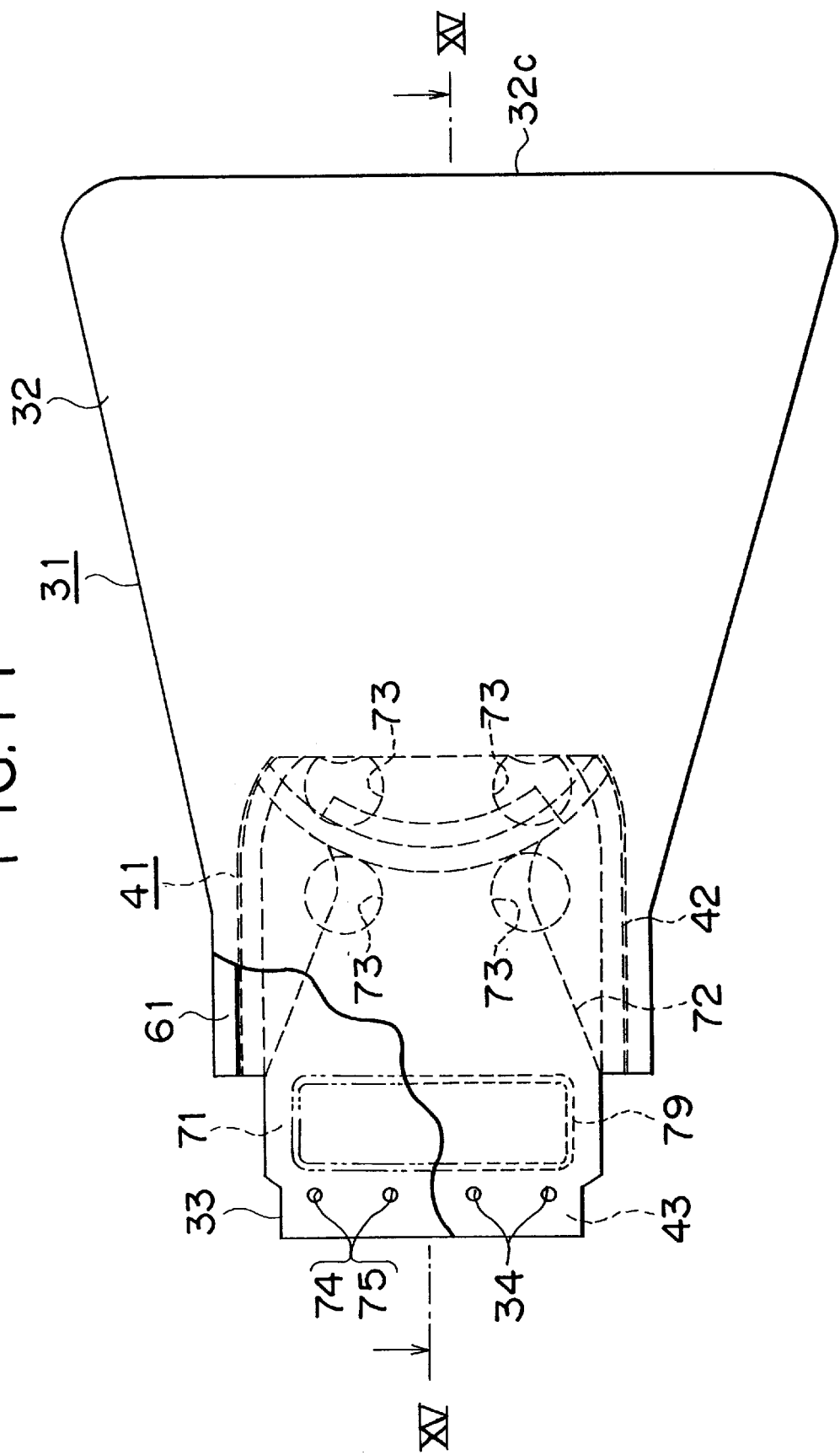
FIG. 11 is a plan view of an air bag apparatus for a passenger seat according to a second embodiment of the invention.
Figure 12:
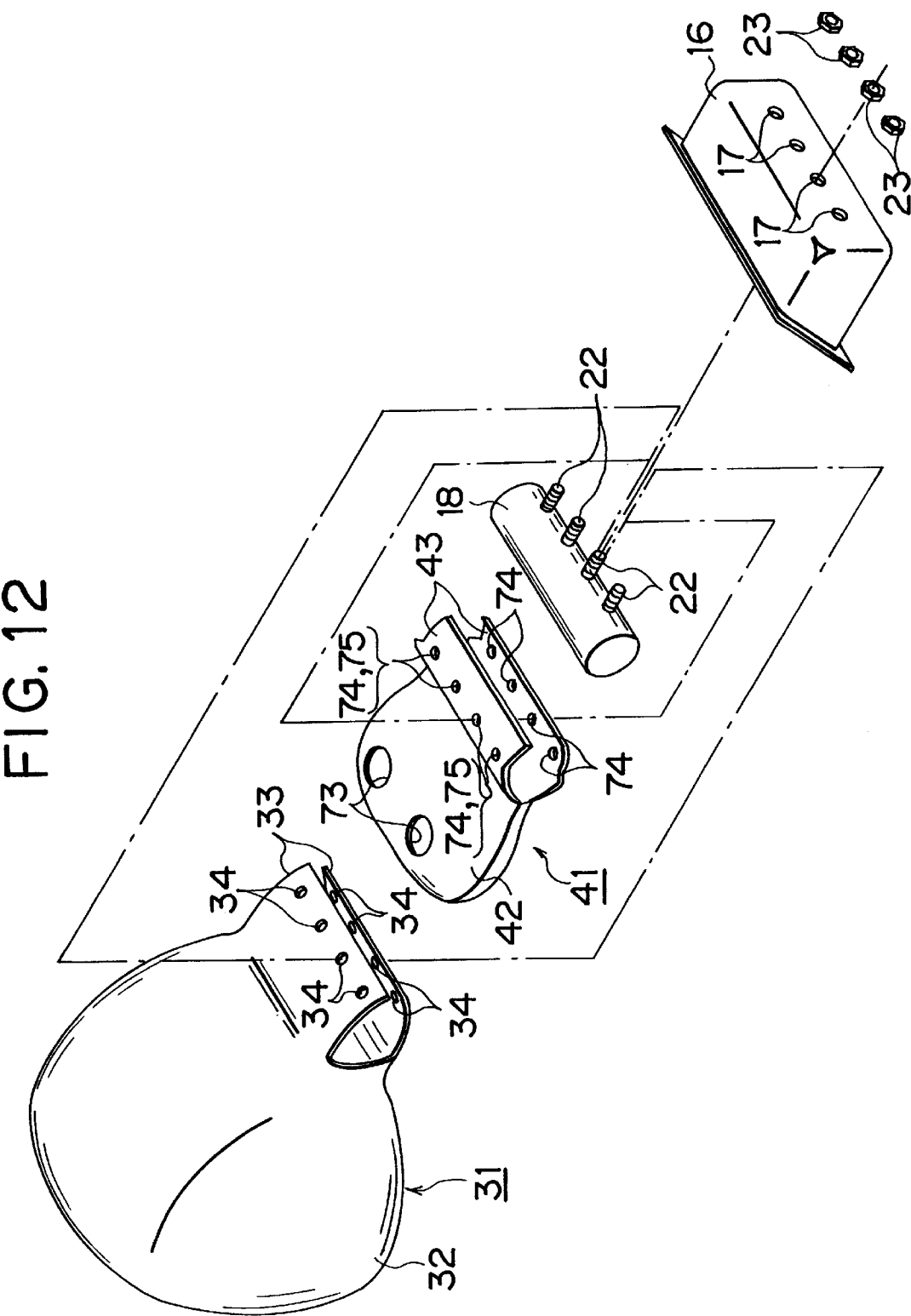
FIG. 12 is an exploded perspective view of the air bag apparatus for a passenger seat shown in FIG. 11.

Referring first to FIGS. 11 and 12, an air bag 31 has a mouth portion 61 that is provided between a bag 32 and a mounting portion 33.

An inner bag 41 also has a mouth portion 71 that is provided between a bag 42 and a mounting portion 43 for introducing gas from an inflator 18 into the inner bag 41. The inner bag 41 further has a strap 72 as a restriction member. Each of an upper surface and a lower surface of the bag 42 has two communication holes 73 for supplying gas into the air bag 31. The mounting portion 43 and the strap 72 have a plurality of insert holes 74 and 75, respectively.

In the second embodiment, the inflator 18 and a diffuser 19, which form a gas generator 24, are disposed so that the axis thereof lies in the transverse direction relative to the vehicle, not in the fore-to-aft direction as in the first embodiment.

The construction of the inner bag 41 will be described following the production procedure thereof.

Figure 13:
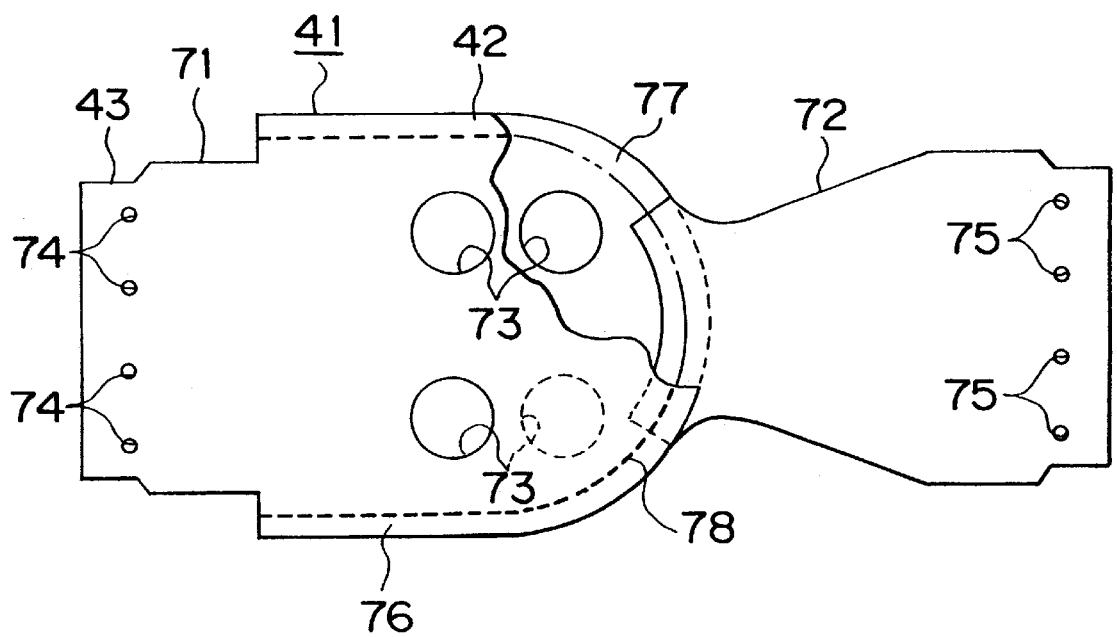
FIG. 13 is a plan view of an inner bag, illustrating a production process of the inner bag.
Figure 14:
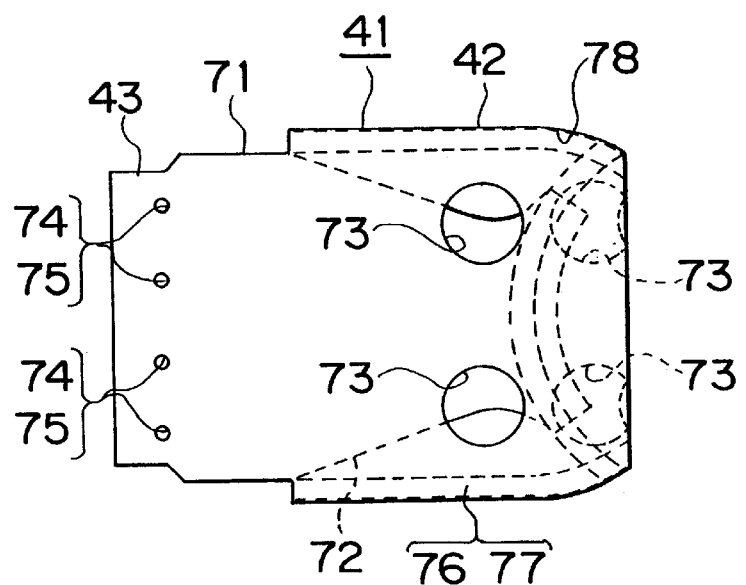
FIG. 14 is a plan view illustrating a production process of the inner bag that follows the process in FIG. 13.

First, a left face cloth 100 and a lower face cloth 77 are placed on each other in alignment as shown in FIG. 13, and distal end portions of the upper and lower face cloths 76, 77 are placed over an end of the strap 72. While being held in this position, the upper and lower face cloths 76, 77 and the strap 72 are sewed together so as to form a seam 78. Subsequently, the left face cloth 100 and the lower face cloth 77 are turned inside out as shown in FIG. 14, with the distal end portion thereof being folded inside, in such a manner that the insert holes 74 of the mounting portion 43 of the inner bag 41 coincide with the insert holes 75 of the strap 72.

Figure 15:
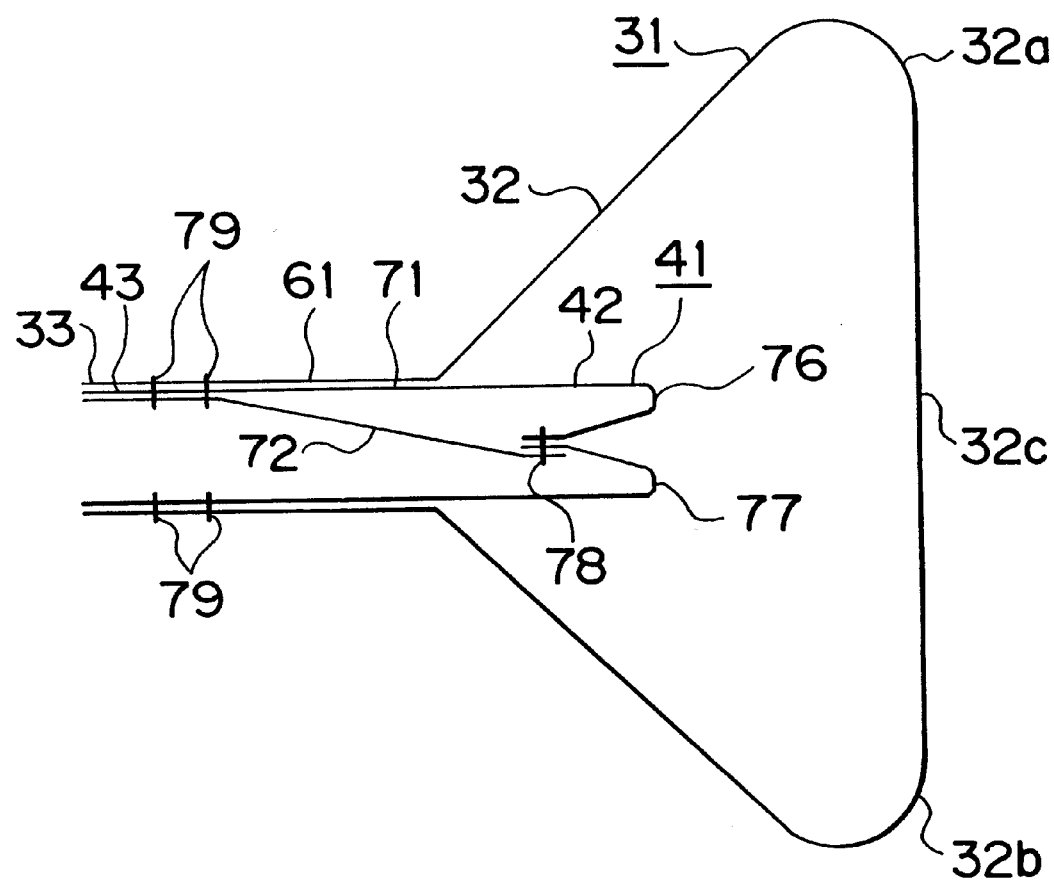
FIG. 15 is a schematic sectional view taken on line XV—XV of FIG. 11.

The inner bag 41 is then inserted into the air bag 31 as shown in FIGS. 11 and 15. The upper and lower face cloths 76, 77 of the mounting portion 43 of the inner bag 41 are sewed to the upper and lower face cloths of the mounting portion 33 of the air bag 31, respectively, so as to form seams 79. In this sewing process, an end portion of the strap 72 is simultaneously sewed to the upper or lower face cloth of the mounting portion 33 of the air bag 31 on the seam 79.

The thus-sewed inner bag 41 is folded together with the air bag 31. The folded bag unit is then placed in the case 16. The procedure for placing the air bag 31 and the inner bag 41 in the case 16 and fixing them to the case 16 will be described below with reference to FIGS. 16–20.

Figure 17:
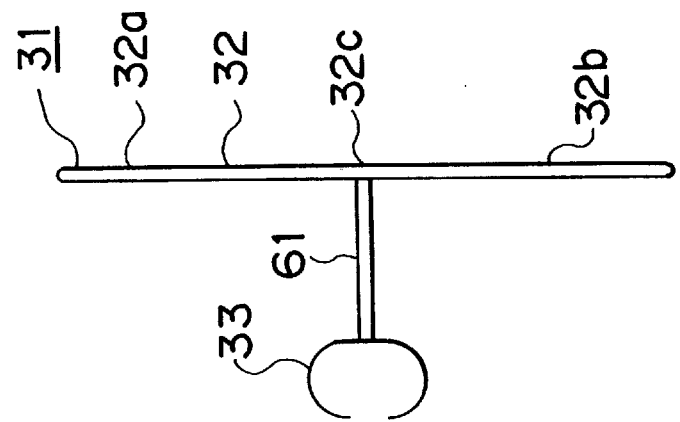
FIG. 17 is a side view of the air bag, illustrating the same folding step as in FIG. 16.
Figure 16:
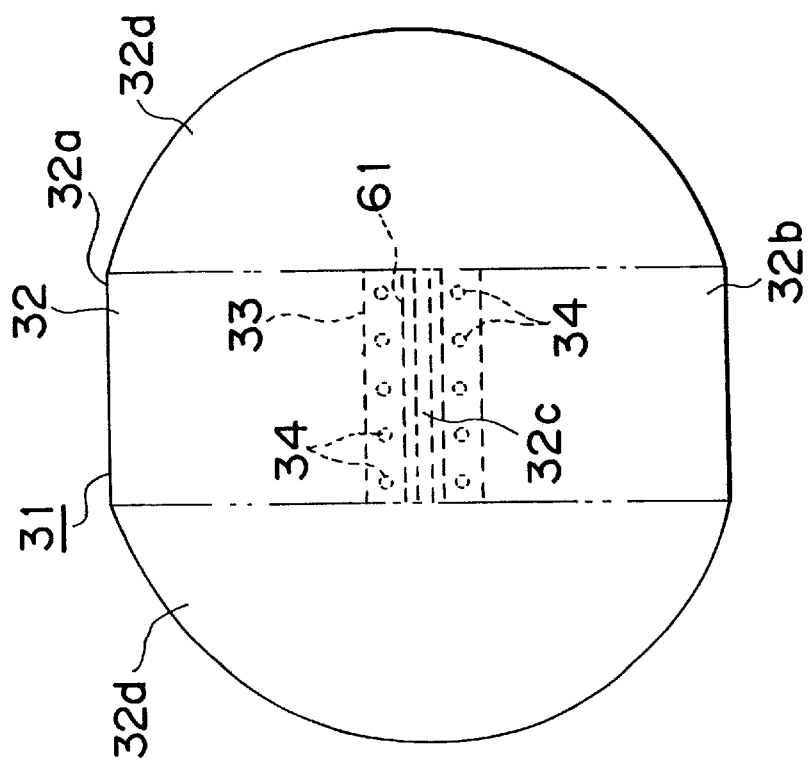
FIG. 16 is a rear view of the air bag, illustrating the procedure of folding the air bag.
Figure 19:
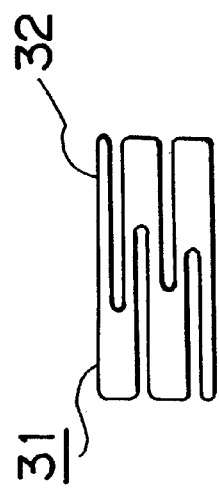
FIG. 19 is a schematic sectional view taken on line XIX—XIX of FIG. 18.
Figure 18:
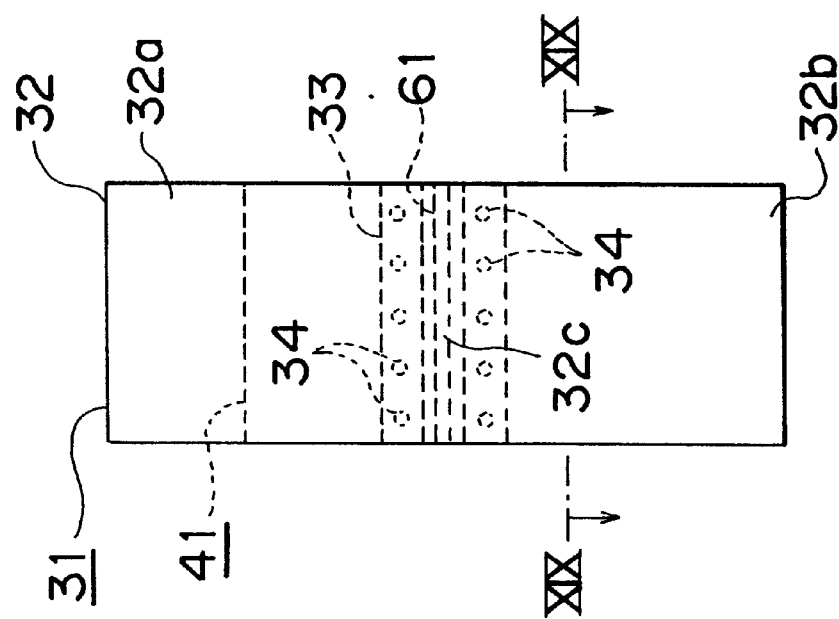
FIG. 18 a rear view of the air bag, illustrating a folding step that follows the step shown in FIG. 16.

First, the bag 32 and the mouth portion 61 of the air bag 31 are respectively flattened so that the entire air bag 31 has a profile of a letter "T" as shown in FIGS. 16 and 17. Subsequently, the transversely opposite end portions 32d of the bag 32 of the air bag 31, protruding from the width of the inflator 18 in the transverse directions relative to the vehicle, are alternately folded back to a central portion of the air bag 31 so that the bag 32 is formed into the shape of a belt elongated in the fore-to-aft directions relative to the vehicle and having a sectional shape of bellows as shown in FIG. 19.

Figure 20:
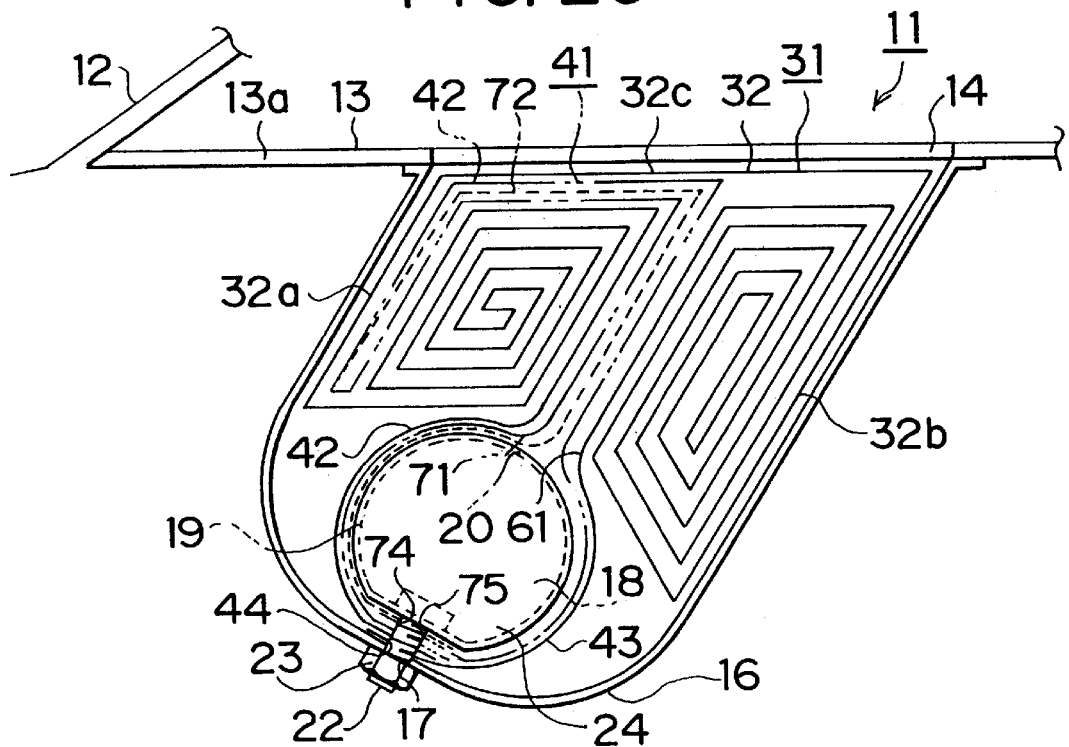
FIG. 20 is a schematic sectional view of the air bag apparatus for a passenger seat of the second embodiment taken in a fore-to-aft extending plane, wherein the apparatus is installed.

In this folding process, the inner bag 41 is placed and folded in a forward portion 32a of the bag 32, so that the inner bag 41 extends through the mouth portion 61 into the forward portion 32a of the air bag 31, as can be seen in FIG. 20 (the inner bag 41 is indicated by a broken line). After that, the forward portion 32a of the bag 32 of the air bag 31 is folded into generally the shape of a squared roll by rolling it counterclockwise in a view from the left side of the vehicle, as shown in FIG. 20. A rearward portion 32b of the bag 32 is folded into generally the shape of a squared roll by rolling it clockwise in a view from the left side of the vehicle.

The mounting portion 33 of the air bag 31, and the mounting portion 43 of the inner bag 41, and the end portion of the strap 72 are wrapped around the gas generator 24, and the bolts 22 provided on the gas generator 24 are inserted into the insert holes 34, 74, 75, as shown in FIG. 20. While maintained in this state, the gas generator 24 and the air bag 31 are placed into the case 16 so that the bolts 22 of the gas generator 24 are inserted into holes 17 of the case 16. By subsequently fastening the nuts 23 to the bolts 22, the gas generator 24 and the air bag 31 are positioned and fixed in the case 16.

When the air bag 31 and the inner bag 41 are thus housed in the case 16, the mouth portion 61 of the air bag 31 is located extending in a middle portion within the case 16, as shown. A central portion 32c of the bag 32 of the air bag 31 tautly extends in a middle portion of the opening of the case 16 (facing the plane of the opening). The forward portion 32a and the rearward portion 32b of the bag 32 of the air bag 31 are folded and disposed between the mouth portion 61 and the opposite inner surfaces of the case 16. The inner bag 41 is folded and contained in the forward portion 32a of the bag 32.

When gas is generated in the gas generator 24 of the passenger seat-side air bag apparatus 11 of this embodiment, gas flows out of the gas ejecting openings 20 of the diffuser 19 into the bag 42 of the inner bag 41 through the mouth portion 71. Since the mouth portion 71 is flattened or squeezed as shown in FIG. 20, gas dwells at the entrance to the mouth portion 71 and therefore builds up pressure in such a manner that the mouth portion 71 would be forced to protrude upward from the upper surface of the instrument panel 13. However, the mouth portion 71 is not actually forced to protrude upward, since the mouth portion 71 extends from the inflator 18 without slack.

Figure 21:
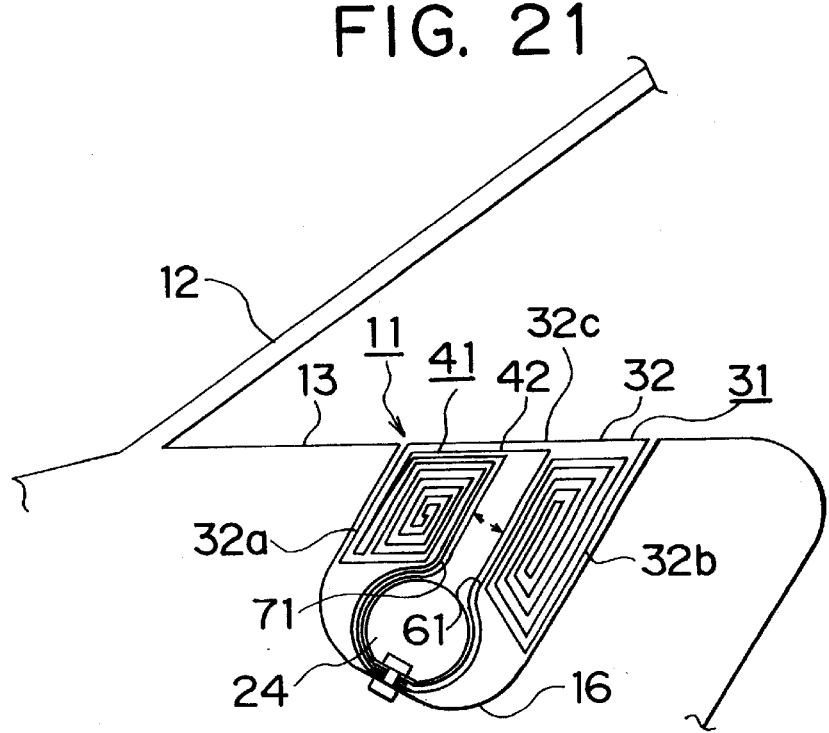
FIG. 21 is a schematic sectional view of the apparatus, illustrating an early state of the deployment.
Figure 22:
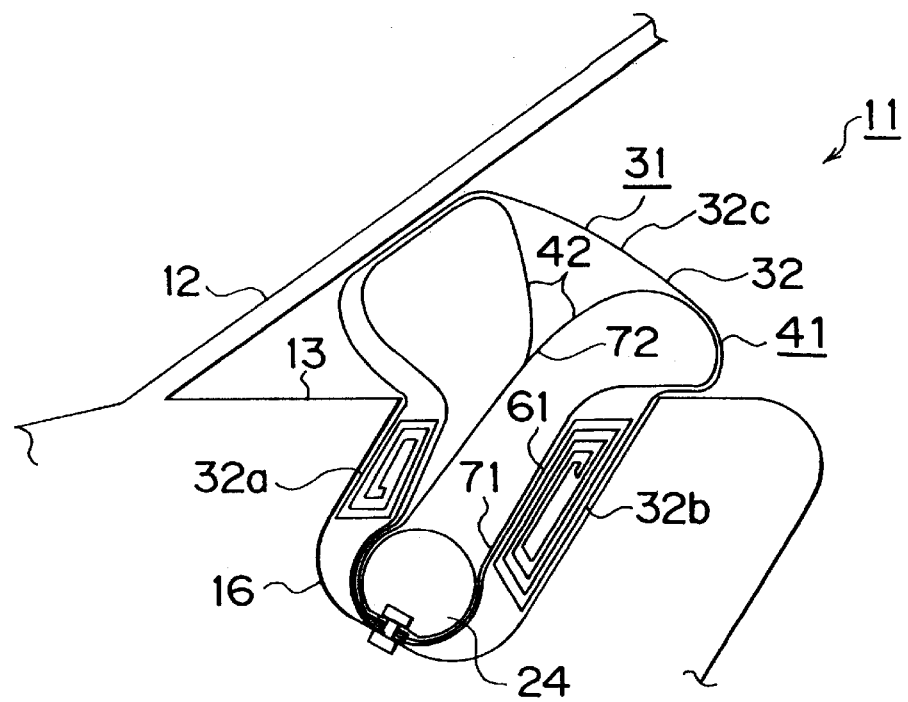
FIG. 22 is a schematic sectional view illustrating a deploying state that follows the state shown in FIG. 21.

Instead, the mouth portion 71 of the inner bag 41 is expanded in breadth in the directions indicated by arrows in FIG. 21, by the high-pressure gas introduced thereinto from the gas generator 24, thereby forming a guide passage through the mouth portion 71. The mouth portion 61 of the air bag 31 is expanded together with the mouth portion 71 of the inner bag 41, so that the forward portion 32a and the rearward portion 32b of the bag 32, folded and contained between the mouth portion 61 and the inner opposite surfaces of the case 16, are pressed against the corresponding inner surfaces. Immediately, gas flows through the guide passage of the mouth portion 71 into the bag 42 of the inner bag 41, thereby inflating the bag 42. Therefore, the bag 32 of the air bag 31 is deployed in the following manner. That is, only the central portion 32c is initially expanded so that the central portion 32c is deployed while being tightly drawn without a crease allowed therein, as shown in FIG. 22.

In this manner, gas introduced into the bag 42 of the inner bag 41 inflates the bag 42 and, in addition, flows out into the bag 32 of the air bag 31 through the communication holes 73. However, due to the contraction flow resistance caused when gas flows through the communication holes 73, the pressure inside the inner bag 41 remains higher than that in the air bag 31. Therefore, the inner bag 41 is first inflated to a final deployment state as shown in FIG. 22.

In the process of inflation of the inner bag 41, the strap 72 restricts the expansion length of a central portion of the bag 42 toward an occupant. Therefore, the bag 42 of the inner bag 41 is deployed into a shape that is long in the transverse directions and vertical directions relative to the vehicle and short in the fore-to-aft directions. As a result, the deployed bag 42 of the inner bag 41 presses portions of the bag 32 of the air bag 31 against the front windshield 12 and the instrument panel 13.

Figure 23:
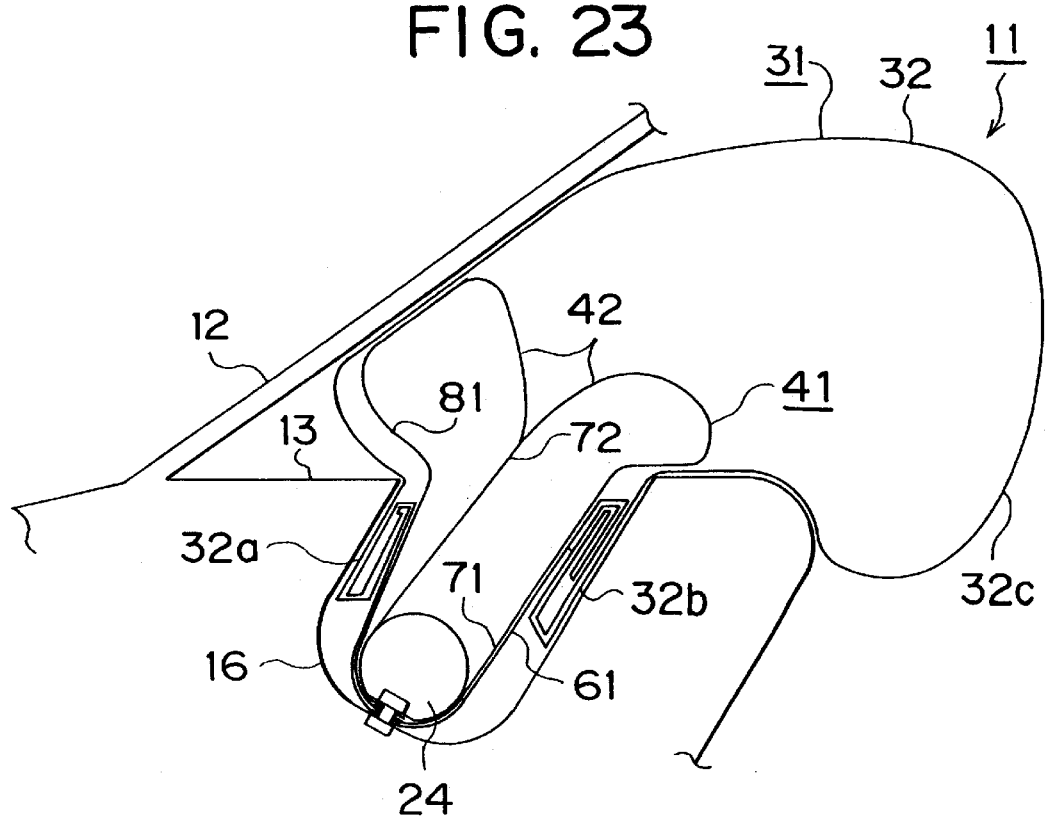
FIG. 23 is a schematic sectional view illustrating a deploying state that follows the state shown in FIG. 22.
Figure 24:
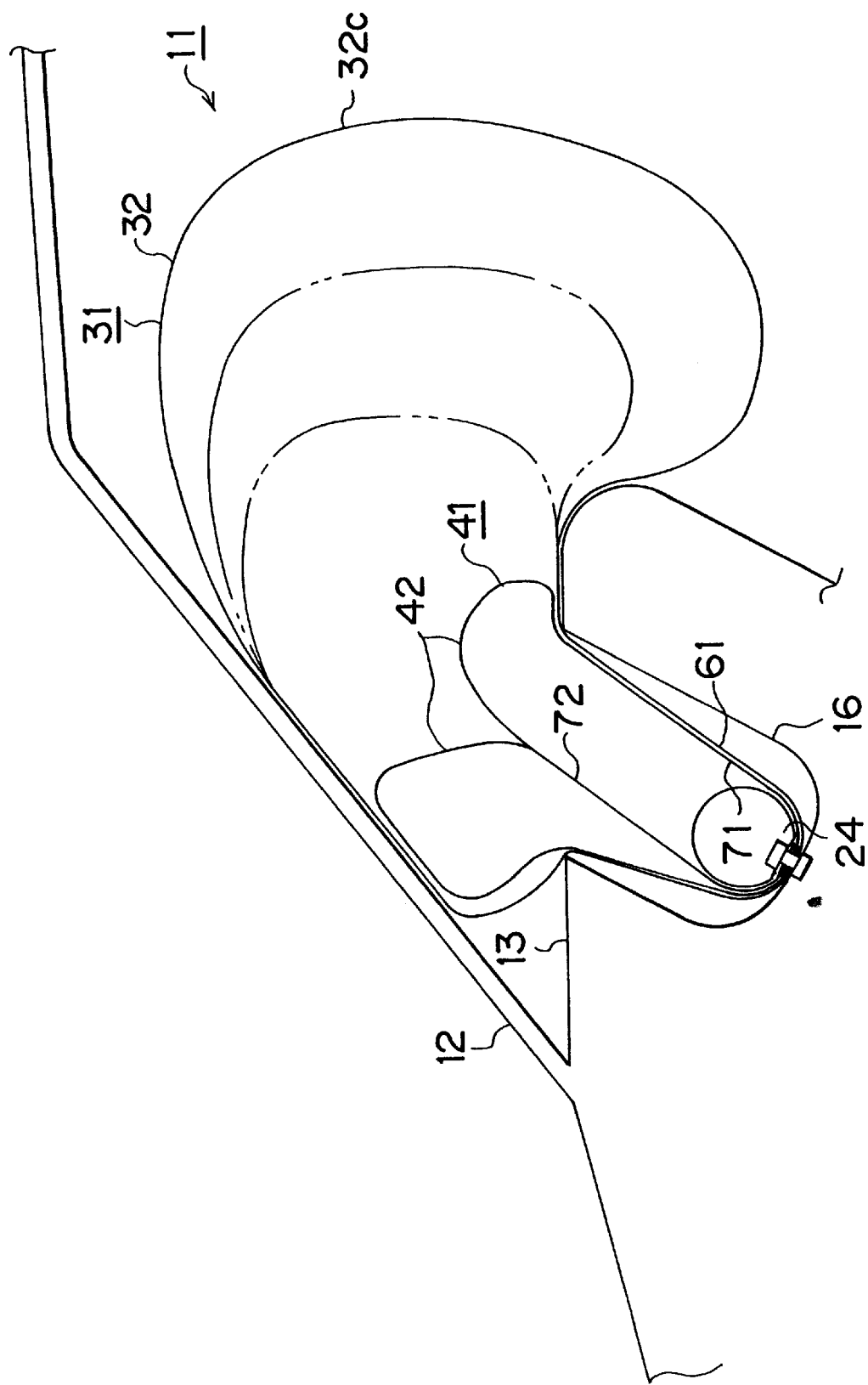
FIG. 24 is a schematic sectional view illustrating a deploying state that follows the state shown in FIG. 23.

When gas is further introduced into the bag 32 of the air bag 31 through the communication holes 73 of the inner bag 41, the tension in the central portion 32c of the bag 32, now facing rearward, increases so that the forward portion 32a and the rearward portion 32b of the bag 32 are progressively pulled out of the case 16 and deployed, as shown in FIG. 23. Since the forward portion 32a and the rearward portion 32b of the bag 32 are being pressed against the inner surfaces of the case 16 due to the expansion of the mouth portion 61 of the inner bag 41 as described above, sliding resistance occurs between the forward and rearward portions 32a, 32b and the corresponding inner surfaces of the case 16 when the portions are pulled out. Therefore, the deploying speed of the forward and rearward portions 32a, 32b of the bag 32 is considerably reduced.

Since the forward portion 32a and the rearward portion 32b of the bag 32 of the air bag 31 are also being pressed against the front windshield 12 and the instrument panel 13, respectively, due to the inflation of the bag 42 of the inner bag 41, sliding resistance also occurs therebetween so that the deploying speed of the forward portion 32a and the rearward portion 32b of the bag 32 is further reduced.

The passenger seat-side air bag apparatus 11 of the second embodiment achieves the following advantages.

When the inner bag 41 is inflated and deployed, the left face cloth 100 of the inner bag 41 presses a portion of the air bag 31 against the front windshield 12, and the lower face cloth 77 of the inner bag 41 presses a portion of the air bag 31 against the instrument panel 13. Therefore, the air bag 31 is thereby sandwiched between the inner bag 41 and the front windshield 12 or the instrument panel 13, so that sliding resistance occurs when the air bag 31 is deployed. consequently, the deploying speed of the air bag 31 toward an occupant is reduced so that strong contact of the air bag 31 with the occupant can be substantially prevented even if the occupant comes into contact with the air bag 31 before the deployment of the air bag 31 is completed.

Since the air bag 31 becomes sandwiched between the inner bag 41 and the front windshield 12 or the instrument panel 13 during an early period of the deployment of the air bag 31, the passenger seat-side air bag apparatus 11 of the embodiment significantly reduces the danger that the roll-like folded portions of the forward portion 32a and the rearward portion 32b of the bag 32 of the air bag 31 may protrude toward an occupant during the early period. Therefore, the embodiment significantly reduces the danger that the folded forward or rearward portion 32a or 32b of the bag 32 of the air bag 31 may contact an occupant even if the occupant comes into contact with the air bag 31 before it is completely deployed.

When the inflator 18 is operated, the inner bag 41 is inflated so that the forward portion 32a of the air bag 31 is deployed to a predetermined extent prior to other portions of the air bag 31. Due to gas subsequently supplied through the communication holes 73 of the inner bag 41, the other portions of the air bag 31 are inflated and deployed from the folded state while being tightly drawn. Therefore, no crease is formed in the central portion 32c of the bag 32 of the air bag 31.

The inner bag 41 contains the strap 72 provided as a restriction member for restricting the inflation of a central portion of the inner bag 41 to a predetermined extent. Due to the strap 72, the upper and lower portions of the inner bag 41 are inflated to greater extents than the central portion thereof, so that the forward portion 32a and the rearward portion 32b of the air bag 31 are reliably pressed against the front windshield 12 and the instrument panel 13, respectively. Therefore, the deploying speed of the forward portion 32a and the rearward portion 32b of the air bag 31 is considerably reduced. Consequently, strong contact of the air bag 31 with an occupant can be substantially prevented even if the occupant comes into contact with the air bag 31 while the air bag 31 is being deployed.

The inflation of the central portion of the inner bag 41 is restricted to a predetermined amount by the strap 72.

Therefore, even if an occupant is out of the proper sitting position and contacts the air bag 31 before it is completely deployed, this embodiment considerably reduces the danger that the inner bag 41 may strike the occupant with the air bag 31 intervening therebetween.

By changing the diameter of the communication holes 73, the amount of gas supplied from the inner bag 41 into the air bag 31 per unit time can be adjusted and, therefore, the deploying speed of the air bag 31 can be adjusted. Consequently, this embodiment makes it possible to adjust the restraining performance on an occupant in accordance with types of vehicles and the like.

Third Embodiment

A third embodiment of the invention will be described with reference to FIGS. 25 and 26.

Figure 25:
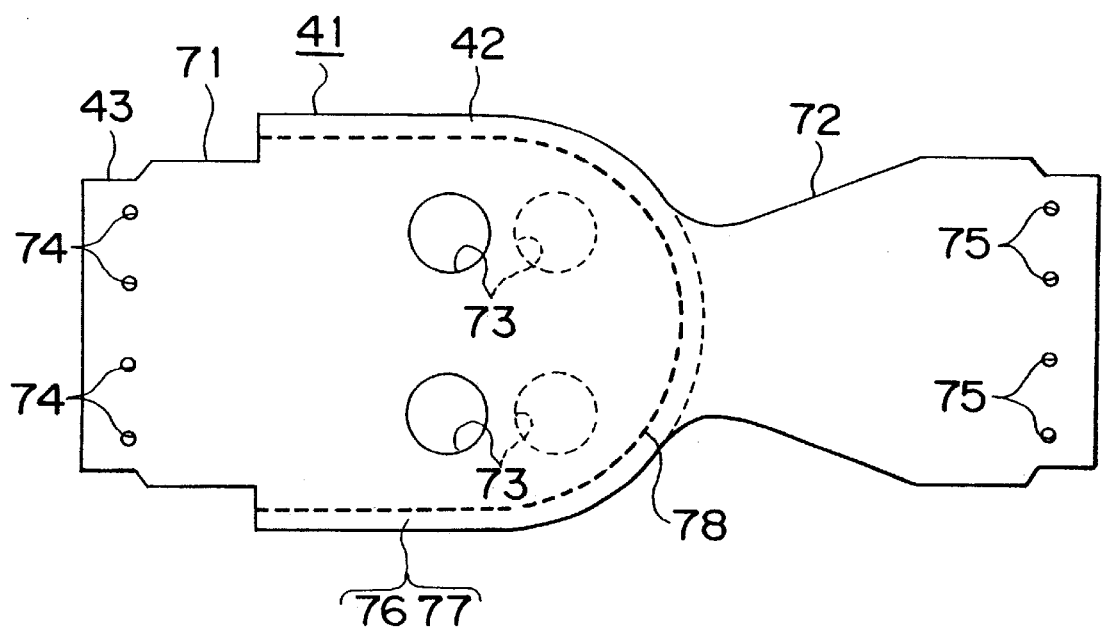
FIG. 25 is a plan view illustrating a production process of an inner bag according to a third embodiment of the invention.

In the third embodiment, the strap 72 of the inner bag 41 has been formed as an extension of a distal end portion of the left face cloth 100 or the lower face cloth 77, as shown in FIG. 25. In the production of the inner bag 41, after the upper face cloth 76 and the lower face cloth 77 are sewed together so as to form a seam 78, the upper face cloth 76 and the lower face cloth 77 are turned inside out so that the distal end portions thereof are folded inside.

Figure 26:
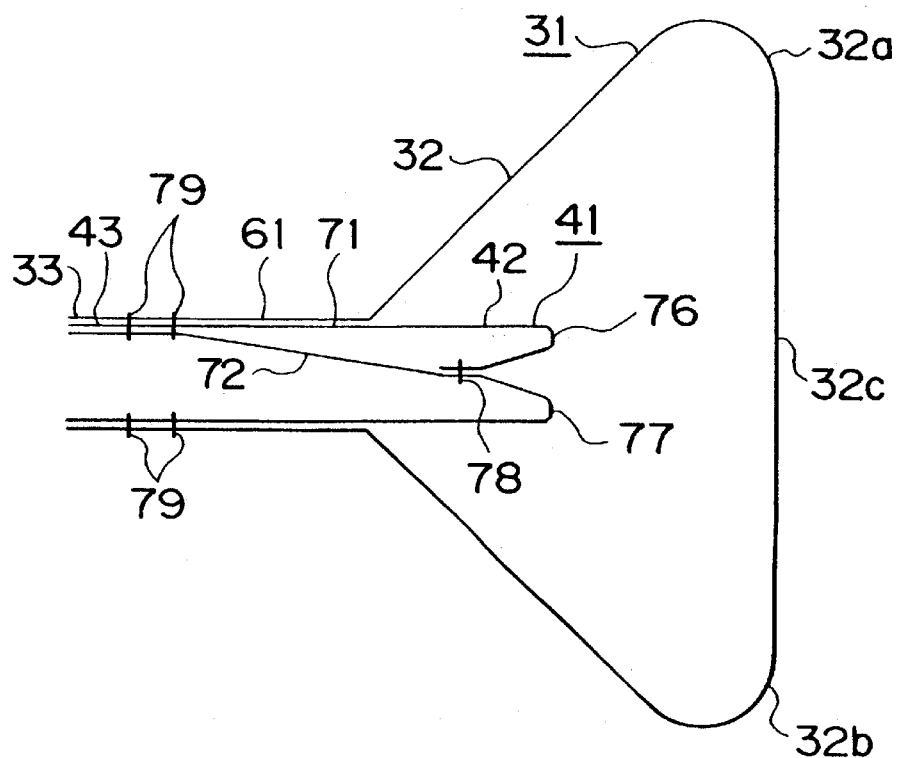
FIG. 26 is a schematic sectional view of an air bag according to the third embodiment.

After that, the inner bag 41 is inserted into the air bag 31 in substantially the same manner as in the second embodiment, and the upper and lower faces of the mounting portion 43 of the inner bag 41 are sewed to the upper and lower faces of the mounting portion 33 of the air bag 31, respectively, so as to form seams 79, as shown in FIG. 26. In this sewing process, a distal end of the strap 72 is simultaneously sewed to the upper or lower face of the mounting portion 33 of the air bag 31 on the seam 79.

Therefore, the third embodiment achieves not only substantially the same advantages as achieved by the second embodiment, but also the following advantages.

In the third embodiment, the strap 72 of the inner bag 41 is formed together with one of the upper face cloth 76 and the lower face cloth 77. Therefore, there is no need to align the strap 72 to the distal end portions of the upper face cloth 76 and the lower face cloth 77 when the upper and lower face cloths 76, 77 are sewed together so as to form the seam 78 in the production process of the inner bag 41. In this manner, this embodiment simplifies the sewing process.

Fourth Embodiment

A fourth embodiment of the invention will be described with reference to FIGS. 27 and 28.

Figure 27:
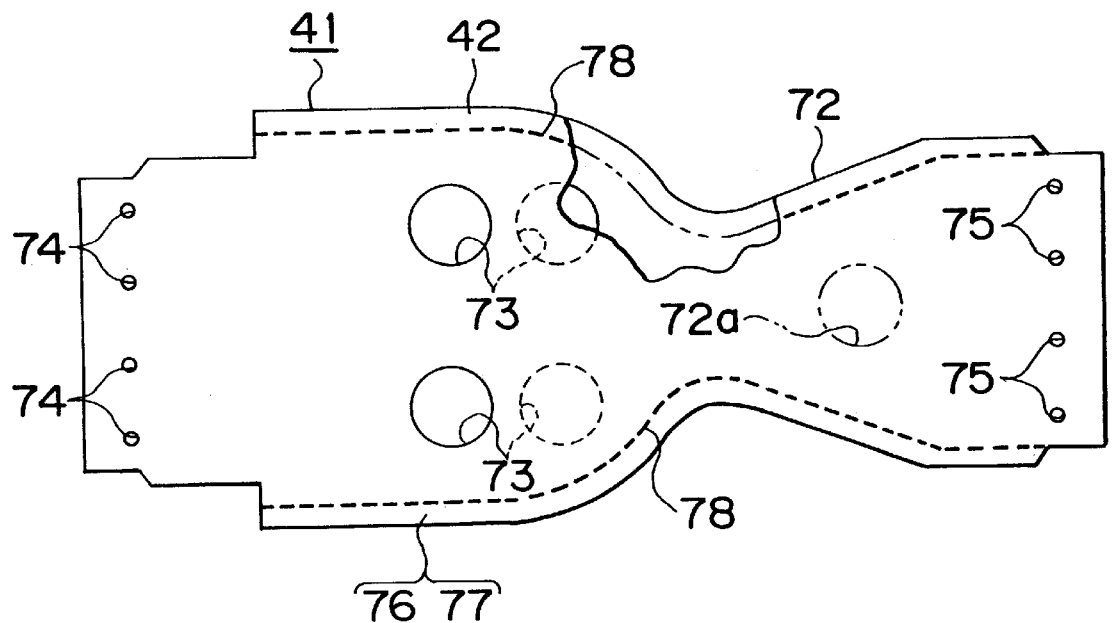
FIG. 27 is a plan view illustrating a production process of an inner bag according to a fourth embodiment of the invention.

In this embodiment, the strap 72 of the inner bag 41 has been formed as an extension of a distal end portion of each of the upper face cloth 76 and the lower face cloth 77, as shown in FIG. 27. In the production of the inner bag 41, after the upper face cloth 76 and the lower face cloth 77 are sewed together so as to form a seam 78, the upper face cloth 76 and the lower face cloth 77 are turned inside out so that the distal end portions thereof are folded inside.

Figure 28:
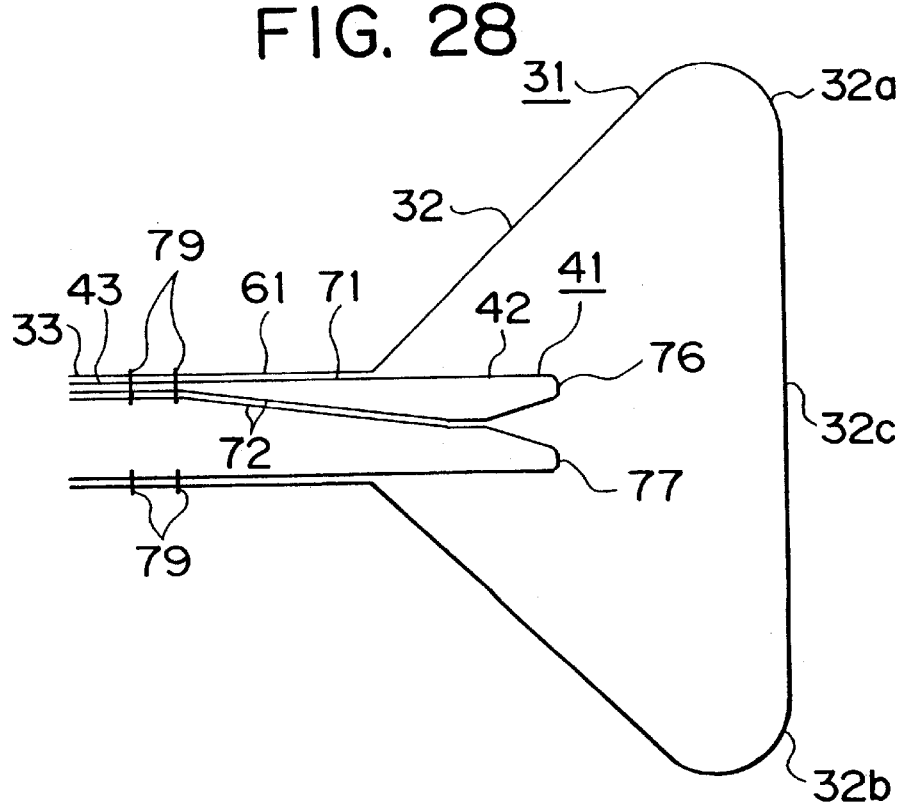
FIG. 28 is a schematic sectional view of an air bag according to the fourth embodiment.

After that, the inner bag 41 is inserted into the air bag 31 in substantially the same manner as in the second and third embodiments, and the upper and lower faces of the mounting portion 43 of the inner bag 41 are sewed to the upper and lower faces of the mounting portion 33 of the air bag 31, respectively, so as to form seams 79, as shown in FIG. 28. In this sewing process, a distal end of the strap 72 is simultaneously sewed to the upper or lower face of the mounting portion 33 of the air bag 31 on the seam 79. In the fourth embodiment, the strap 72 of the inner bag 41 has a double-layer structure.

Therefore, the fourth embodiment achieves not only substantially the same advantages as achieved by the second or third embodiment, but also the following advantages.

In the fourth embodiment, the strap 72 has a double-layer structure, so that the tensile strength of the strap 72 is enhanced. Therefore, the embodiment substantially eliminates the danger that the strap 72 may be broken by gas pressure when the bag 42 of the inner bag 41 is inflated and deployed toward an occupant by gas generated by the inflator 18.

Furthermore, since the upper face cloth 76 and the lower face cloth 77 are identical to each other, there is no need to cut the cloths in separate processes. Therefore, the cutting process can be simplified, and the production of the inner bag 41 is made easier.

The second through fourth embodiments may be modified as follows.

The number of communication holes 73 may be changed to three or less or to five or greater.

Communication holes may also be formed simply by leaving portions of the outer periphery of the upper face cloth 76 and the lower face cloth 77 unsewed.

The upper face cloth 76 and the lower face cloth 77 may be joined by using adhesive instead of sewing.

Any of the aforementioned modifications will facilitate the production of the inner bag 41.

Figure 29:
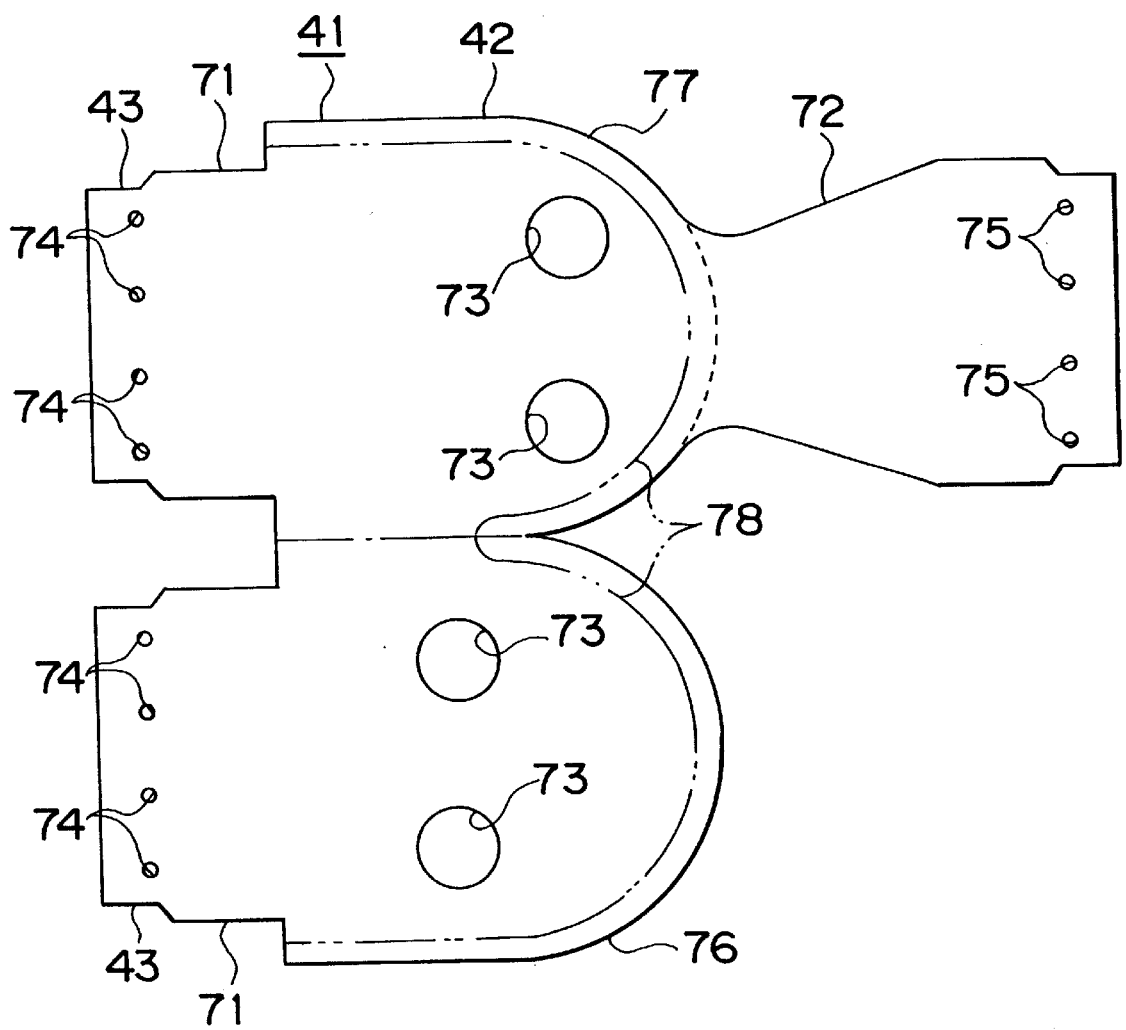
FIG. 29 is a plan view of an inner bag according to a modification of the embodiment.
Figure 30:
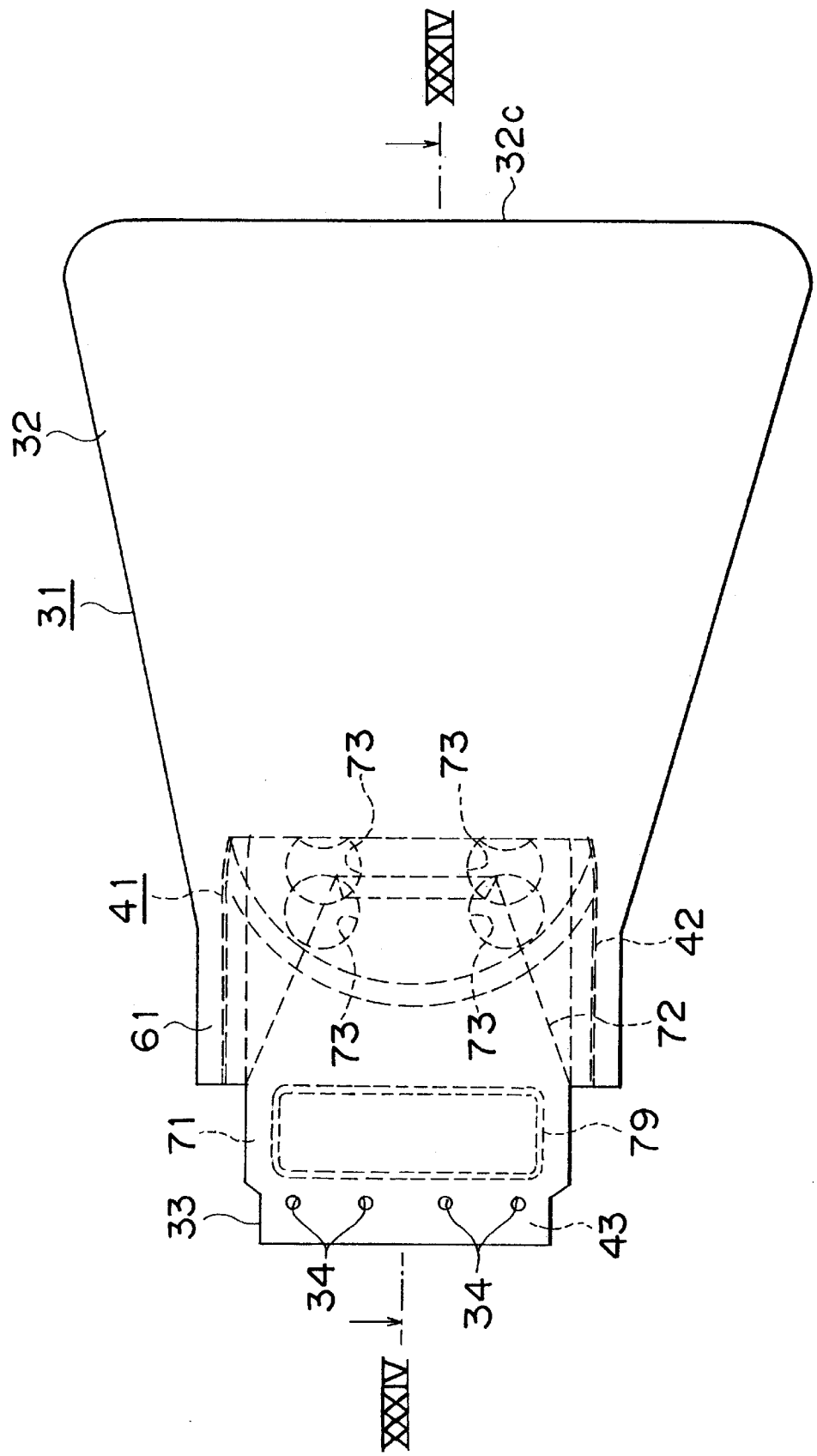
FIG. 30 is a plan view of an air bag according to a fifth embodiment of the invention.

In the second through fourth embodiments, the upper face cloth 76 and the lower face cloth 77 of the inner bag 41 may also be formed of a single cut cloth having an integrated shape as shown in FIG. 29 (wherein the cut cloth is based on the second embodiment). With this cut cloth, the inner bag 41 can easily be formed by folding it so that the upper and lower face cloths 76, 77 face each other, and by sewing them along the outer periphery thereof except for the folded portion.

In the fourth embodiment, the strap 72 may have a gas passage hole 72a as indicated by an imaginary line (two-dot line) in FIG. 27. This modification increases the freedom of gas flow between the side of the upper face cloth 76 and the side of the lower face cloth 77.

Fifth Embodiment

A fifth embodiment of the invention will be described with reference to FIGS. 30–39.

Figure 31:
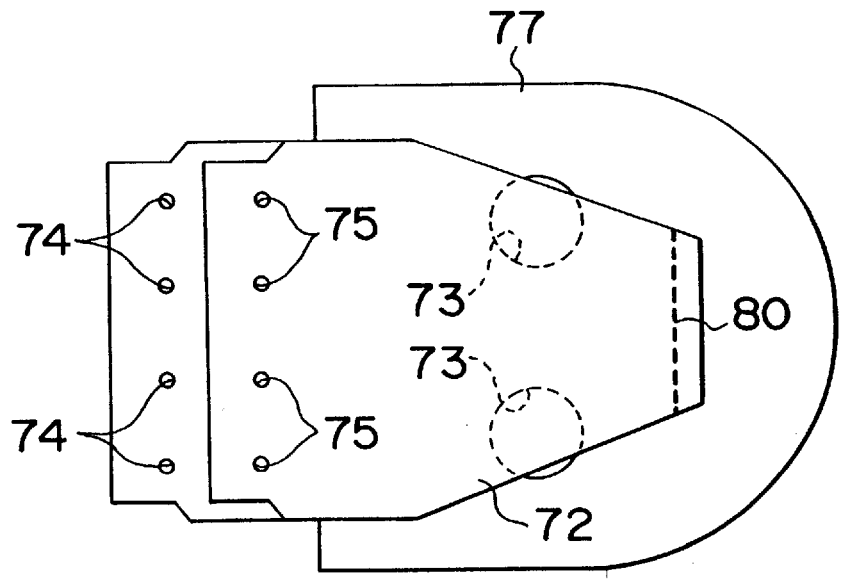
FIG. 31 is a plan view illustrating a production process of the inner bag.
Figure 32:
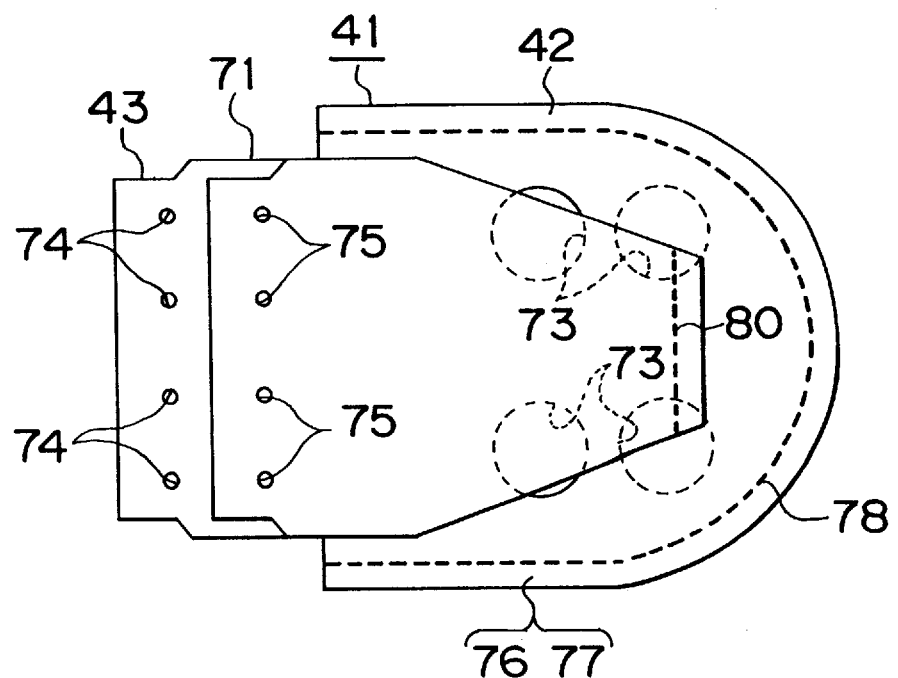
FIG. 32 is a plan view illustrating a production process that follows the process shown in FIG. 31.
Figure 33:
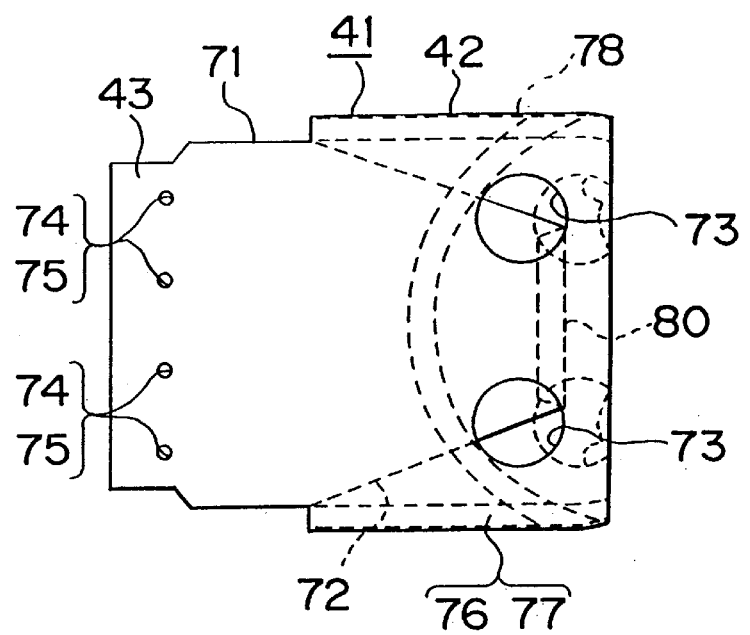
FIG. 33 is a plan view illustrating a production process that follows the process shown in FIG. 32.
Figure 37:
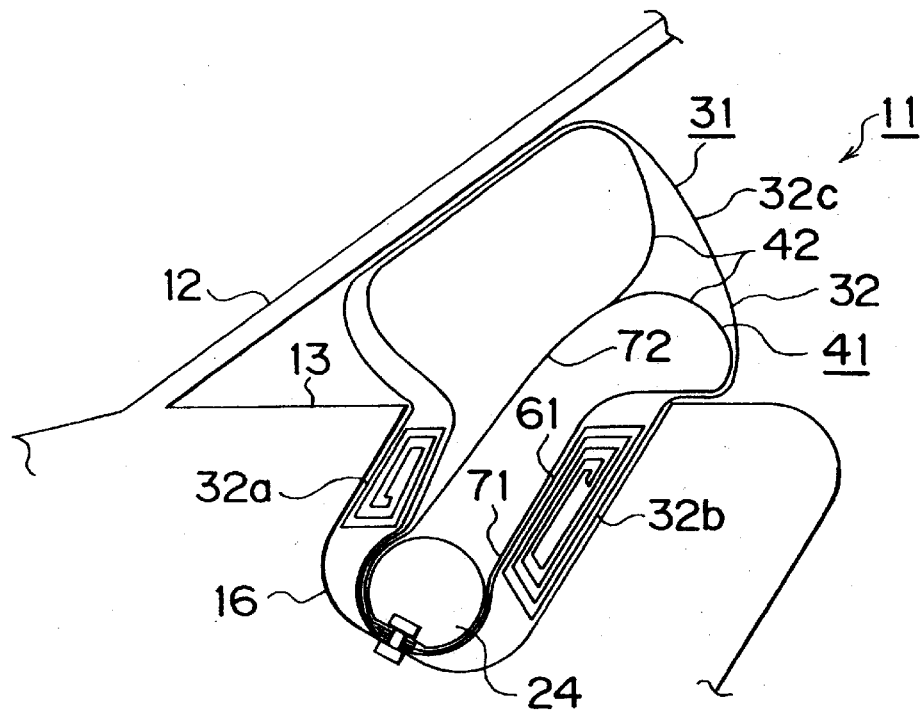
FIG. 37 is a schematic sectional view of the air bag apparatus in a deploying state that follows the state shown in FIG. 36.
Figure 38:
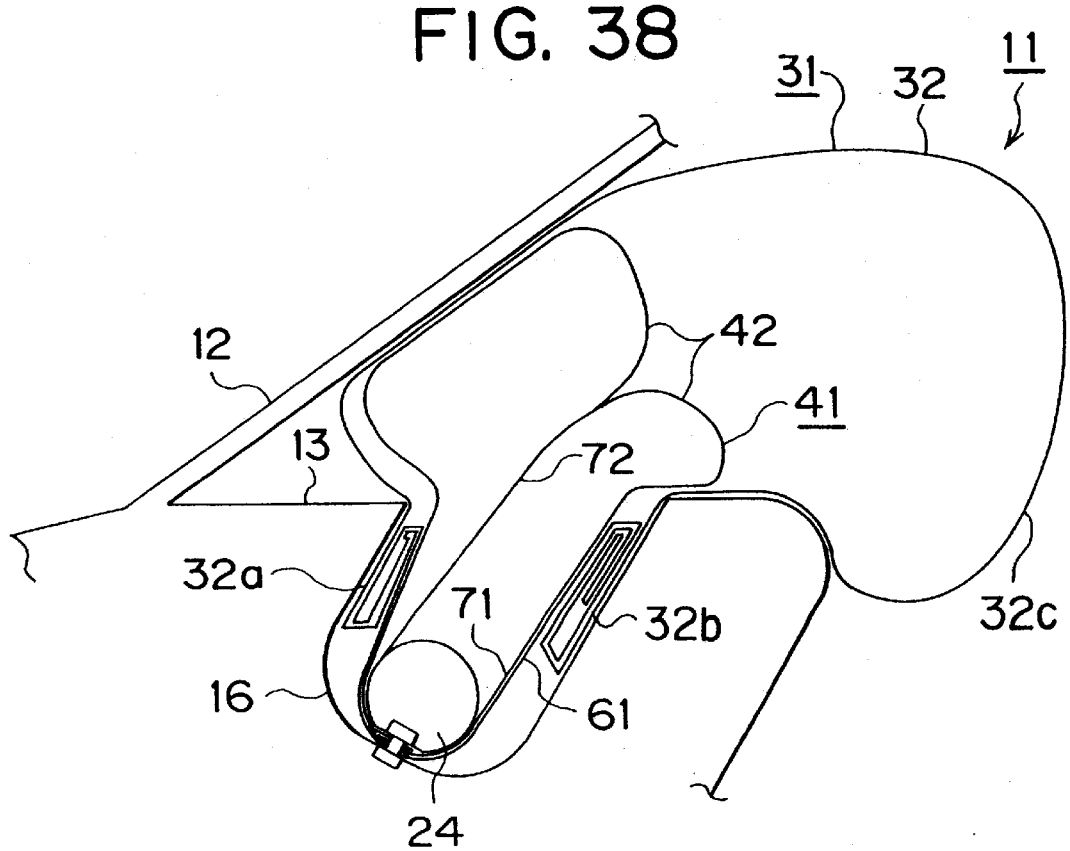
FIG. 38 is a schematic sectional view of the air bag apparatus in a deploying state that follows the state shown in FIG. 37.
Figure 39:
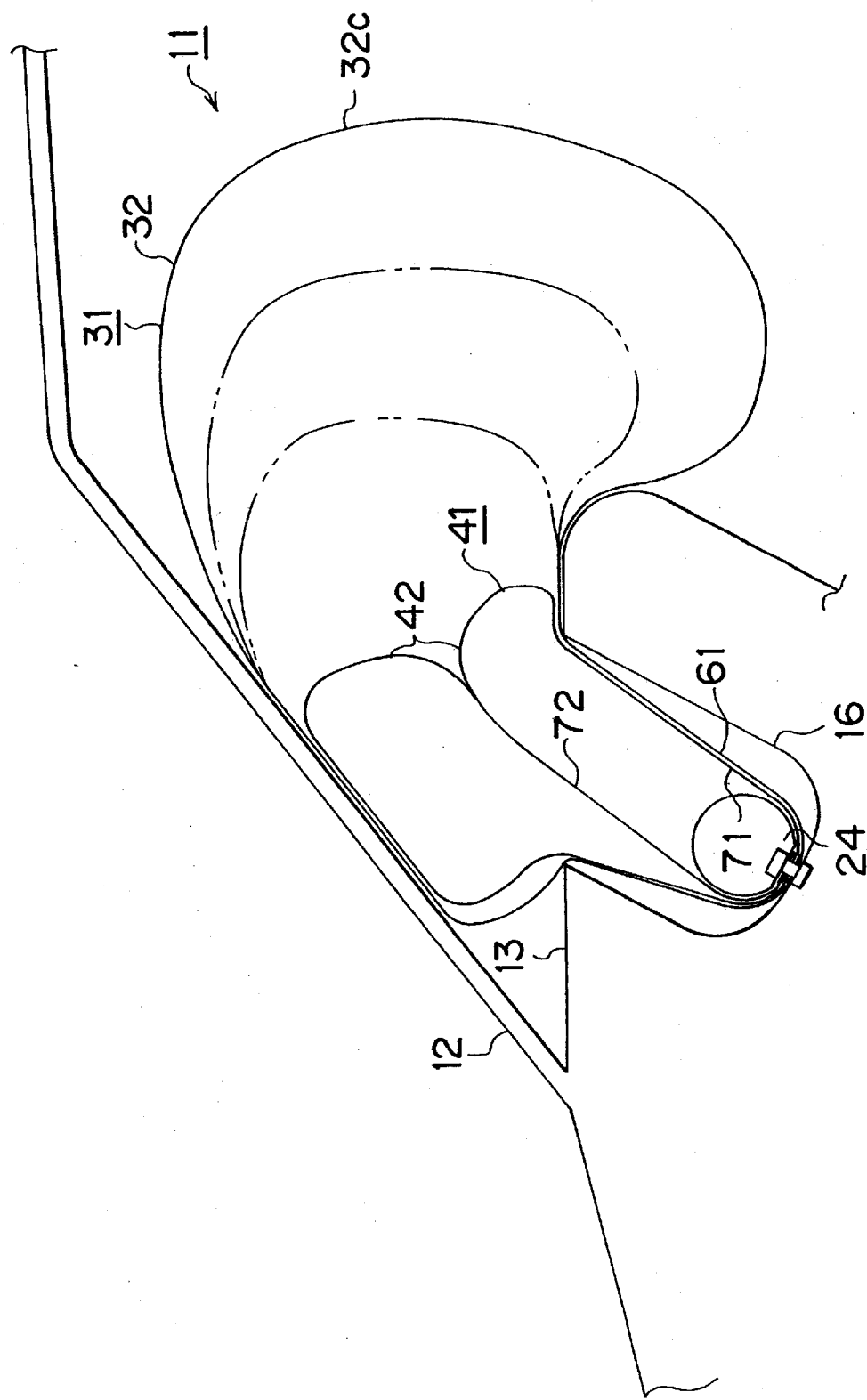
FIG. 39 is a schematic sectional view of the air bag apparatus in a deploying state that follows the state shown in FIG. 38.

In the fifth embodiment, the strap 72 disposed in an inner bag 41 is shifted toward a lower side of the inner bag 41 so that an upper portion of the bag 42 of the inner bag 41 will be inflated to a greater size than the lower portion thereof, as shown in FIGS. 37–39. To produce this inner bag 41, a distal end of the strap 72 is positioned to a portion of the lower face cloth 77 toward the center thereof, instead of the distal end thereof, as shown in FIG. 31. While being held in this position, the strap 72 is sewed to the lower face cloth 77 so as to form a seam 80. Subsequently, the lower face cloth 77 and the upper face cloth 76 are sewed together so as to form a seam 78 as shown in FIG. 32. The upper and lower face cloths 76, 77 are then turned inside out so that distal end portions thereof are folded inside, as shown in FIG. 33.

Figure 34:
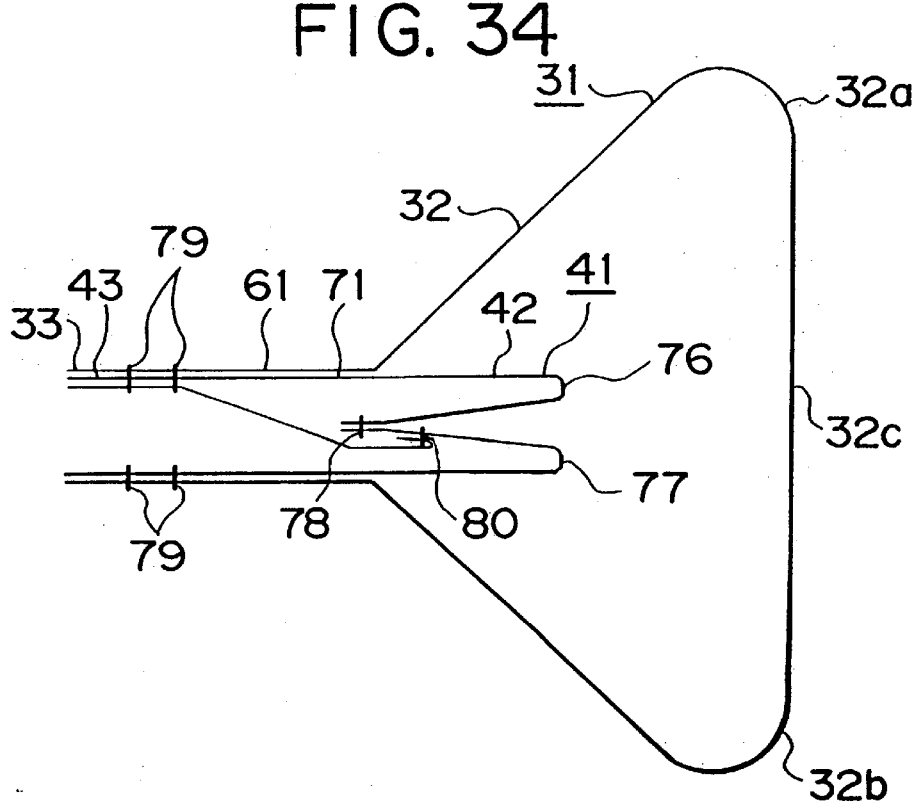
FIG. 34 is a schematic sectional view taken along line XXXIV—XXXIV of FIG. 30.

After the inner bag 41 is inserted into the air bag 31 as in the second embodiment, the upper and lower faces of the mounting portion 43 of the inner bag 41 are sewed to the upper and lower faces of the mounting portion 33 of the air bag 31 so as to form seams 79, as shown in FIG. 34. In this sewing process, an end of the strap 72 is simultaneously sewed to the upper face of the mounting portion 33 of the air bag 31 on the seam 79. Therefore, the strap 72 inside the inner bag 41 is shifted to the side of the lower face cloth 77, instead of being disposed at an intermediate position between the upper and lower face cloths 76, 77.

Figure 35:
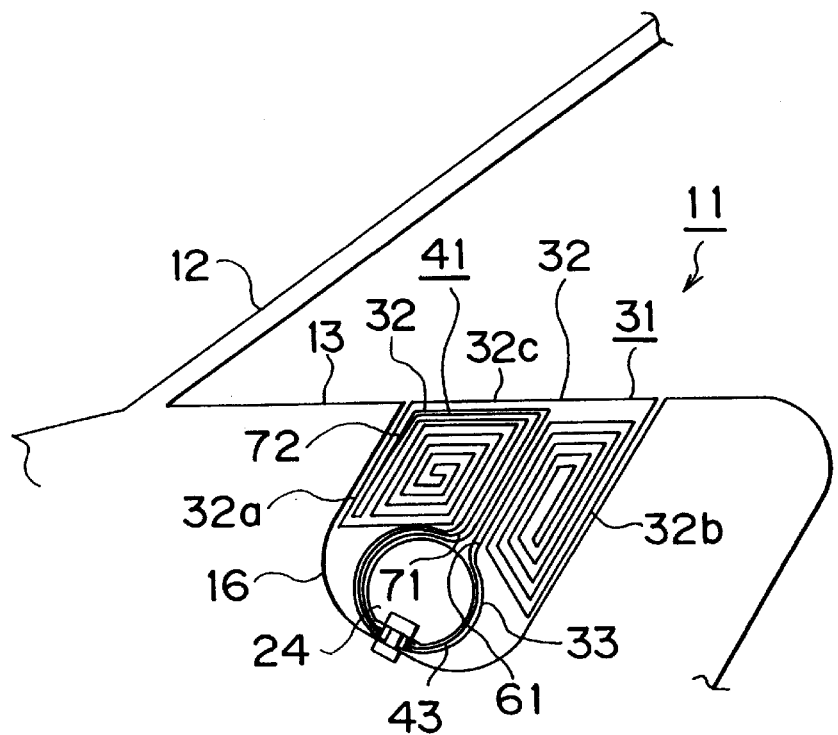
FIG. 35 is a schematic sectional view of an air bag apparatus of the fifth embodiment, taken on a fore-to-aft extending plane, wherein the apparatus is installed.
Figure 36:
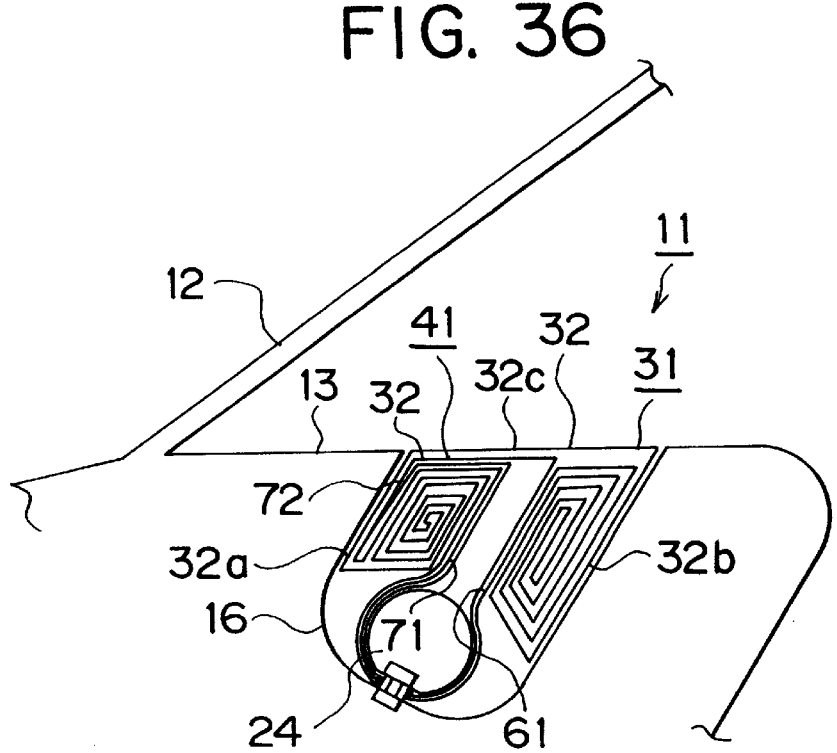
FIG. 36 is a schematic sectional view of the air bag apparatus in an early state of the deployment.

The Passenger seat-side air bag apparatus 11 of this embodiment is installed in an upper portion of the instrument panel 13 as shown in FIG. 35. When gas is produced from the inflator 18, the inner bag 41 is inflated and, subsequently, the air bag 31 is deployed, substantially in the same manner as in the second embodiment. That is, the mouth portion 71 of the inner bag 41 is first expanded, as shown in FIG. 36, so that the forward portion 32a and the rearward portion 32b of the bag 32 of the air bag 31 are pressed against the opposite internal surfaces of the case 16. As the inner bag 41 is deployed, the central portion 32c of the bag 32 starts to be deployed.

Subsequently, the bag 42 of the inner bag 41 is inflated to a final deployment shape as shown in FIG. 37 so that the bag 32 of the air bag 31 are pressed against the front windshield 12 and the instrument panel 13. Since the strap 72 inside the inner bag 41 is shifted to the side of the lower face cloth 77 of the inner bag 41, the upper portion of the bag 42 of the inner bag 41 is inflated to a greater size than the lower portion thereof. As a result, the area in the forward portion 32a of the bag 32 of the air bag 31 pressed against the front windshield 12 is larger than the area in the rearward portion 32b that is pressed against the instrument panel 13.

As more gas is introduced into the air bag 31 through the communication holes 73 of the inner bag 41, the forward portion 32a and the rearward portion 32b of the bag 32 of the air bag 31 are progressively pulled out of the case 16 as shown in FIG. 38 until the air bag 31 is deployed to a final deployment shape indicated by a solid line in FIG. 39. Since face areas of the bag 32 of the air bag 31 are pressed against the front windshield 12 and the instrument panel 13 by the bag 42 of the inner bag 41 during the deployment of the air bag 31, sliding resistance occurs therebetween so that the deploying speed of the bag 32 is reduced. The deploying speed of the forward portion 32a of the bag 32 is particularly effectively reduced since the area in the forward portion 32a pressed against the front windshield 12 by the bag 42 is relatively large.

Therefore, the fifth embodiment achieves substantially the same advantages as achieved by the second embodiment and, in addition, the following advantages.

In this embodiment, the strap 72 is shifted from a central position inside the inner bag 41 so that the upper portion of the inner bag 41 will be inflated to a greater size than the lower portion thereof. Therefore, even if the front windshield 12 is far apart from the instrument panel 13, the embodiment ensures that a large area in the forward portion 32a of the air bag 31 will be pressed against the front windshield 12 by the bag 42 of the inner bag 41, thereby effectively reducing the deploying speed of the upper portion of the air bag 31.

The fifth embodiment may also be modified as follows.

The lower face cloth 77 of the inner bag 41 may be shorter in the fore-to-aft direction than the upper face cloth 76. The upper and lower face cloths 76, 77 are sewed together, with the mounting portions 33 thereof being aligned to each other. The strap 72 is provided as a portion extending from the distal end of the upper and lower face cloths 76, 77, so that the upper and lower portions of the bag 42 divided by the seam and the strap 72 will be inflated to different sizes.

Sixth Embodiment

A sixth embodiment of the invention will be described with reference to FIGS. 40–43.

Figure 40:
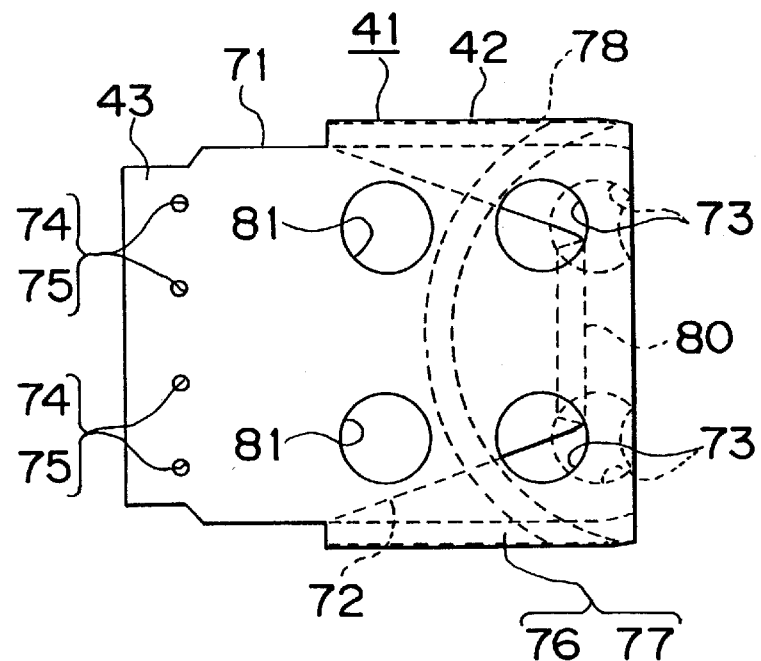
FIG. 40 is a plan view of an inner bag according to a sixth embodiment of the invention.

In the sixth embodiment, the upper face cloth 76 of the bag 42 of the inner bag 41 as in the fifth embodiment has forward communication holes 81 in addition to the right and left communication holes 73, as shown in FIG. 40. When gas flows into the inner bag 41 from the inflator 18, gas is supplied into the air bag 31 not only through the communication holes 73 but also through the forward communication holes 81. Gas through the forward communication holes 81 is mainly supplied to a forward lower portion of the air bag 31.

Figure 41:
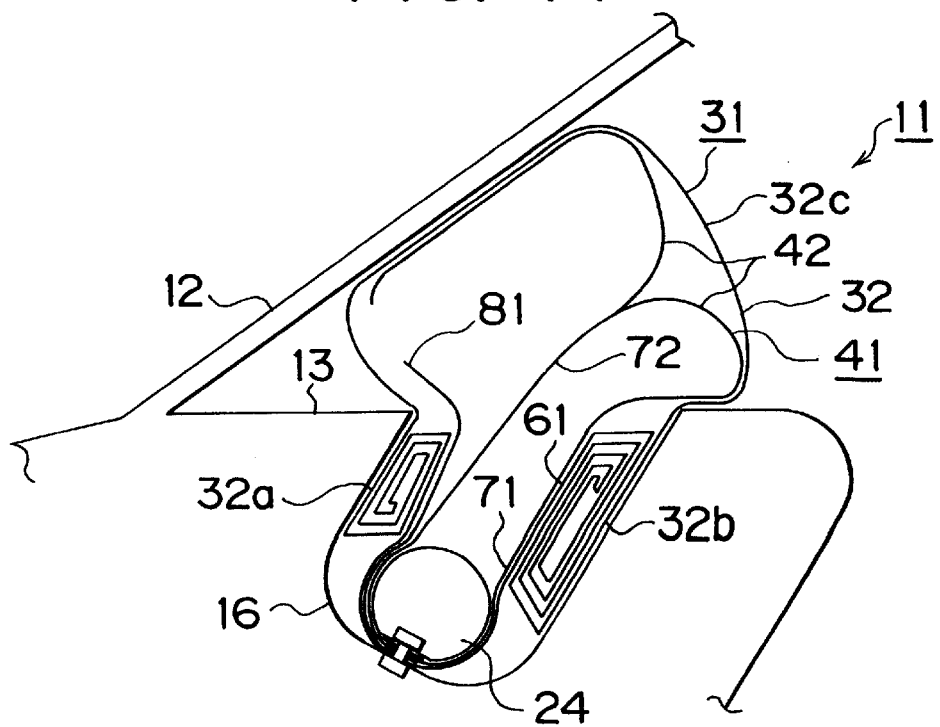
FIG. 41 is a schematic sectional view of an air bag apparatus of the sixth embodiment, illustrating a deploying state thereof.
Figure 42:
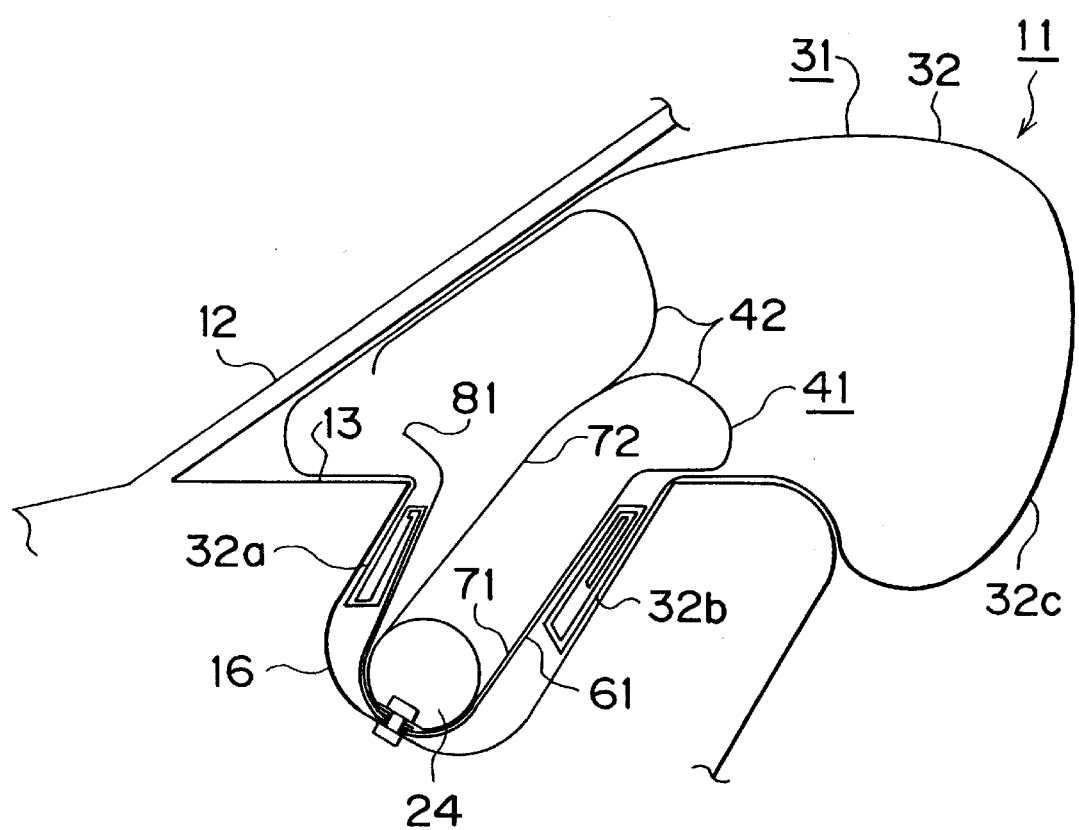
FIG. 42 is a schematic sectional view of the air bag apparatus in a deploying state that follows the state shown in FIG. 41.
Figure 43:
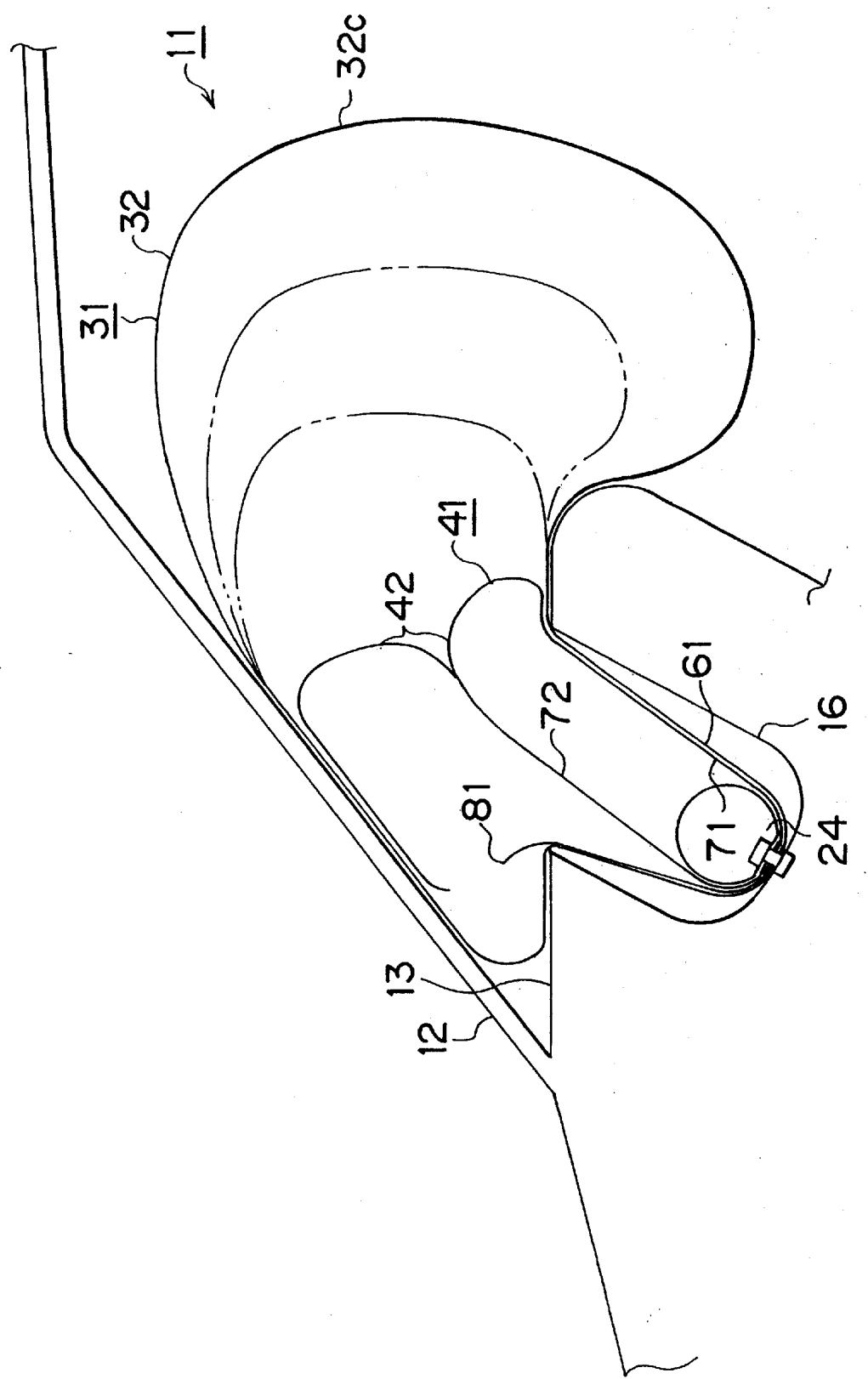
FIG. 43 is a schematic sectional view of the air bag apparatus in a deploying state that follows the state shown in FIG. 42.

Therefore, when the inner bag 41 is inflated by gas from the inflator 18, the bag 32 of the air bag 31 is inflated forward downward by gas supplied through the forward communication holes 81 as shown in FIG. 41–43, so that an increased portion of the bag 32 of the air bag 31 is pressed into a corner defined by the front windshield 12 and the instrument panel 13 and therefore pressed against the front windshield 12 and the instrument panel 13 by gas supplied thereinto. Therefore, the sliding resistance caused when the forward portion 32a of the bag 32 of the air bag 31 is pulled out of the case 16 is further increased. Consequently, the deploying speed of the air bag 31 is further reduced.

Therefore, in addition to substantially the same advantages as achieved by the second through fifth embodiments, the sixth embodiment achieves the following advantages.

In the sixth embodiment, the inner bag 41 has the forward communication holes 81 for letting gas out in a forward downward direction, so that the air bag 31 is deployed also in a forward direction. Therefore, the air bag 31 is also pressed, at a forward side, against the front windshield 12 and the instrument panel 13, thereby further reducing the deploying speed of the air bag 31.

The sixth embodiment may be modified in the following manners.

The number of forward communication holes 81 may be reduced to one or increased to three or greater.

A dust portion may be provided extending forward downward from one of the forward communication holes 81.

This modification ensures that gas will be delivered into a forward downward portion of the air bag 31.

Seventh Embodiment

A seventh embodiment of the invention will be described with reference to FIGS. 44–53.

Figure 45:
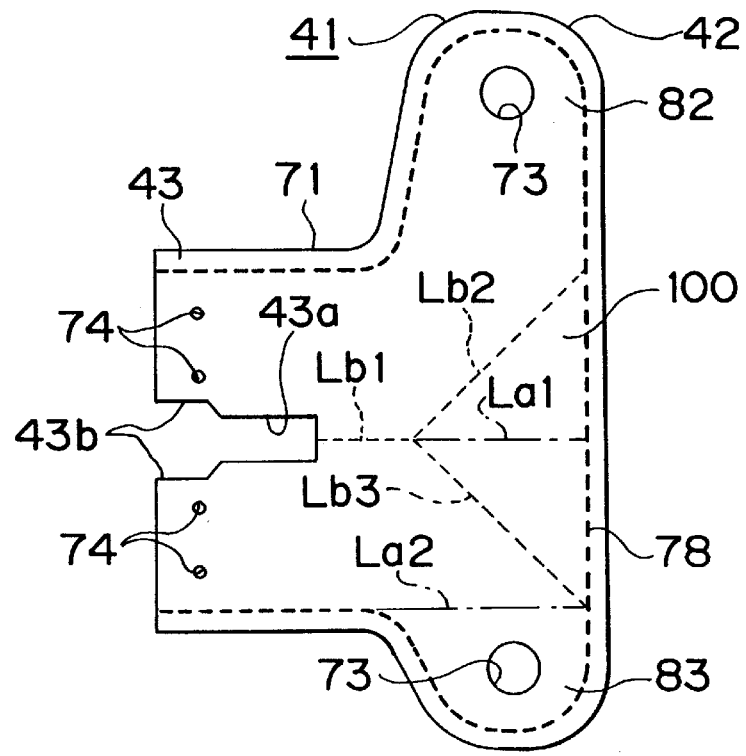
FIG. 45 is a left-side plan view illustrating a step of folding an inner bag.
Figure 46:
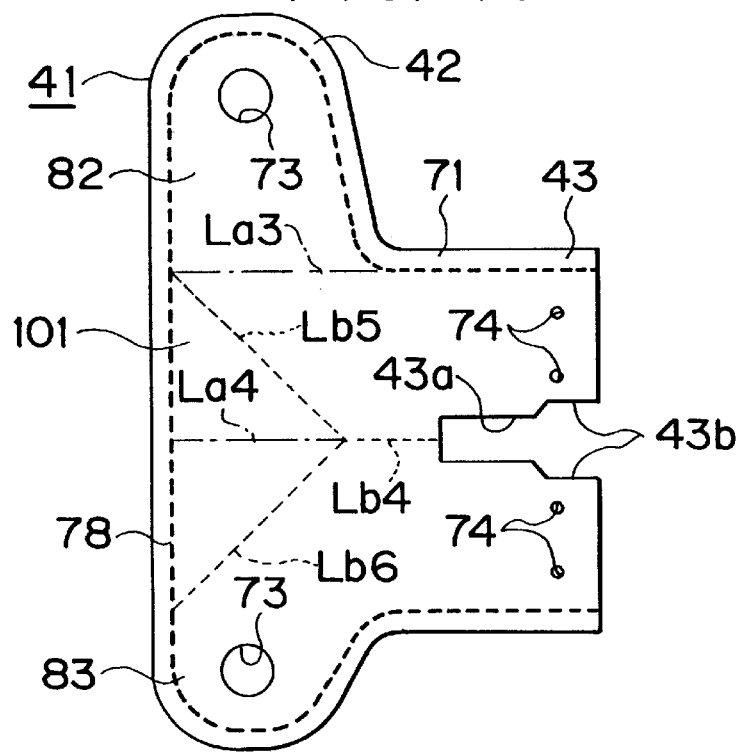
FIG. 46 is a right-side plan view of the inner bag in the folding step illustrated in FIG. 45.

In the seventh embodiment, the inner bag 41 is formed by sewing the left face cloth 100 and the right face cloth 101 along a seam 78 as shown in FIGS. 45 and 46. In this embodiment, the left face cloth 100 and the right face cloth 101 do not actually face upward and downward when disposed in the passenger-side air bag apparatus 11, but the terms are still used to separately refer to the two cloths of the bag 42 of the inner bag 41. The bag 42 of the inner bag 41 has an upper protruded portion 82 and a lower protruded portion 83 that are protruded upward and downward (when in the passenger seat-side air bag apparatus 11). A distal end of the bag 42 (that faces rearward when inflated) connecting between the upper and lower protruded portions 82 and 83 is substantially straight. The upper protruded portion 82 is larger than the lower protruded portion 83. The mounting portion 43 of each of the left and right face cloths 100, 101 has a cutout 43a.

Figure 47:
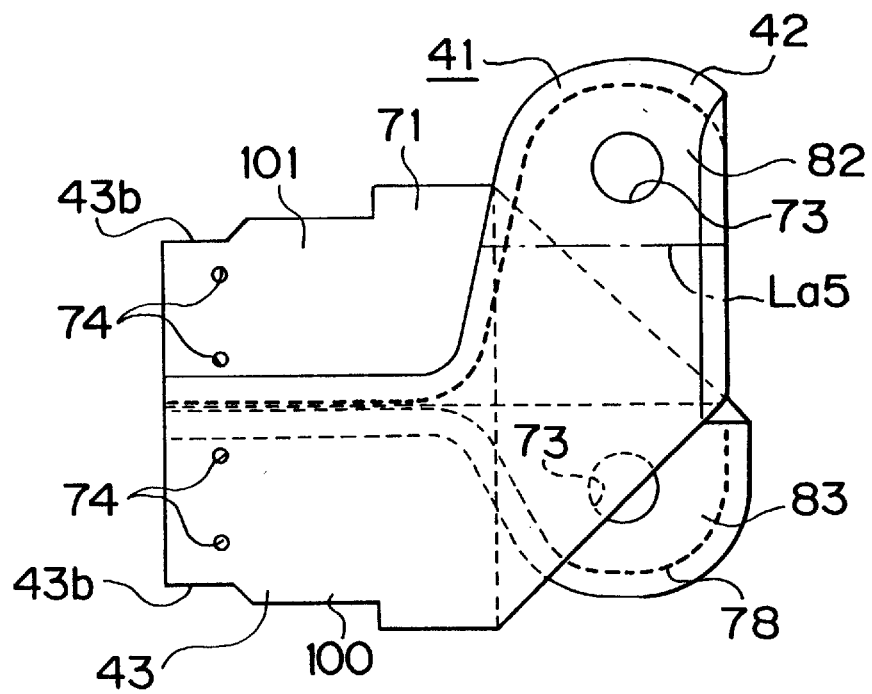
FIG. 47 is a top plan view of the inner bag, illustrating a folding step that follows the step shown in FIG. 45.
Figure 48:
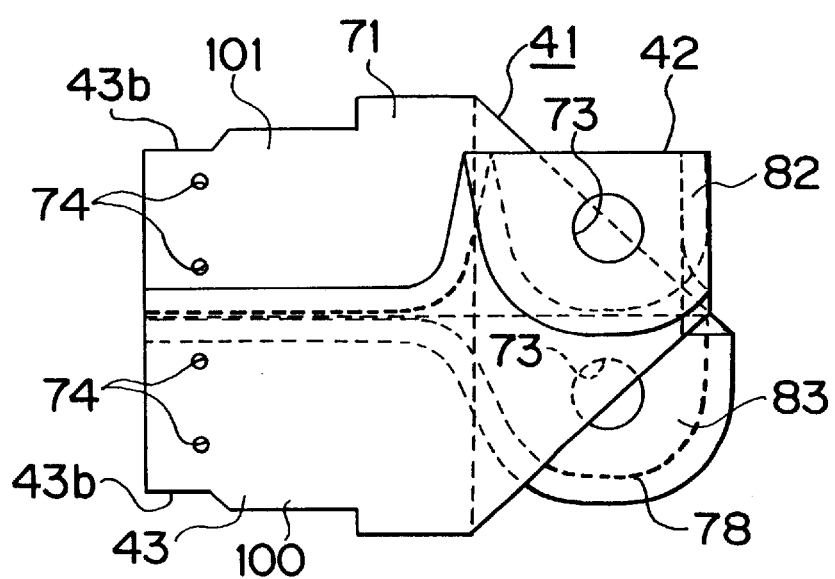
FIG. 48 is a top plan view of the inner bag, illustrating a folding step that follows the step shown in FIG. 47.

In the folding process, the inner bag 41 is folded separately from the air bag 31 in the following manner. First, the left face cloth 100 is folded, as indicated in FIG. 45, along folding lines L$a$1, L$a$2 in a channel folding manner, and along folding lines L$b$1, L$b$2, L$b$3 in a ridge folding manner. Simultaneously, the right face cloth 101 is folded, as indicated in FIG. 46, along folding lines L$a$3, L$a$4 in a channel folding manner, and along folding lines L$b$4, L$b$5, L$b$6 in a ridge folding manner. The inner bag 41 is thereby folded into a shape as shown in FIG. 47. Subsequently, the upper protruded portion 82 is channel-folded along a folding line L$a$5 so as to form a shape as shown in FIG. 48. When the inner bag 41 is thus folded, the edge 43$b$ of each cutout 43$a$ forms rightward or leftward outer edge of the mounting portion 43, and the seam 78 extends through substantially the middle of the mounting portion 43. In this folded state, the upper protruded portion 82 and the lower protruded portion 83 vertically overlap each other.

When the thus-folded bag 42 is inflated and deployed, the left face cloth 100 and the right face cloth 101 come to face in the transverse directions relative to the vehicle. Therefore, the bag 42 is inflated and deployed mainly upward and downward. Since the upper protruded portion 82 is larger in size than the lower protruded portion 83, the bag 42 becomes larger in an upper portion than in a lower portion thereof when inflated. Further, since the distal end of the bag 42 that faces rearward when the bag 42 is deployed is substantially straight, the bag 42 does not protrude toward an occupant to a significant extent when it is deployed.

Figure 44:
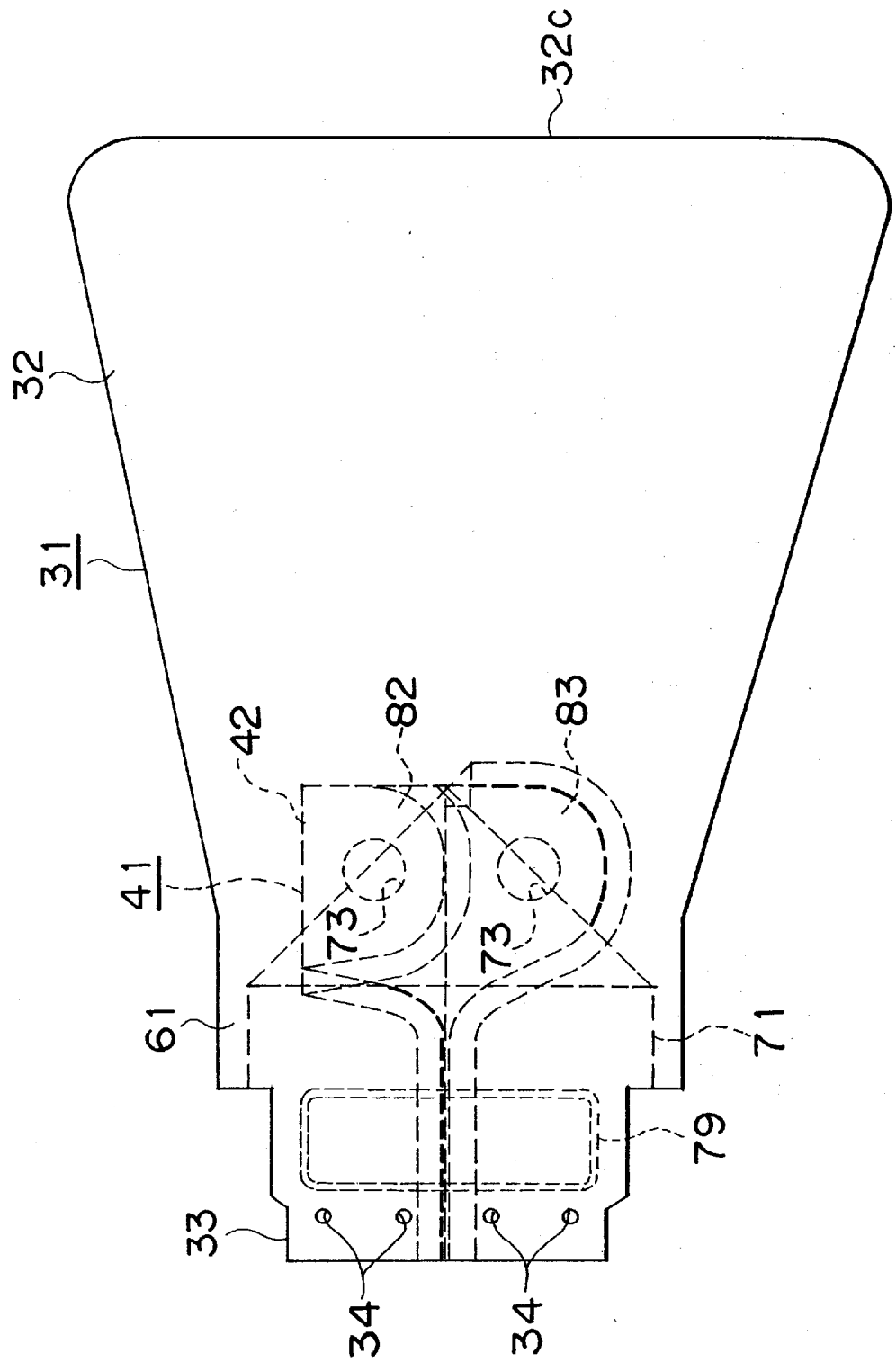
FIG. 44 is a plan view of an air bag according to a seventh embodiment of the invention.
Figure 49:
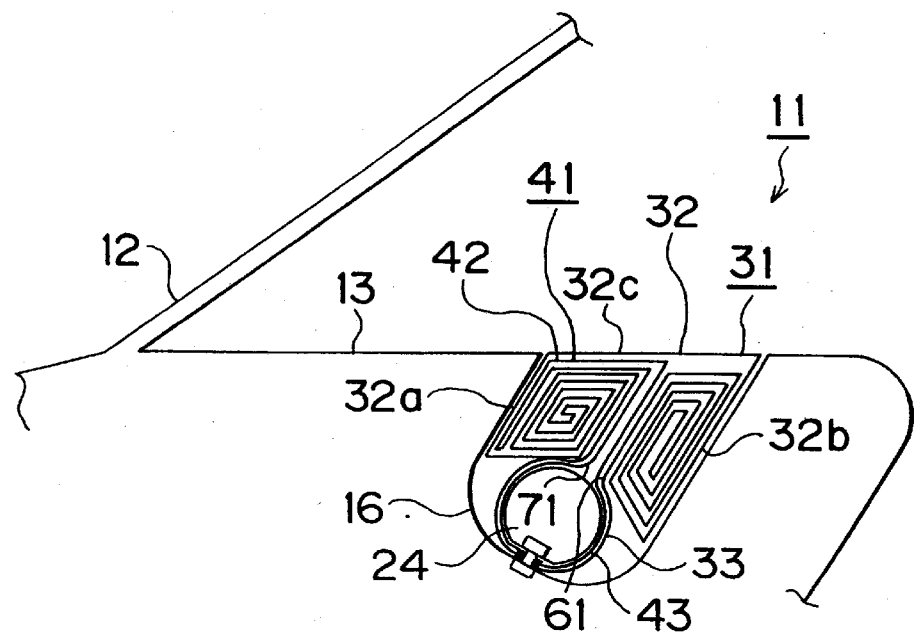
FIG. 49 is a schematic sectional view of an air bag apparatus according to the seventh embodiment, taken along a fore-to-aft extending plane, wherein the apparatus is installed.

While maintained in this folded state, the inner bag 41 is inserted into the air bag 31 as shown in FIG. 44. The upper and lower faces of the mounting portion 43 of the inner bag 41 are sewed to the upper and lower faces of the mounting portion 33 of the air bag 31, respectively, along seams 79. After the air bag 31 is folded in substantially the same procedure as in the second embodiment, the air bag 31 is placed together with the inflator 18 inside the case 16. The passenger seat-side air bag apparatus 11 is installed in an upper portion inside the instrument panel 13 of a vehicle as shown in FIG. 49.

Figure 50:
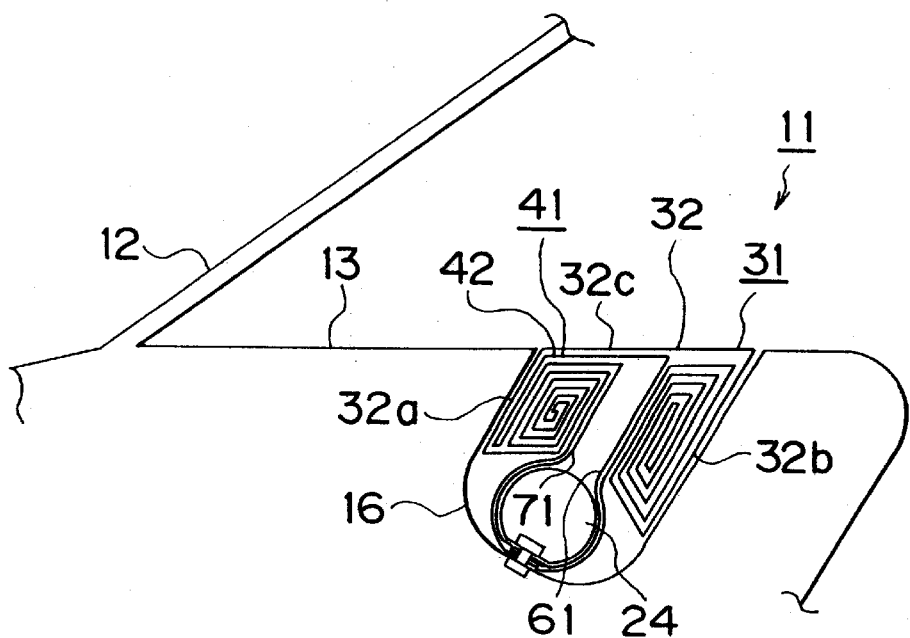
FIG. 50 is a schematic sectional view of the air bag apparatus in an early state of the deployment.

When gas is produced from the inflator 18 of the passenger seat-side air bag apparatus 11 of this embodiment, the inner bag 41 is first inflated and, after that, the air bag 31 is deployed, as in the second embodiment. That is, the mouth portion 71 of the inner bag 41 is first expanded as shown in FIG. 50 so that the folded forward portion 32$a$ and the folded rearward portion 32$b$ of the bag 32 of the air bag 31 are pressed against the opposite inner surfaces of the case 16. As the inner bag 41 is deployed from this state, the central portion 32$c$ of the bag 32 of the air bag 31 starts to be deployed.

Figure 51:
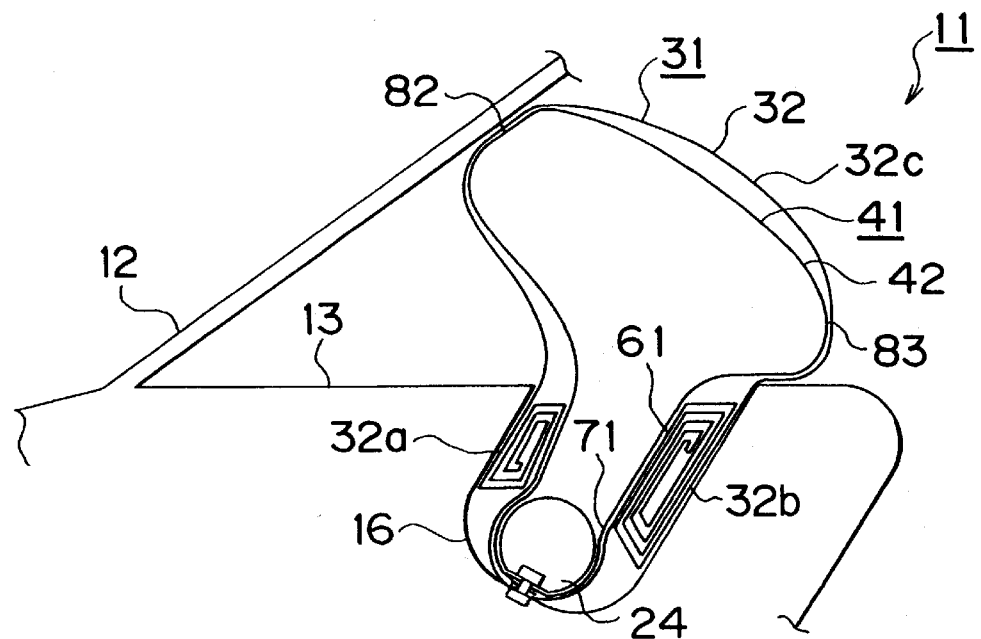
FIG. 51 is a schematic sectional view of the air bag apparatus in a deploying state that follows the state shown in FIG. 50.

Subsequently, the bag 42 of the inner bag 41 is inflated to a final deployment shape as shown in FIG. 51 so that portions of the bag 32 of the air bag 31 are pressed against the front windshield 12 and the instrument panel 13. Owing to the upper protruded portion 82 and the lower protruded portion 83 of the bag 42 of the inner bag 41, the bag 42 is inflated to great extents mainly in upward and downward directions. Further, since the upper protruded portion 82 is designed to have a greater amount of protrusion than the lower protruded portion 83, the bag 42 is inflated and deployed to a greater extent at an upper side than at a lower side thereof. As a result, a relatively large area in the forward portion 32$a$ of the bag 32 of the air bag 31 is pressed against the front windshield 12.

Figure 52:
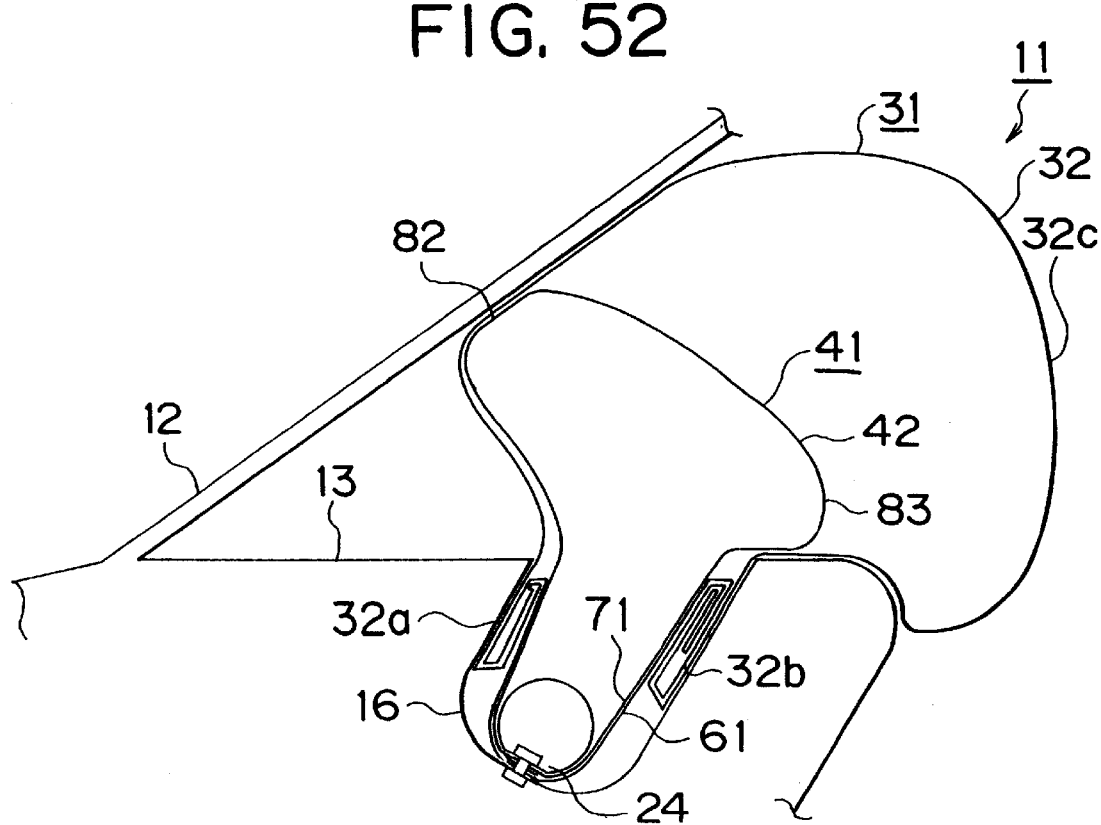
FIG. 52 is a schematic sectional view of the air bag apparatus in a deploying state that follows the state shown in FIG. 51.
Figure 53:
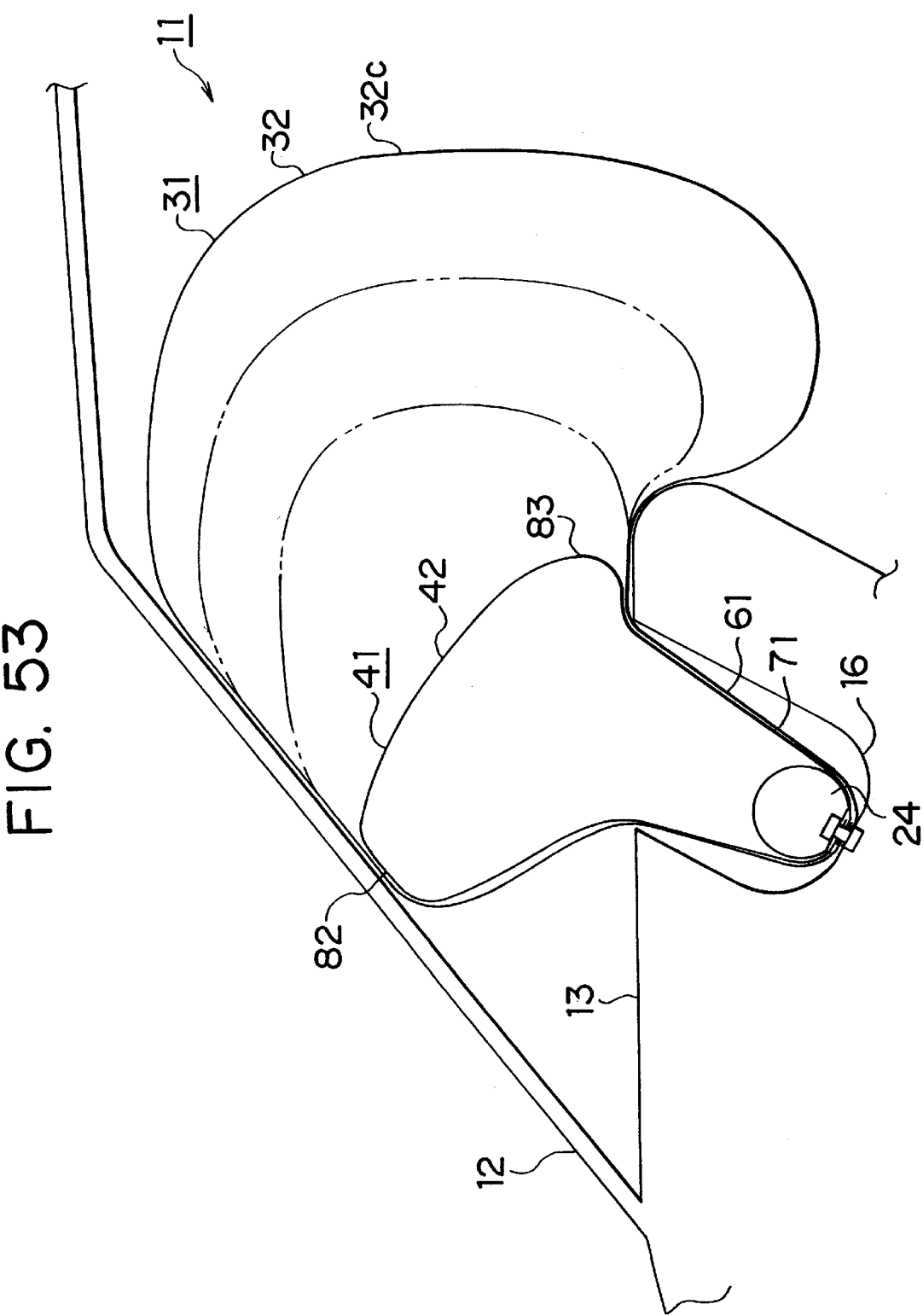
FIG. 53 is a schematic sectional view of the air bag apparatus in a deploying state that follows the state shown in FIG. 52.

As more gas is introduced into the air bag 31 through the mounting portion 43 of the inner bag 41, the bag 32 and the rearward portion 32$b$ of the bag 32 of the air bag 31 is progressively pulled out of the case 16 as shown in FIG. 52 until the bag 32 of the air bag 31 is deployed into a final deployment shape as shown in FIG. 53. Since portions of the bag 32 are pressed against the front windshield 12 and the instrument panel 13, sliding resistance occurs therebetween as the bag 32 is deployed, so that the deploying speed of the bag 32 is reduced. In particular, the deploying speed of the forward portion 32$a$ of the bag 32 is effectively reduced since a relatively large area in the forward portion 32$a$ of the bag 32 is pressed against the front windshield 12.

Therefore, in addition to substantially the same advantages of the second embodiment, the seventh embodiment further achieves the following advantages.

In the seventh embodiment, the inner bag 41 has the upper protruded portion 82 and the lower protruded portion 83, so that the inner bag 41 is deployed mainly in upward and downward directions. Therefore, there is no need to provide inside the inner bag 41 a restriction member, such as the strap 72, for restricting the amount of inflation of a central portion of the inner bag 41, so that the construction of the inner bag 41 can be simplified. Furthermore, since the inflation of the upper protruded portion 82 and the lower protruded portion 83 of the inner bag 41 more effectively presses the forward portion 32$a$ and the rearward portion 32$b$ of the air bag 31 against the front windshield 12 and the instrument panel 13, the deploying speed of the air bag 31 can be more effectively reduced.

In this embodiment, the upper protruded portion 82 of the inner bag 41 is designed to be inflated to a greater size than the lower protruded portion 83. Therefore, even if the air bag 31 and the front windshield 12 are far apart from each other, it is possible to secure a large area of an upper portion of the air bag 31 that is pressed against the front windshield 12. Consequently, the deploying speed of an upper portion of the air bag 31 can be effectively reduced.

Eighth Embodiment

An eighth embodiment of the invention will be described with reference to FIGS. 54–57.

Figure 54:
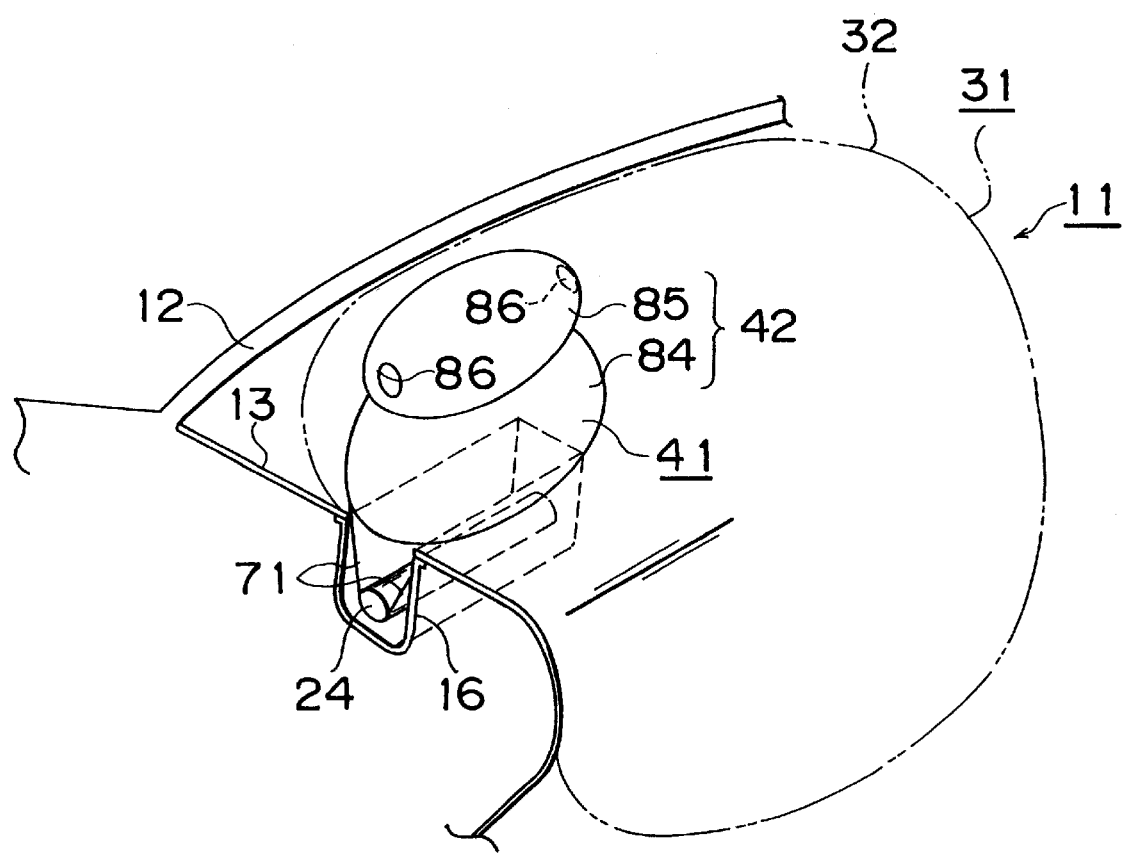
FIG. 54 is a perspective view of an air bag apparatus for a passenger seat according to an eighth embodiment of the invention.

Referring to FIG. 54, the bag 42 of the inner bag 41 in the eighth embodiment has a gourd-like sectional shape formed by a first inflating portion 84 and a second inflating portion 85 each having a generally ellipsoid shape. The second inflation portion 85 is disposed on top of the first inflating portion 84, and communicates with the first inflating portion 84. The second inflating portion 85 has in transversely opposite end portions thereof a pair of communication holes 86 for supplying gas therefrom into the air bag 31. The first inflating portion 84 is larger than the second inflating portion 85.

This inner bag 41 is disposed in the air bag 31. The inner bag 41 and the air bag 31 are fixed in the case 16 and folded therein as in the second embodiment.

Figure 55:
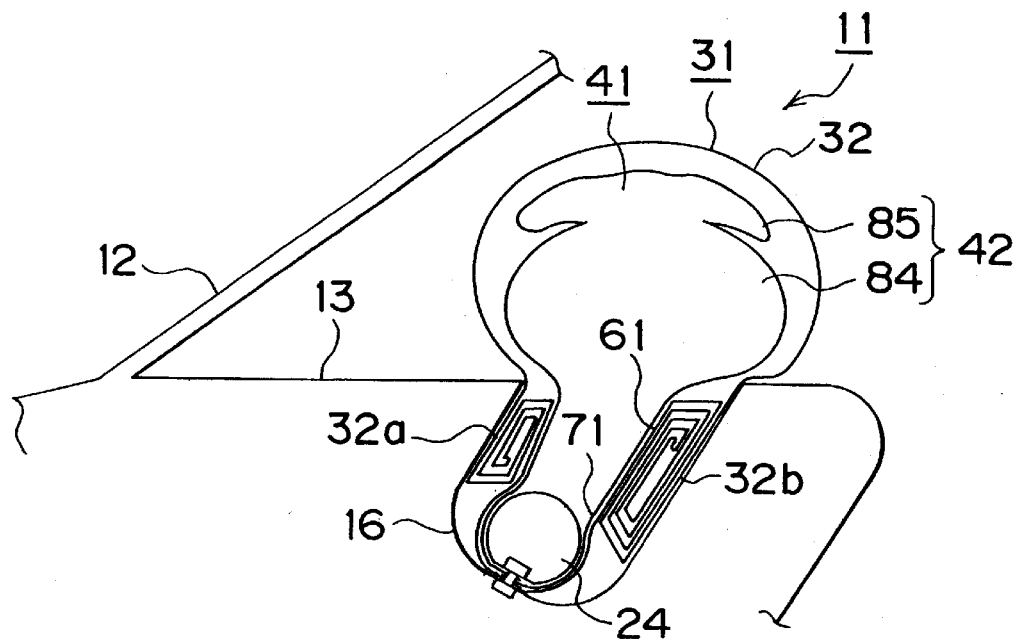
FIG. 55 is a schematic sectional view of the air bag apparatus in an early state of deployment.
Figure 56:
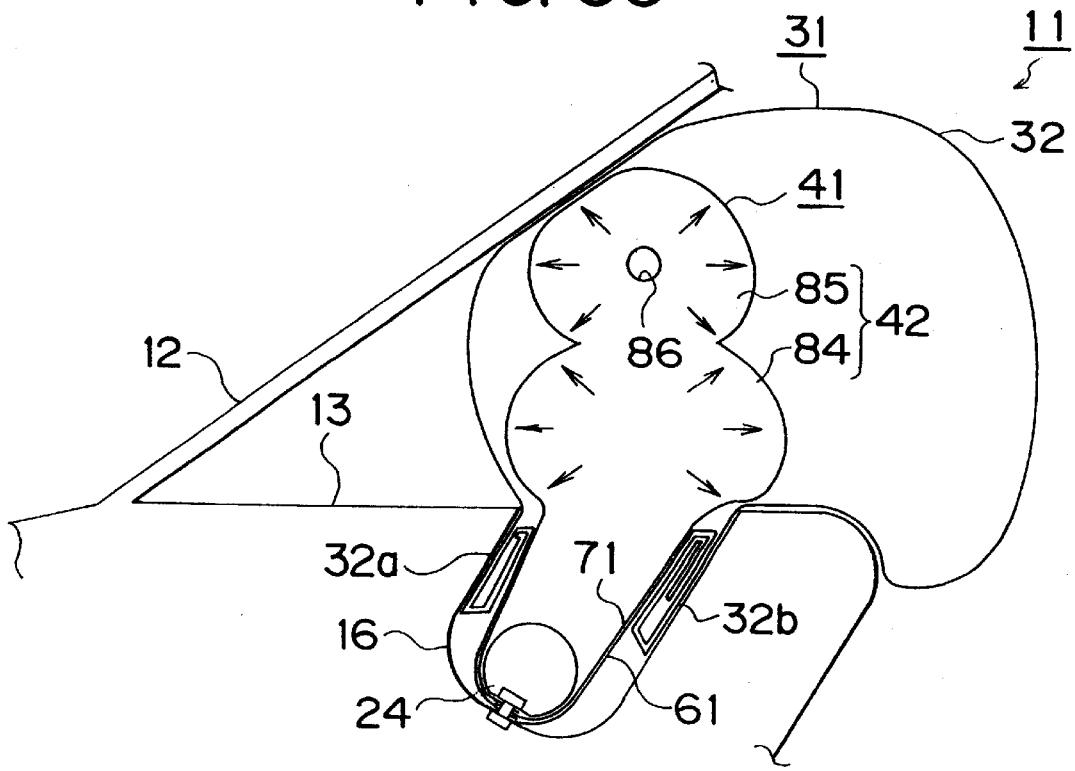
FIG. 56 is a schematic sectional view of the air bag apparatus that has been deployed to a state that follows the state shown in FIG. 55.

When gas is produced from the inflator 18 of the passenger seat-side air bag apparatus 11 of this embodiment, the first inflating portion 84 of the bag 42 of the inner bag 41 is first inflated and deployed as shown in FIG. 55 and, subsequently, the second inflating portion 85 is inflated and deployed as shown in FIG. 56. As the deployment of the inner bag 41 approaches completion, gas is supplied into the air bag 31 through the communication holes 86 of the second inflating portion 85 and, therefore, the air bag 31 starts to be deployed.

When the inflating deployment of the inner bag 41 approaches completion, the second inflating portion 85 presses a portion of the air bag 31 against the front windshield 12 and, on the other hand, the first inflating portion 84 presses a portion of the air bag 31 against the instrument panel 13.

As more gas is introduced into the bag 32 of the air bag 31 through the communication holes 86 of the inner bag 41, the bag 32 of the air bag 31 is inflated and deployed toward an occupant. In this process, the bag 32 of the air bag 31 is deployed dragging between the bag 42 of the inner bag 41 and the front windshield 12 and between the bag 42 and the instrument panel 13, so that sliding resistance occurs therebetween, significantly reducing the deploying speed of the forward portion 32a and the rearward portion 32b of the bag 32.

Figure 57:
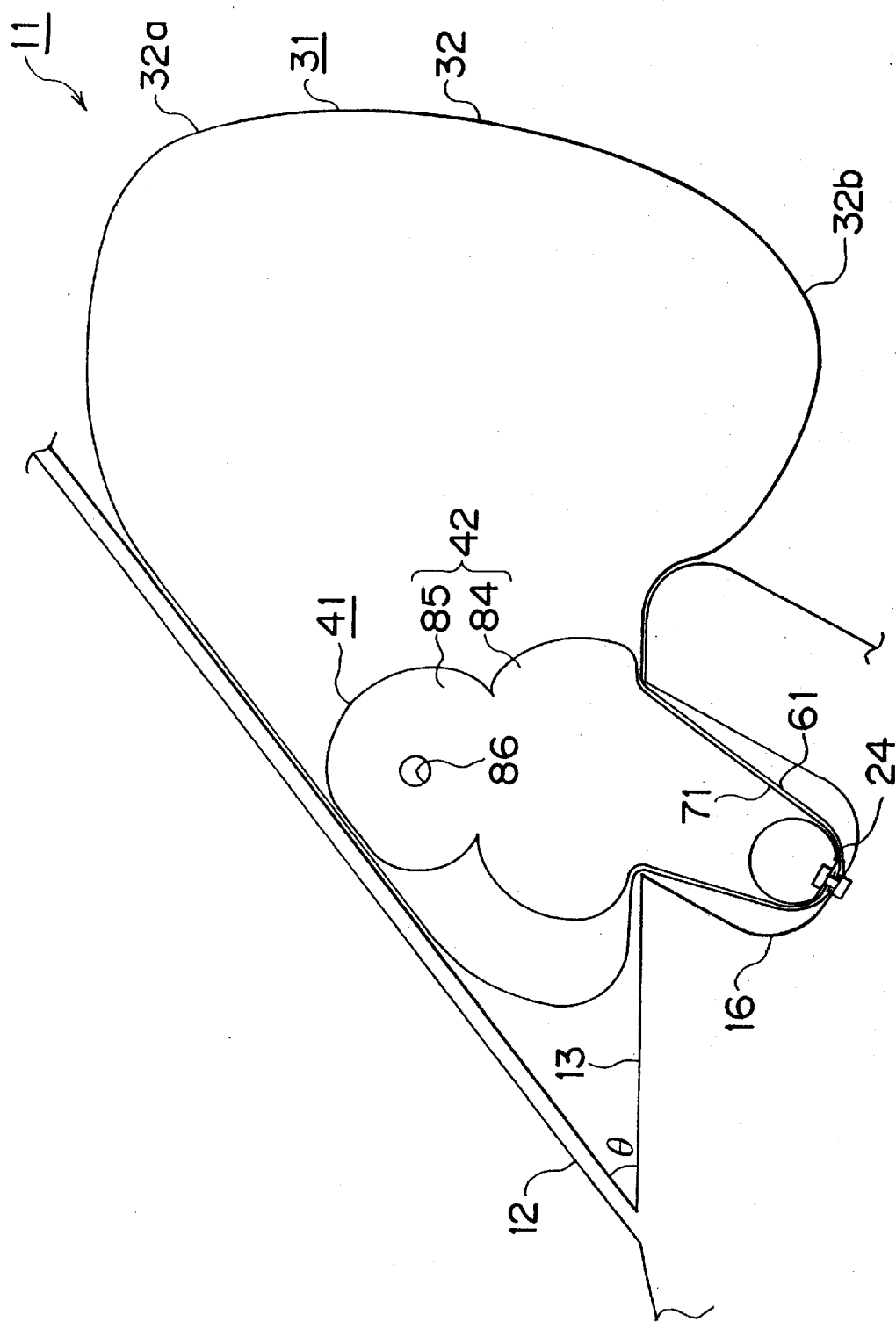
FIG. 57 is a schematic sectional view of the air bag apparatus in a deploying state that follows the state shown in FIG. 56.

Furthermore, since the bag 42 of the inner bag 41 has a gourd-like sectional shape formed by the ellipsoidal first and second inflating portions 84, 85, the bag 42 is unlikely to collapse while gas is being supplied into the air bag 31 through the communication holes 86 of the bag 42. More specifically, the bag 42 receives tension from gas therein in directions as indicated by arrows in FIG. 56, so that the tensions on the first and second inflating portions 84, 85 repel each other at a constricted portion therebetween and therefore resist collapse in vertical directions. Consequently, the bag 42 of the inner bag 41 continues pressing portions of the bag 32 of the air bag 31 against the front windshield 12 and the instrument panel 13 until the bag 32 of the air bag 31 is completely inflated and deployed as shown in FIG. 57. Therefore, the deploying speed of the air bag 31 is further effectively reduced. Moreover, since the first inflating portion 84 is larger than the second inflating portion 85, the first inflating portion 84 makes a firm base so that the bag 42 remains substantially fixed in position thereby allowing stable inflation and deployment.

Therefore, in addition to substantially the same advantages as achieved by the second embodiment, the eighth embodiment further achieves the following advantages.

The bag 42 of the inner bag 41 resists collapsing after the inflation and deployment there has been completed. Therefore, the bag 32 of the air bag 31 is dragged between the bag 42 of the inner bag 41 and the front windshield 12 and between the bag 42 and the instrument panel 13 during substantially the entire period from the start to the completion of the inflating deployment of the bag 32. Consequently, the passenger seat-side air bag apparatus 11 of this embodiment further effectively reduces the deploying speed of the air bag 31, and substantially prevents strong contact of the air bag 31 with an occupant even if the occupant comes into contact with the air bag 31 before it is completely deployed.

The bag 42 of the inner bag 41 has a gourd-like sectional shape formed by the arrangement of the upper and lower ellipsoidal inflating portions 84, 85, thereby achieving an increased vertical dimension. The increased vertical length of the bag 42 ensures that bag 42 will be pressed against the front windshield 12 even if the front windshield 12 is far apart from the instrument panel 13, that is, if the slope angle θ of the front windshield 12 as indicated in FIG. 57 is great. Therefore, the passenger seat-side air bag apparatus 11 of this embodiment reliably reduces the deploying speed of the air bag 31 even when applied to a vehicle type in which the slope angle θ of the front windshield 12 is great so that the front windshield 12 stands nearly vertical.

Since the first inflating portion 84 of the bag 42 of the inner bag 41 is larger than the second inflating portion 85, the bag 42 will be stably inflated and deployed so that sliding resistance will be reliably applied to the air bag 31.

The eighth embodiment may be modified as follows.

Although in the eighth embodiment, the first inflating portion 84 is larger than the second inflating portion 85, the first inflating portion 84 may be as large as the second inflating portion 85. Further, the second inflating portion 85 may be larger than the first inflating portion 84.

Although in the foregoing embodiment, the inner bag 41 has a gourd-like sectional shape formed by the upper and lower inflating portions, the inner bag 41 may also be formed by three or more inflating portions arranged vertically.

Ninth Embodiment

A ninth embodiment of the invention will be described with reference to FIGS. 58–61.

Figure 58:
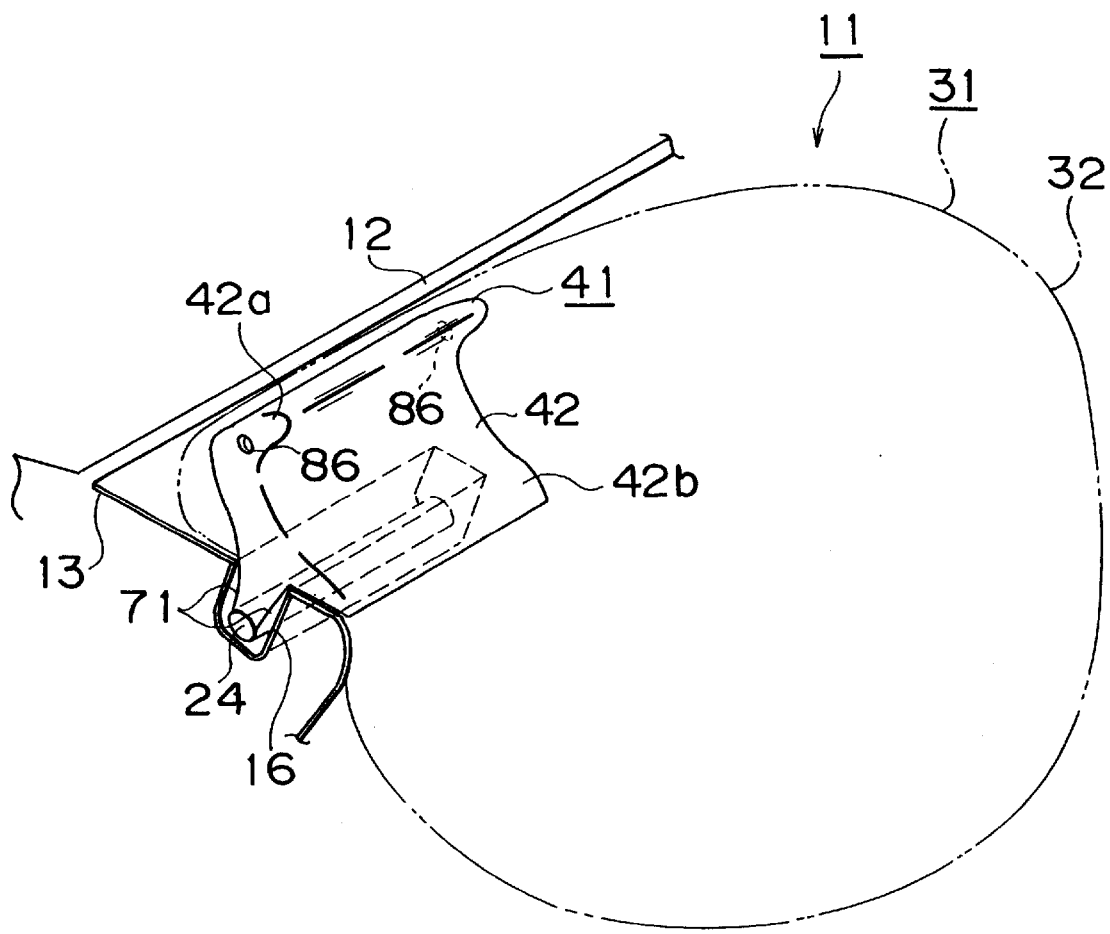
FIG. 58 is a perspective view of an air bag apparatus for a passenger seat according to a ninth embodiment of the invention, wherein the air bag is being deployed.
Figure 59:
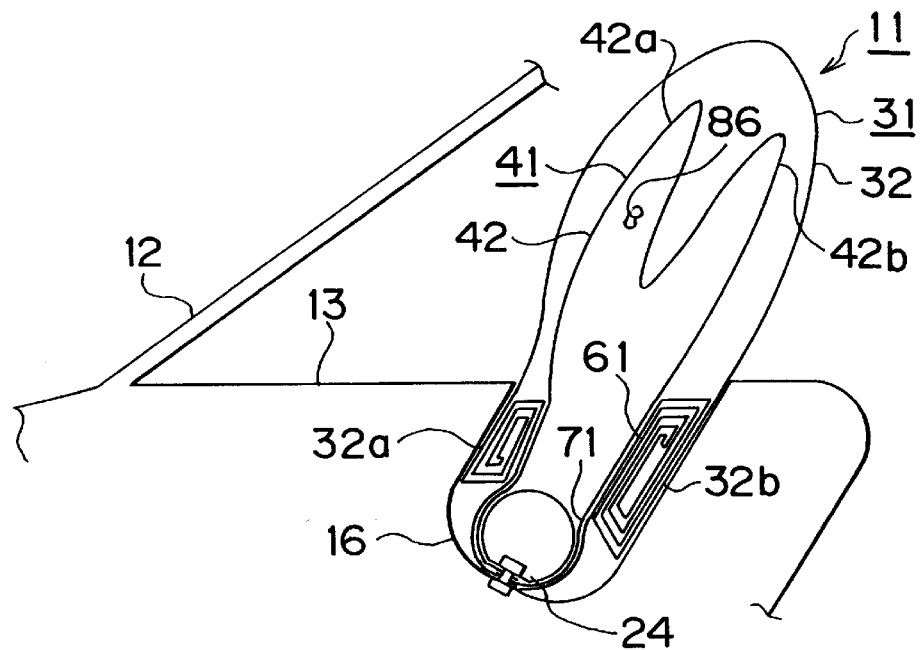
FIG. 59 is a schematic sectional view of the air bag apparatus in an early state of deployment.
Figure 60:
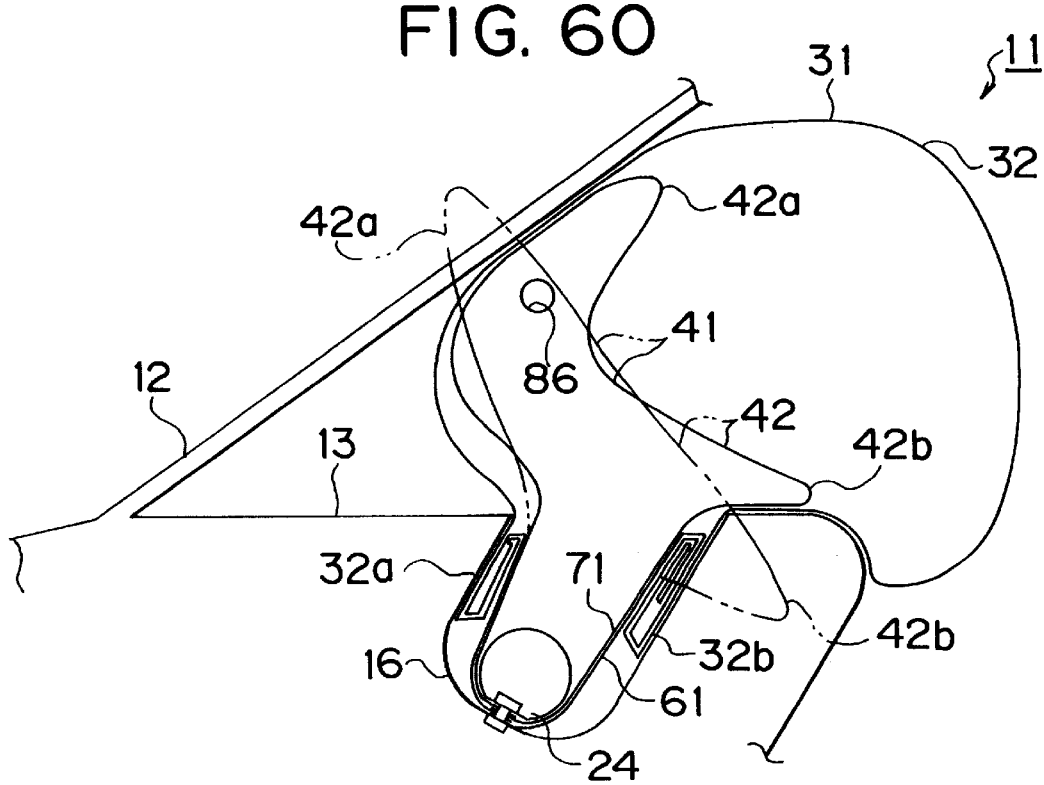
FIG. 60 is a schematic sectional view of the air bag apparatus in a deploying state that follows the state shown in FIG. 59.
Figure 61:
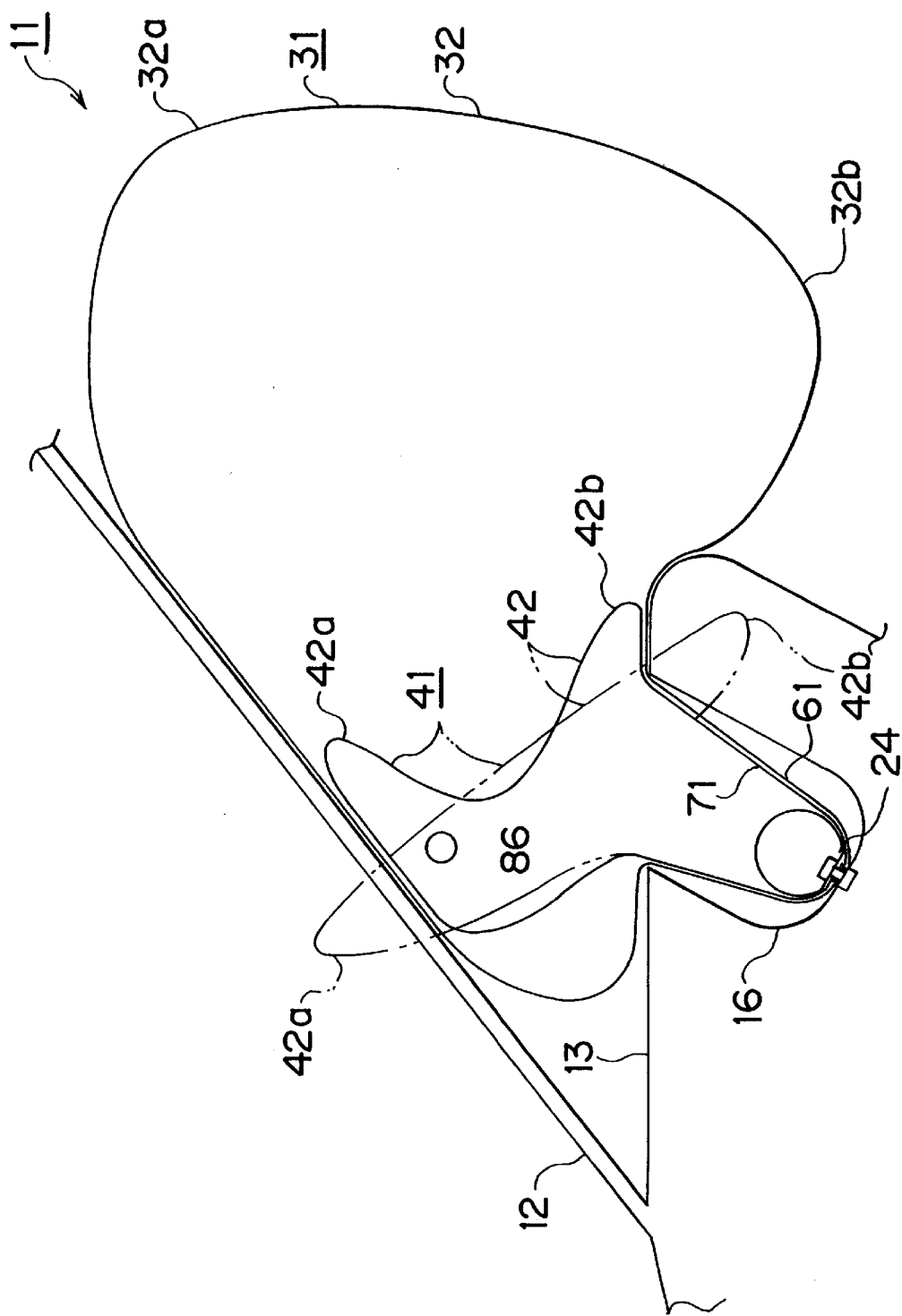
FIG. 61 is a schematic sectional view of the air bag apparatus in a deploying state that follows the state shown n FIG. 60.

In the ninth embodiment, the bag 42 of the inner bag 41 is formed so as to be inflated into a vertically elongated shape as indicated by a two-dot line in FIGS. 60 and 61 if it is not restricted. An upper portion 42a of the bag 42 has in transversely opposite portions thereof communication holes 86 for supplying gas into the air bag 31. The bag 42 is designed so that the distance between the upper and lower portions 42a and 42b is greater than the distance between the front windshield 12 and the instrument panel 13 measured at the position of deployment of the bag 42. Therefore, the actual shape of the bag 42 when deployed is a generally crescent shape in which the upper portion 42a and the lower portion 42b are curved along the front windshield 12 and the instrument panel 13, respectively, as shown in FIGS. 58, 60 and 61.

The inner bag 41 formed in this manner is disposed in the air bag 31. The inner bag 41 and the air bag 31 are fixed in the case 16 and folded therein as in the second embodiment.

When gas is produced from the inflator 18 of the passenger seat-side air bag apparatus 11 of this embodiment, the inner bag 41 is inflated in such a manner that the upper portion 42a and the lower portion 42b of the bag 42 protrude from the upper surface of the instrument panel 13, as shown in FIG. 60. As the deployment of the inner bag 41 approaches completion, gas is supplied from the bag 42 into the air bag 31 through the communication holes 86 so that the air bag 31 starts to be deployed. Therefore, in the passenger seat-side air bag apparatus 11 of this embodiment, the inner bag 41 is first inflated and, subsequently, the air bag 31 is deployed, as in the second embodiment.

When the inflating deployment of the inner bag 41 is substantially completed, the upper portion 42a of the bag 42 presses a portion of the air bag 31 against the front windshield 12, and the lower portion 42b presses a portion of the air bag 31 against the instrument panel 13.

When more gas is introduced into the bag 32 of the air bag 31 through the communication holes 86 from the inner bag 41 in a completely deployed state, the bag 32 of the air bag 31 becomes inflated and deployed toward an occupant side. In this process, the bag 32 of the air bag 31 is deployed dragging between the bag 42 of the inner bag 41 and the front windshield 12 and between the bag 42 and the instrument panel 13, so that sliding resistance occurs thereby significantly reducing the deploying speed of the forward portion 32a and the rearward portion 32b of the bag 32 of the air bag 31. Furthermore, since the bag 42 of the inner bag 41 tends to extend into a non-restricted deployment shape as indicated by the two-dot line in FIGS. 60 and 61, the force of the upper portion 42a and the lower portion 42b pressing against the front windshield 12 and the instrument panel 13, respectively, increases thereby further increasing the sliding friction between the upper and lower portions 42a, 42b and the bag 32 of the air bag 31. Therefore, the deploying speed of the bag 32 of the air bag 31 is further effectively reduced.

Therefore, in addition to substantially the same advantages as achieved by the second embodiment, the ninth embodiment further achieves the following advantages.

Since the bag 42 of the inner bag 41 is vertically elongated, the sliding friction between the upper and lower portions 42a, 42b of the bag 42 and the bag 32 of the air bag 31 is increased so that the deploying speed of the bag 32 can be further effectively reduced. Therefore, the ninth embodiment substantially prevents strong contact of the air bag 31 with an occupant even if the occupant comes into contact with the air bag 31 before it is completely deployed.

Furthermore, since the bag 42 of the inner bag 41 has a simple shape that is vertically elongated, the production of the bag 42 becomes easy and, therefore, production efficiency can be improved.

Tenth Embodiment

A tenth embodiment of the invention will be described with reference to FIGS. 62–64.

Figure 62:
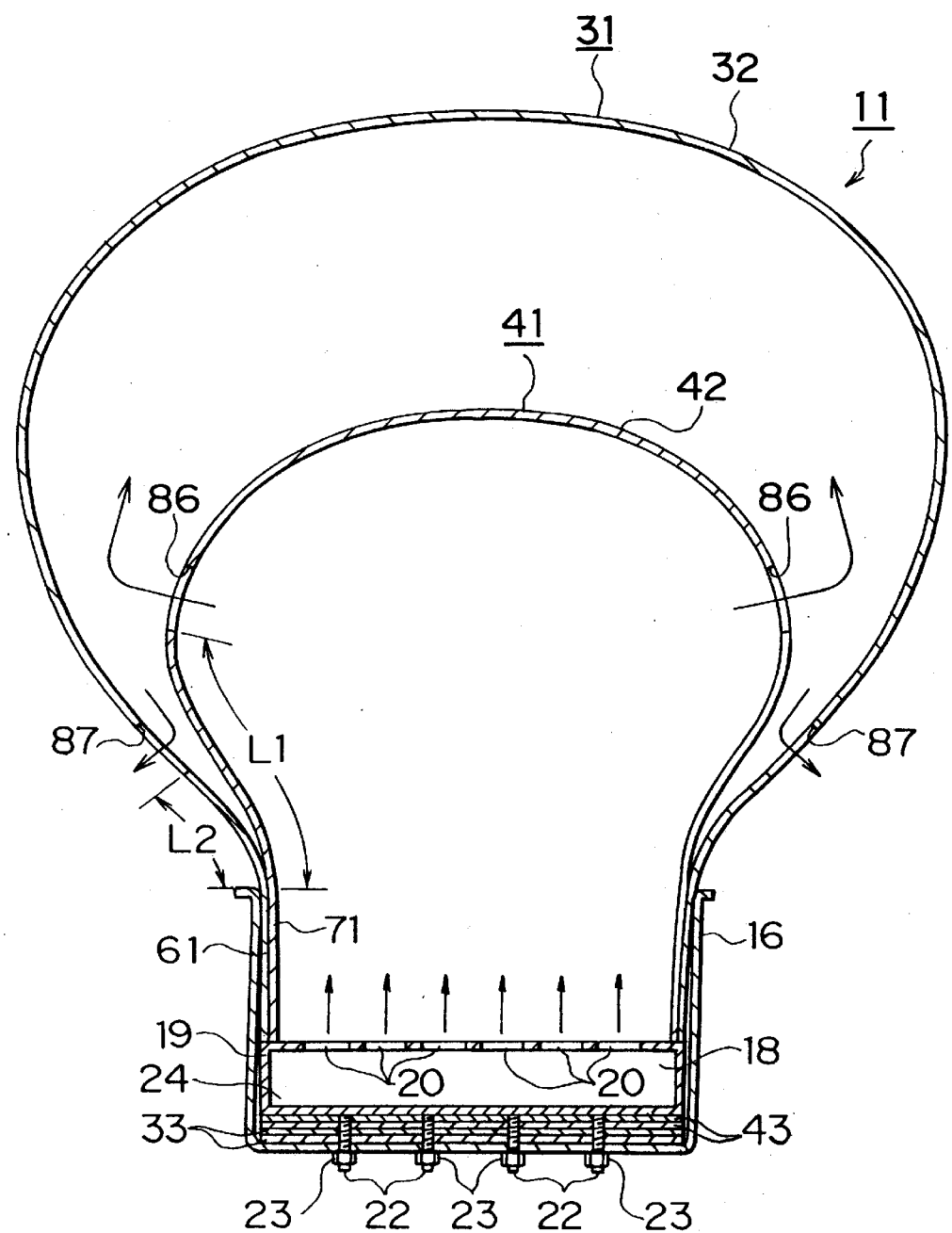
FIG. 62 is a horizontal sectional view of an air bag apparatus for a passenger seat according to a tenth embodiment of the invention.

In the tenth embodiment, the bag 42 of the inner bag 41 has a generally circular sectional shape as shown in FIG. 62. The bag 42 has in transversely opposite side portions thereof a pair of communication holes 86 for supplying gas into the air bag 31. The communication holes 86 are formed at positions that are a distance L1 apart from the opening end of the case 16 when the inner bag 41 is deployed. The bag 32 of the air bag 31 has in transversely opposite side portions thereof a pair of outlet openings 87 for letting gas out of the air bag 31. The outlet openings 87 are formed at positions that are a distance L2 apart from the opening end of the case 16 when the air bag 31 is deployed. The positional relationship between the communication holes 86 and the outlet openings 87 are set such that the distance L1 is greater than the distance L2.

The inner bag 41, having the above-described construction, is inserted into the air bag 31. The inner bag 41 and the air bag 31 are fixed and folded in the case 16 as in the second embodiment. In the folded state in the case 16 as shown in FIG. 63, the communication holes 86 of the inner bag 41 are aligned to the outlet openings 87 of the air bag 31, and peripheral edges the holes are sewed to each other with breakable threads (tear seam) 88.

Figure 63:
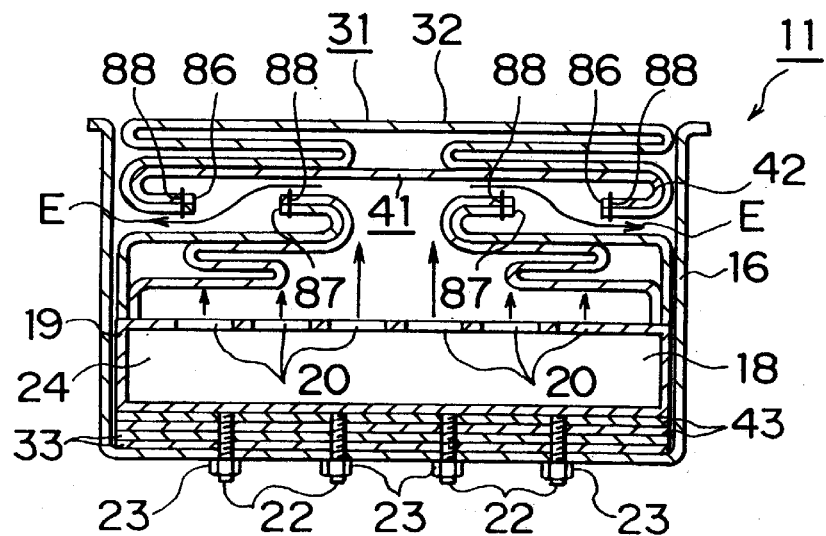
FIG. 63 is a horizontal sectional view of an air bag of the air bag apparatus, wherein the air bag is folded and housed in the case.
Figure 64:
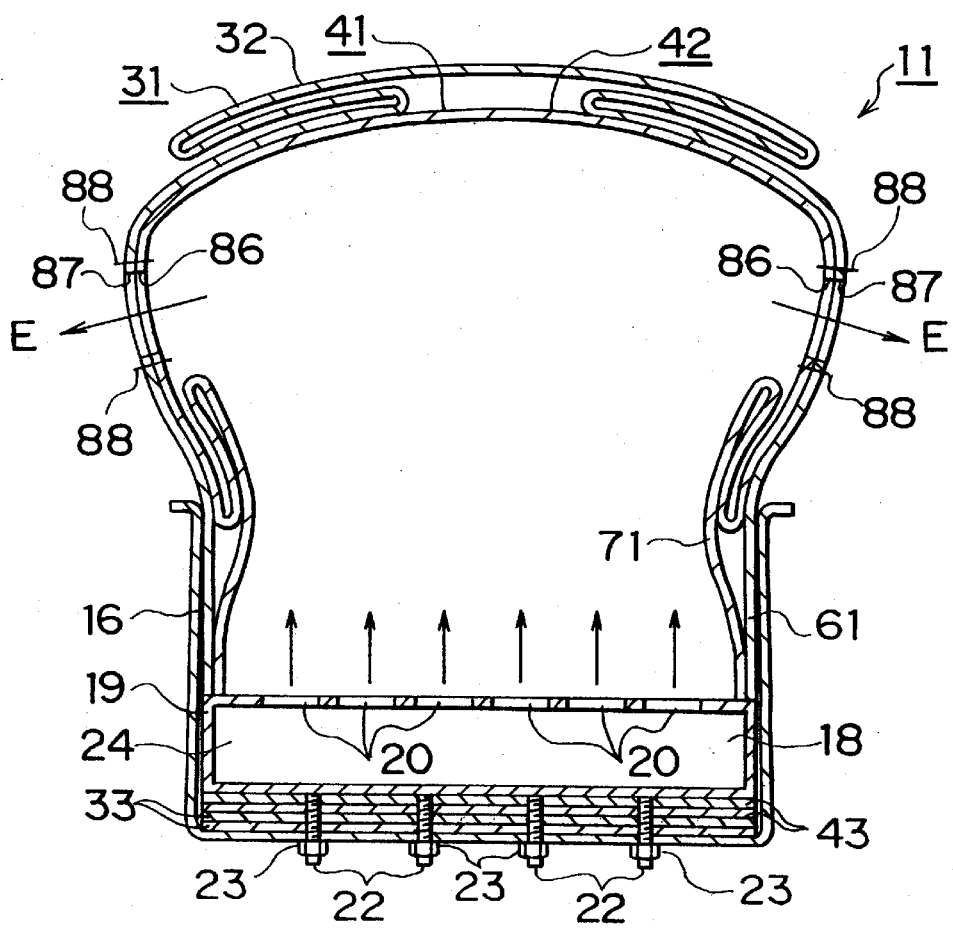
FIG. 64 is a horizontal sectional view of the air bag apparatus in an early state of deployment.

When gas is produced in the gas generator 24 of the passenger seat-side air bag apparatus 11 of this embodiment, gas flows out from the gas ejecting openings 20 of the diffuser 19, through the mouth portion 71 of the inner bag 41, into the bag 42 of the inner bag 41 as indicated in FIG. 63, thereby inflating and deploying the inner bag 41. After being introduced into the inner bag 41, gas flows out through the communication holes 86 and the outlet openings 87 as indicated by arrows E in FIGS. 63 and 64. The gas pressure inside the inner bag 41 is thereby reduced, and the deploying speed thereof is also reduced.

The positions of the communication holes 86 of the inner bag 41 are different from the positions of the outlet openings 87 of the air bag 31 as described above, that is, the distance L1 of the communication holes 86 from the opening end of the case 16 is greater than the distance L2 of the outlet openings 87 from the opening end of the case 16. Therefore, the inner bag 41 is not completely deployed while the communication holes 86 and outlet openings 87 are aligned with each other. More specifically, the inner bag 41 can be further inflated by gas pressure therein even after the inner bag 41 has reached a maximum deployment limit that is allowed while the communication holes 86 and outlet openings 87 are aligned, because there still is a plenty of slack between the communication holes 86 and the mounting portion 43 as shown in FIG. 64. When the deploying force on the inner bag 41 exceeds the strength of the tear seams 88 joining the peripheral edges of the communication holes 86 and outlet openings 87, the tear seams 88 break thereby allowing the holes communication holes 86 and outlet holes 87 to shift from each other. As a result, gas starts to flow into the air bag 31, thereby inflating and deploying the air bag 31.

The shape of side faces of the inner bag 41 is substantially the same as in the ninth embodiment, so that when inflated and deployed, the inner bag 41 presses portions of the air bag 31 against the front windshield 12 and the instrument panel 13. Therefore, the inner bag 41 of the tenth embodiment also produces sliding friction against the air bag 31 during the inflating deployment.

Consequently, in addition to substantially the same advantages as achieved by the ninth embodiment, the tenth embodiment further achieves the following advantages.

This embodiment allows gas to flow out of the inner bag 41 during an early period of the deployment of the inner bag 41, thereby reducing the gas pressure inside the inner bag 41 and the deploying speed of the inner bag 41. Even if an occupant comes into contact with the inner bag 41 in such an early deployment period, strong contact of the inner bag 41 with the occupant can be prevented.

Furthermore, if an occupant contacts the air bag 31 thereby pressing the inner bag 41 in such an early period, gas is allowed to flow out through the outlet openings 87. Therefore, if an occupant comes into contact with the air bag 31, the embodiment effectively controls rebound of the inner bag 41 that may force the occupant rearward.

Since the breaking pressure on the tear seams 88 can be adjusted based on the strength thereof or the like, the embodiment makes it possible to adjust the deploying speed of the inner bag 41 and the air bag 31 without requiring a complicated arrangement.

It is also possible to adjust the restraining force on an occupant by changing the diameter of the outlet openings 87.

Eleventh Embodiment

An eleventh embodiment of the invention will be described with reference to FIGS. 65–67.

Figure 65:
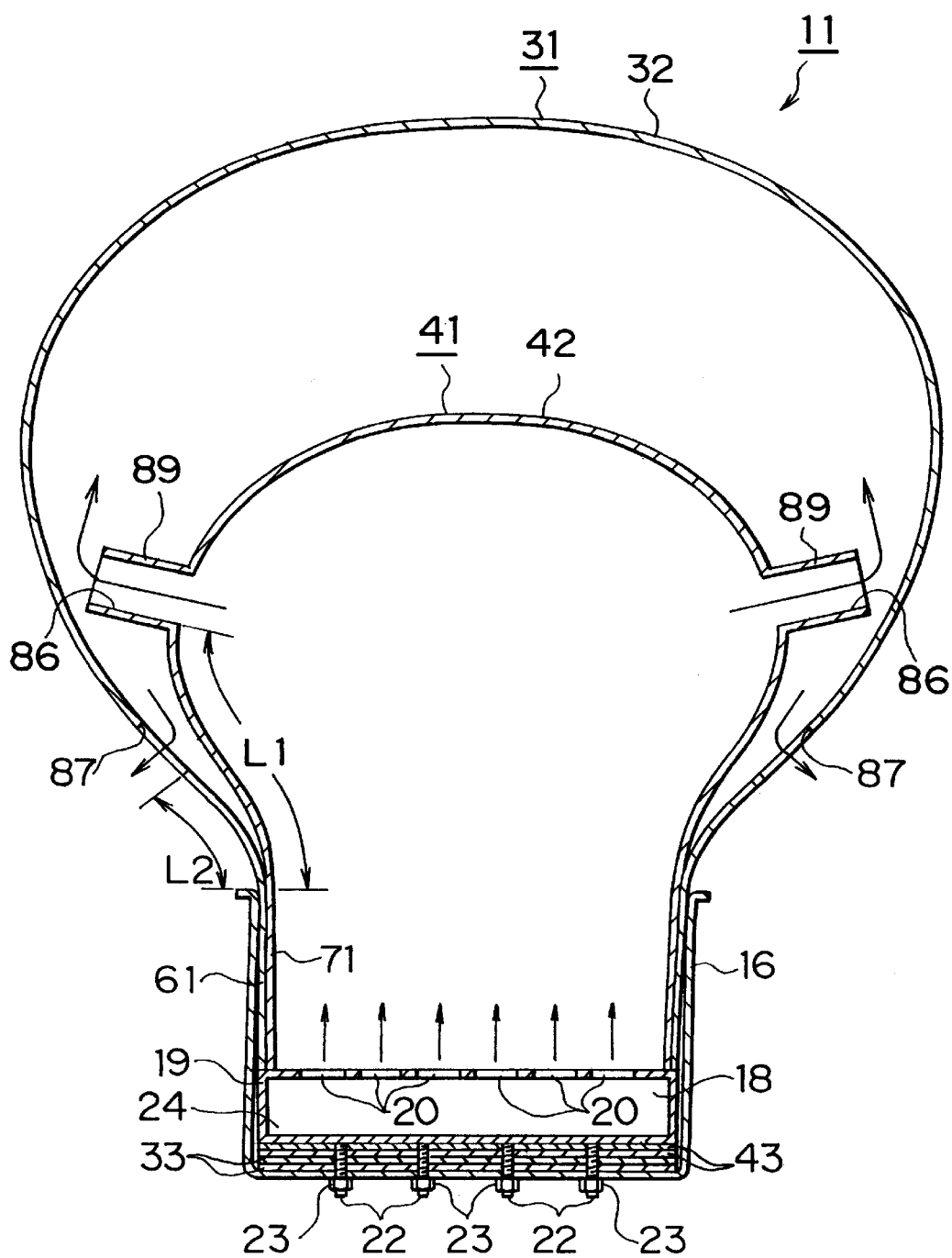
FIG. 65 is a horizontal sectional view of an air bag apparatus for a passenger seat according to an eleventh embodiment of the invention.
Figure 66:
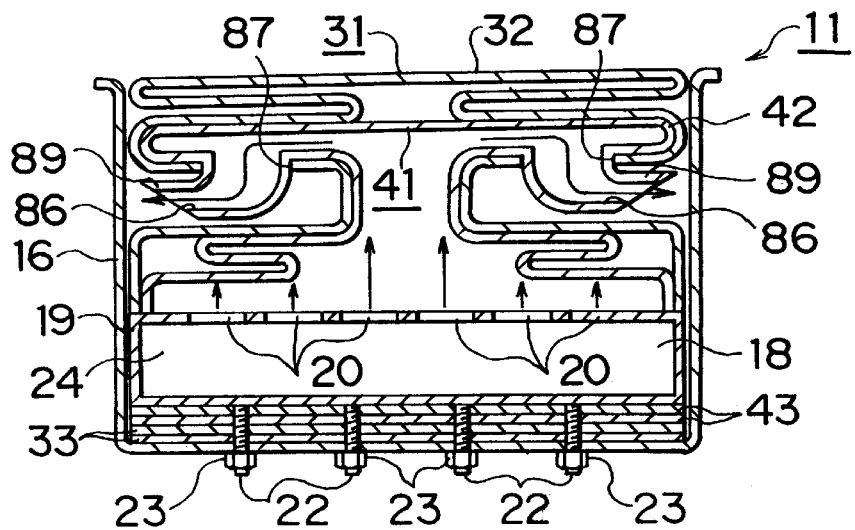
FIG. 66 is a horizontal sectional view of an air bag of the air bag apparatus, wherein the air bag is folded and housed in the case.

In the eleventh embodiment, each of communication holes 86 formed in the inner bag 41 in substantially the same manner as in the tenth embodiment is provided with a duct 89 as shown in FIG. 65.

The inner bag 41, having the construction described above, is inserted into the air bag 31. The inner bag 41 and the air bag 31 are fixed and folded in the case 16 in substantially the same manner as in the tenth embodiment. The ducts 89 are inserted through the outlet openings 87 of the air bag 31 in the folding process, so that the ducts 89 extends out of the air bag 31 in the folded state in the case 16 as shown in FIG. 66. That is, the communication holes 86 and outlet openings 87 are aligned to each other as in the tenth embodiment.

When gas is generated in the gas generator 24 of the passenger seat-side air bag apparatus 11 of this embodiment, gas flows out from the gas ejecting openings 20 of the diffuser 19, through the mouth portion 71 of the inner bag 41, into the bag 42 of the inner bag 41, thereby inflating and deploying the inner bag 41 substantially in the same manner as in the tenth embodiment.

Figure 67:
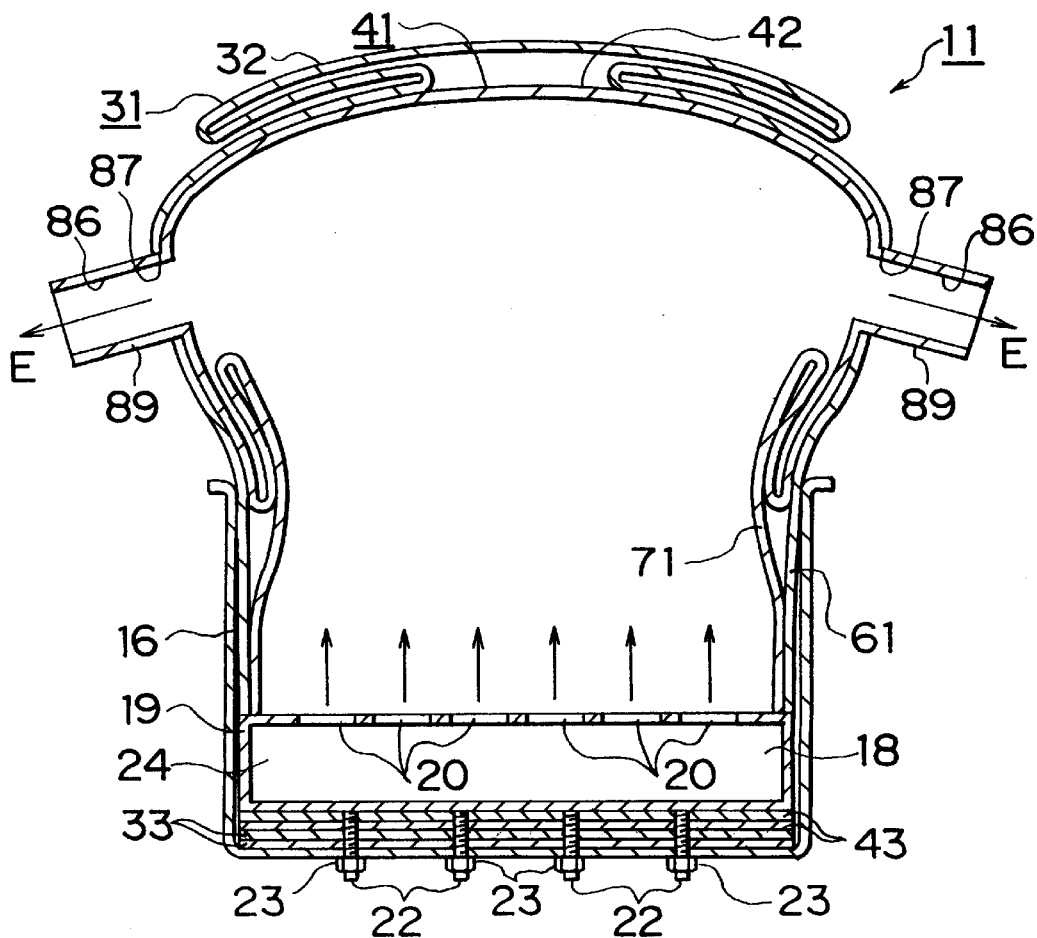
FIG. 67 is a horizontal sectional view of the air bag apparatus in an early state of deployment.

After the inner bag 41 reaches a maximum deployment limit that is allowed while the communication holes 86 and outlet openings 87 are aligned to each other as shown in FIG. 67, the ducts 89 are drawn out of the outlet holes 87 of the air bag 31 as the inner bag 41 is further deployed to a final deployment shape. Therefore, as shown in FIG. 65, the ducts 89 become located inside the air bag 31 so that gas is supplied from the inner bag 41 into the air bag 31 to inflate and deploy the air bag 31.

Therefore, in addition to substantially the same advantages as achieved by the tenth embodiment, the eleventh embodiment further achieves the following advantages.

Since there is no need to sew the peripheral edges of the communication holes 86 of the inner bag 41 to the peripheral edges of the corresponding outlet openings 87 of the air bag 31, the production efficiency of the passenger seat-side air bag apparatus 11 can be improved.

The timing of the start of gas supply into the air bag 31 can be adjusted by adjusting the length of the ducts 89. Therefore, the embodiment makes it possible to adjust the deploying speeds of the inner bag 41 and the air bag 31 while requiring less complicated construction.

Twelfth Embodiment

A twelfth embodiment of the invention will be described with reference to FIGS. 68–69.

Figure 68:
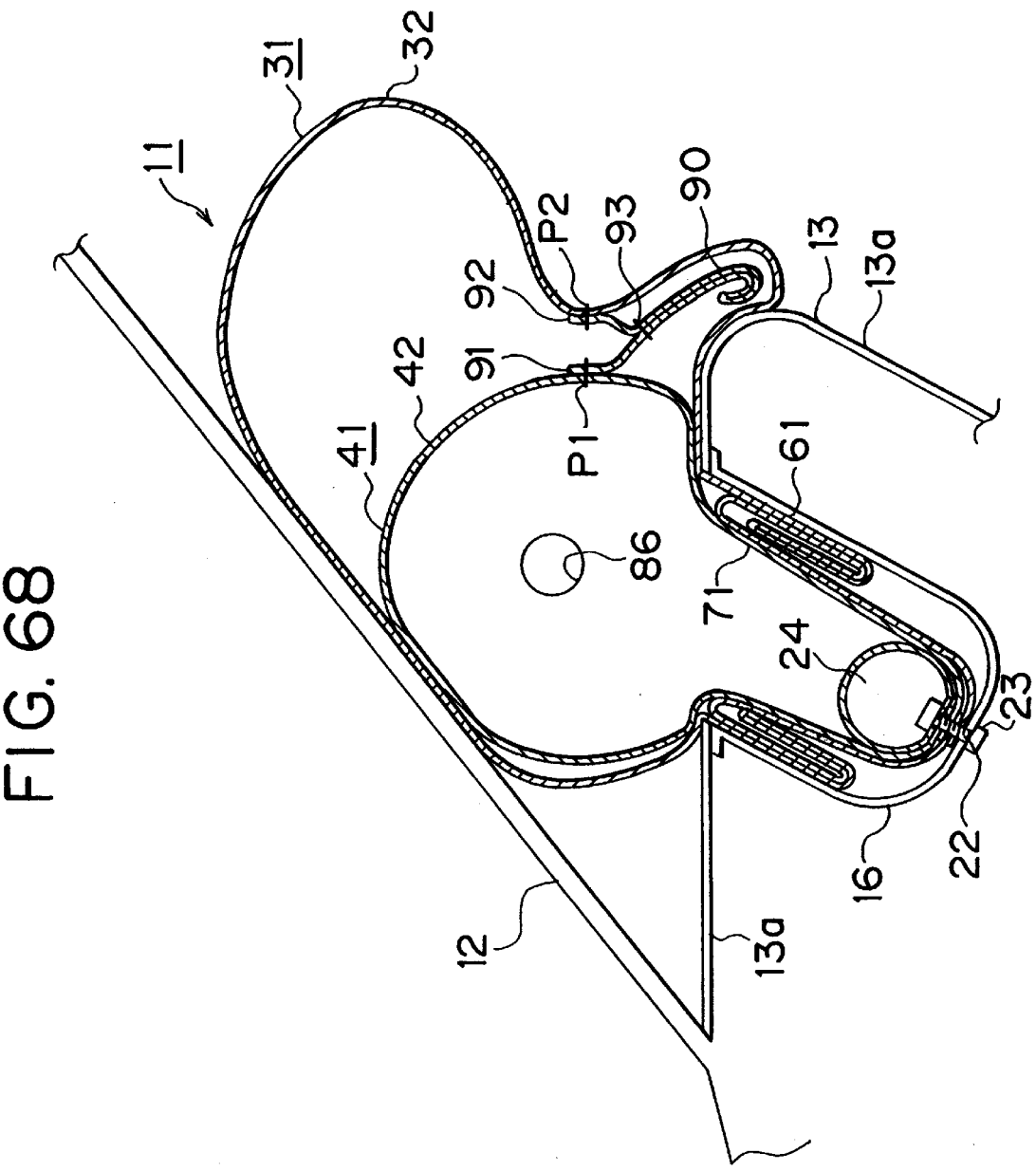
FIG. 68 is a schematic sectional view of a air bag apparatus for a passenger seat according to a twelfth embodiment of the invention, taken along a plane extending in the fore-to-aft directions relative to the vehicle.
Figure 69:
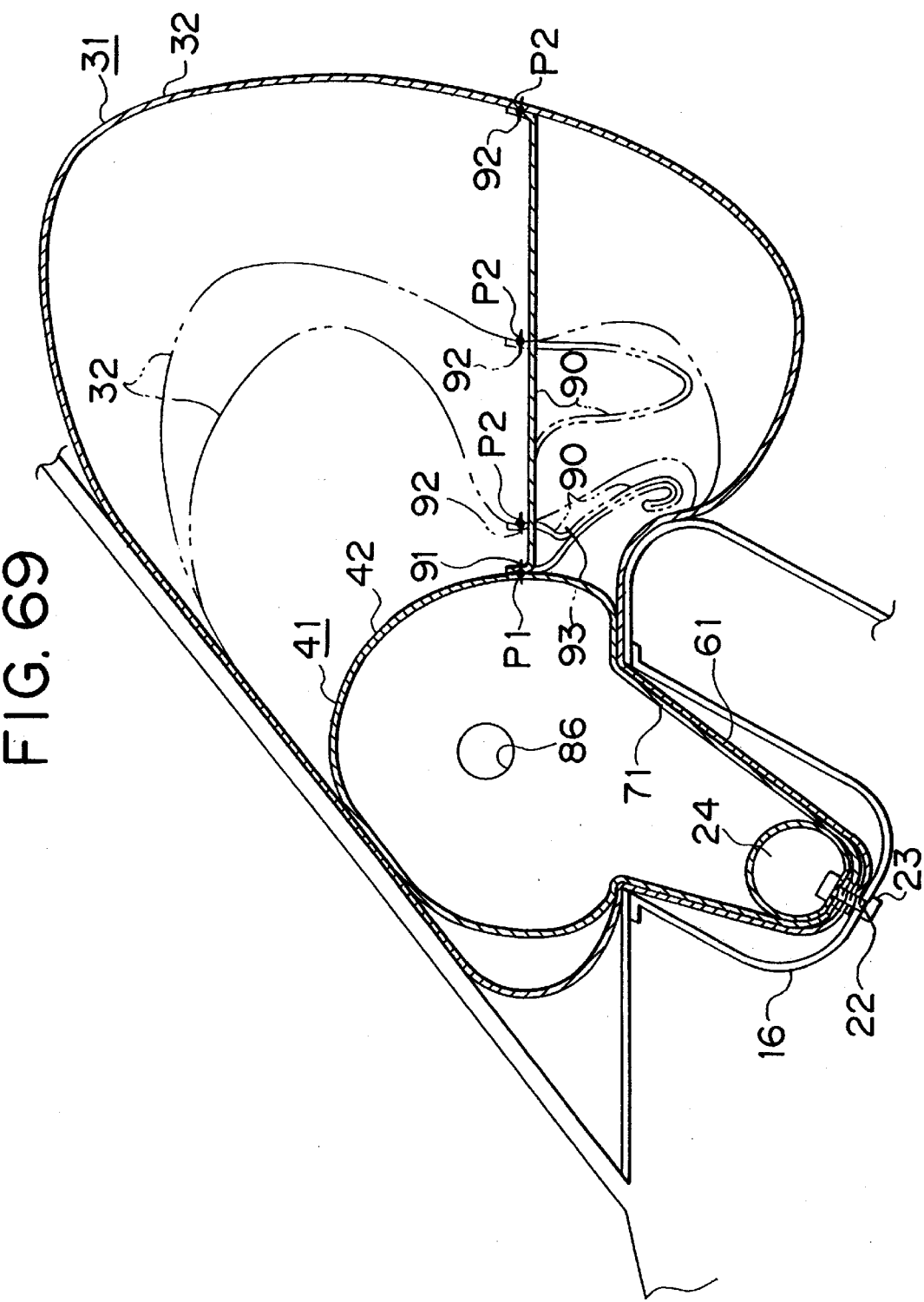
FIG. 69 is a sectional view illustrating a deployment completed state of the apparatus.

In this embodiment, the bag 42 of the inner bag 41 has a generally circular sectional shape as shown in FIGS. 68 and 69. The bag 42 has in transversely opposite side portions thereof a pair of communication holes 86 (only one hole is shown in FIGS. 68 and 69). The bag 32 of the air bag 31 and the bag 42 of the inner bag 41 are interconnected by a strap (restriction member) 90 having a cord shape. One of the strap 90 is sewed to an occupant-side end portion P1 of the bag 42 of the inner bag 41 by a thread 91 (the occupant-side end portion P1 comes substantially nearest to an occupant in the inner bag 41 when the inner bag 41 is completely deployed). The other end of the strap 90 is sewed, by a thread 92, to an occupant-contacting portion P2 of the bag 32 of the air bag 31 that is located on a horizontal straight line passing through the occupant-side end portion P1 of the inner bag 41 when the bags are deployed as shown in FIG. 69. The length of the strap 90 is substantially equal to the distance between the occupant-side end portion P1 and the occupant-contacting portion P2 in the deployed state. The strap 90 is folded into two and the two sections are sewed together with a breakable thread (tear seam) 93 at an appropriate position as clearly shown in FIG. 68, so that the length of the strap 90 is correspondingly reduced.

The air bag 31 and the inner bag 41, having the construction described above, are fixed and folded in the case 16 in substantially the same manner as in the second embodiment.

When gas is produced from the inflator 18 of the passenger seat-side air bag apparatus 11 of this embodiment, gas is guided into the inner bag 41, thereby inflating and deploying the inner bag 41. Gas is also supplied from the inner bag 41 into the air bag 31 to inflate and deploy the air bag 31. During an early period of the deployment of the air bag 31, the deployment of the bag 32 of the air bag 31 is restricted by the strap 90 up to a position close to the occupant-side end portion P1 of the bag 42 of the inner bag 41 as indicated in FIGS. 68 and 69. The deploying speed of the air bag 31 toward an occupant side is thereby reduced during an early period of the deployment.

Subsequently, as the gas pressure inside the air bag 31 increases, the tear seam 93 of the strap 90 breaks so that the strap 90 is allowed to extend straight. When the air bag 31 is further deployed to a predetermined amount, the strap 90 becomes taut as shown in FIG. 69, thereby restricting the deployment of the occupant-contacting portion P2 of the bag 32.

As the gas pressure inside the air bag 31 further increases, the air bag 31 is inflated and deployed to a final shape while being restricted by the strap 90. Thus, the deployment of the air bag 31 toward the occupant side is restricted by the strap 90 during early and intermediate periods of the deployment as shown in FIGS. 68 and 69, so that the deploying speed of the air bag 31 is effectively reduced. Furthermore, the strap 90 also restricts the direction of the deployment of the air bag 31 so that the occupant-contacting portion P2 of the bag 32 of the air bag 31 moves substantially horizontally during the deployment. Thus, the air bag 31 is stably inflated and deployed.

Therefore, the twelfth embodiment achieves the following advantages.

Since the strap 90 restricts the deployment of the air bag 31 toward the occupant side, this embodiment reduces the deploying speed of the air bag 31 and substantially prevents strong contact of the air bag 31 with an occupant even if the occupant comes into contact with the air bag 31 before it is completely deployed.

Since the strap 90 also causes the occupant-contacting portion P2 of the bag 32 to move substantially horizontally during the deployment, the air bag 31 is stably inflated and deployed. Therefore, even if an occupant comes into contact with the air bag 31 before it is completely deployed, it is possible to prevent the rubbing between the occupant and the air bag 31.

The breaking pressure can be adjusted based on the manner of stitch of the tear seam 93 (lock stitch, chain stitch and the like), the strength of the thread, and the like. Furthermore, the positions at which deployment of the air bag 31 is restricted can be adjusted based on the length of the strap 90. Therefore, the embodiment makes it possible to adjust the deploying speeds of the inner bag 41 and the air bag 31 and to adjust the occupant restraining performance without requiring a complicated construction.

The twelfth embodiment may be modified as follows.

Although in the twelfth embodiment, the strap 90 are used to interconnect the sites in the inner bag 41 and the air bag 31 that come closest to an occupant when the inflating deployment is completed, it is also possible to directly sew those sites together with a tear seam instead of using the strap 90. This modification makes it possible to reduce the deploying speed of the air bag 31 while employing a simpler construction. Furthermore, since the deploying speed of the air bag 31 is restricted by the restriction member during an early period of the deployment, the air bag 31 can be stably inflated and deployed.

The strap 90 may be reduced in length and may be sewed at both or one of the two ends thereof to the inner bag 41 and/or the air bag 31 with a tear seam. This modification reduces the deploying speed of the air bag 31, and restricts the deploying direction of the air bag 31 during early and intermediate periods of the deployment so that the air bag will be stably inflated and deployed.

Other Embodiments

Further possible embodiments according to the invention will be described with reference to FIGS. 70–74. The constructions described below employ modified manners of folding the forward portion 32a and the rearward portion 32b of the bag 32 of the air bag 31. In these modified constructions, it is also possible to achieve substantially the same advantages as achieved by the foregoing embodiments. The constructions shown in FIGS. 70–74 are modifications to the second through twelfth embodiments.

Figure 70:
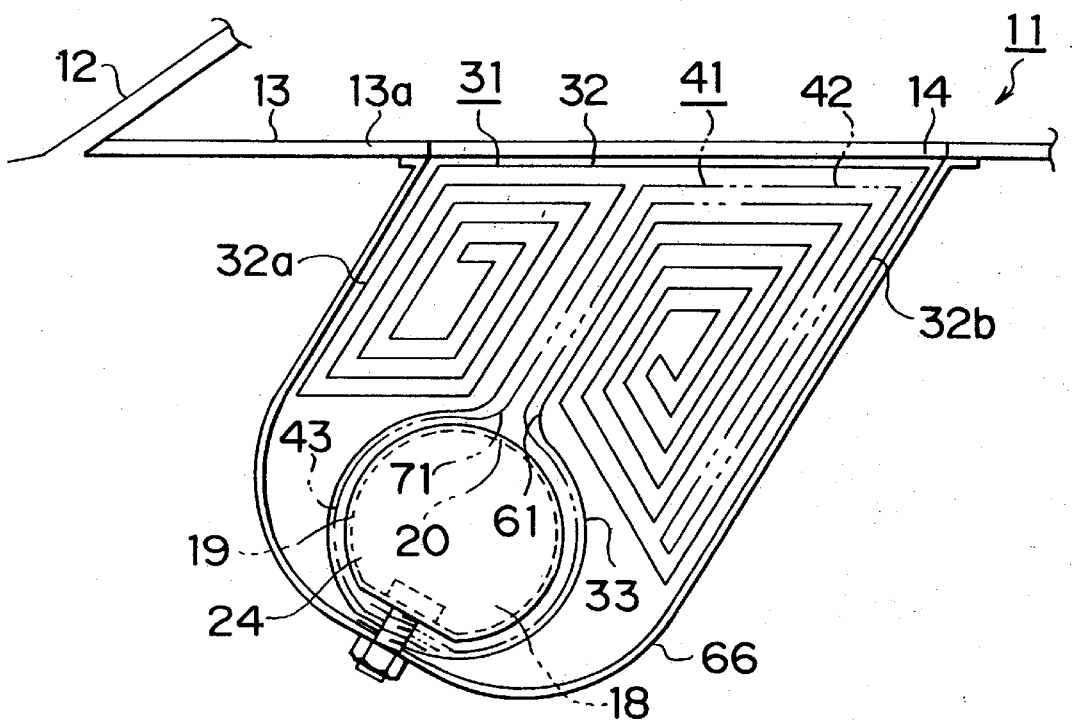
FIG. 70 is a schematic sectional view of an air bag apparatus according to a construction of the second through twelfth embodiments, taken along a fore-to-aft extending plane.

In the construction shown in FIG. 70, the inner bag 41 is folded into the rearward portion 32b of the air bag 31. The rearward portion 32b of the bag 32 is folded into generally the shape of a squared roll by rolling it clockwise in a view from the left side of the vehicle. The forward portion 32a is folded into generally the shape of a squared roll by rolling it counterclockwise in a view from the left side of the vehicle.

Figure 71:
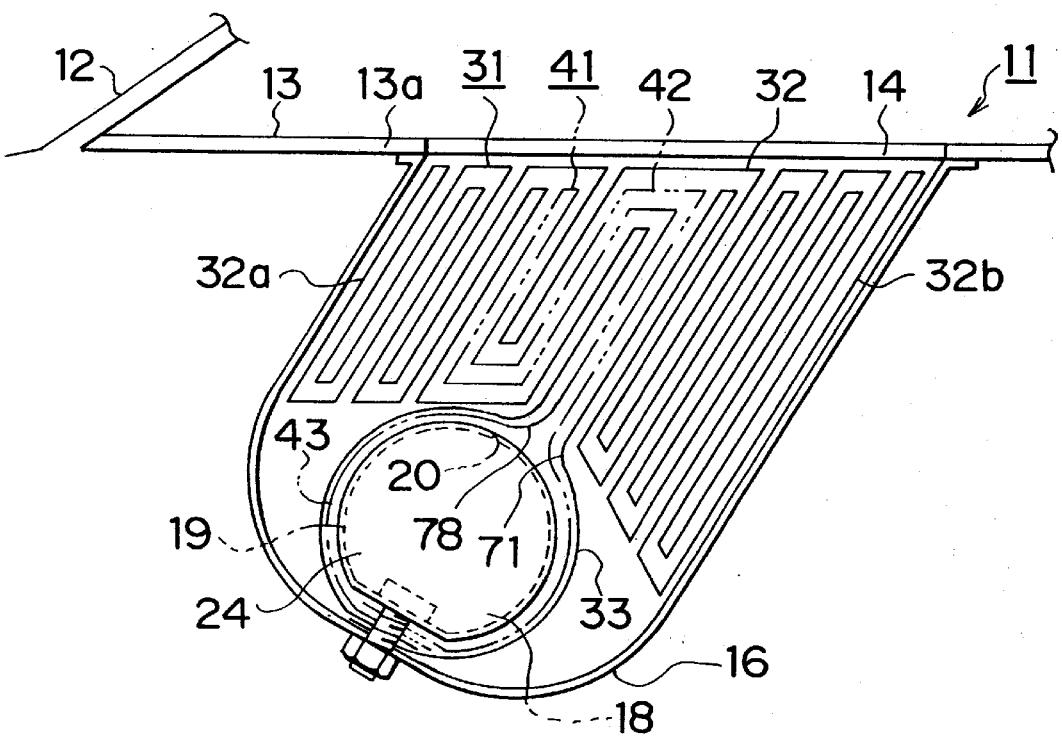
FIG. 71 is a schematic sectional view of an air bag apparatus according to another construction of the second through twelfth embodiments, taken along a fore-to-aft extending plane.

In the construction shown in FIG. 71, the inner bag 41 is folded into the forward portion 32a of the bag 32 of the air bag 31. The forward portion 32a and the rearward portion 32b of the bag 32 are folded separately into accordion folds.

Figure 72:
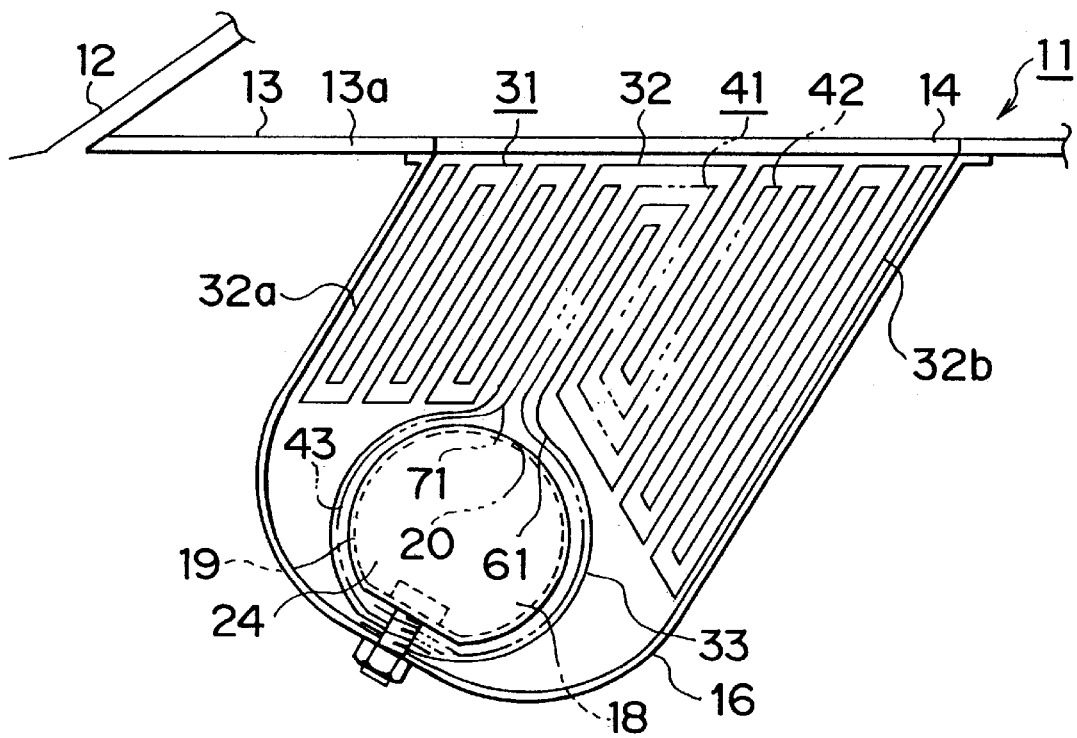
FIG. 72 is a schematic sectional view of an air bag apparatus according to still another construction of the second through twelfth embodiments, taken along a fore-to-aft extending plane.

In the construction shown in FIG. 72, the inner bag 41 is folded into the rearward portion 32b of the bag 32 of the air bag 31, conversely to the construction shown in FIG. 71. The forward portion 32a and the rearward portion 32b of the bag 32 are folded separately into accordion folds.

Figure 73:
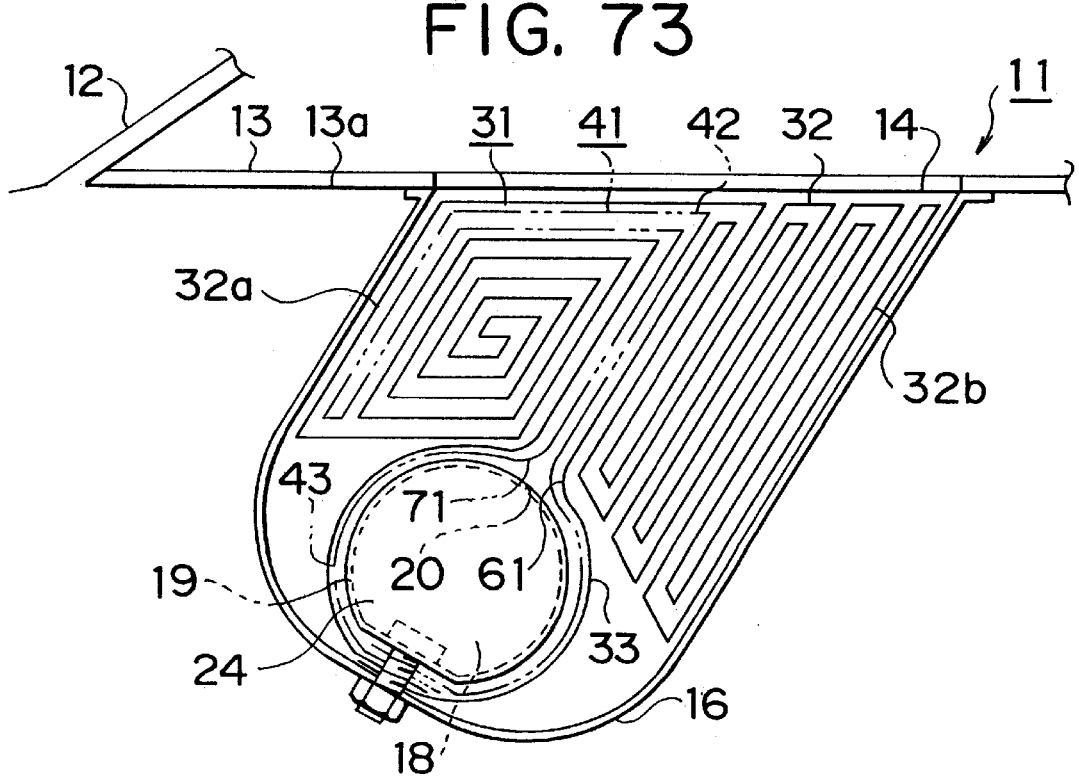
FIG. 73 is a schematic sectional view of an air bag apparatus according to a further construction of the second through twelfth embodiments, taken along a fore-to-aft extending plane.

In the construction shown in FIG. 73, the inner bag 41 is folded into the forward portion 32a of the bag 32 of the air bag 31. The forward portion 32a of the bag 32 is folded into generally the shape of a squared roll by rolling it counterclockwise in a view from the left side of the vehicle. The rearward portion 32b is folded into accordion folds.

Figure 74:
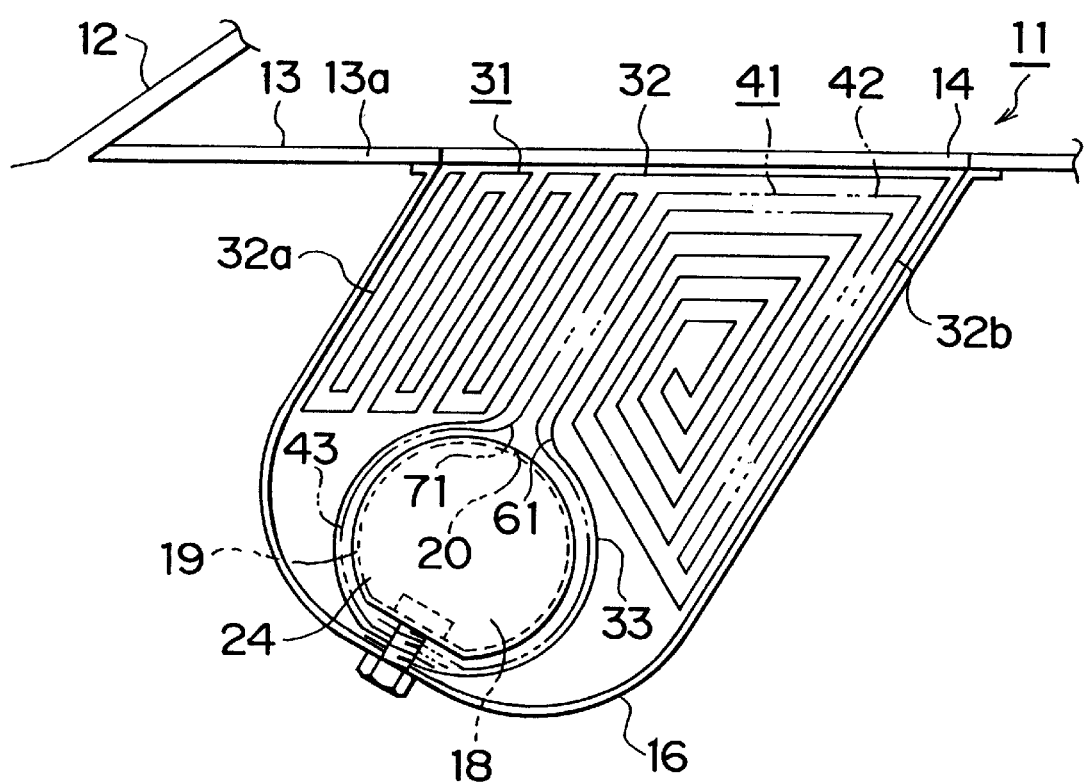
FIG. 74 is a schematic sectional view of an air bag apparatus according to an alternative construction of the second through twelfth embodiments, taken along a fore-to-aft extending plane.

In the construction shown in FIG. 74, the inner bag 41 is folded into the rearward portion 32b of the bag 32 of the air bag 31, conversely to the construction shown in FIG. 73. The rearward portion 32b of the bag 32 is folded into generally the shape of a squared roll by rolling it clockwise in a view from the left side of the vehicle. The forward portion 32a is folded into accordion folds.

The first through twelfth embodiments and the other embodiments may be modified as follows.

The shape of the case 16, the position of the inflator 18 in the case 16, and the manner of folding the air bag 31 and the inner bag 41 into the case 16 in the second through twelfth embodiments may be changed to substantially the same as those in the first embodiment.

The shape of the case 16, the position of the inflator 18 in the case 16, and the manner of folding the air bag 31 and the inner bag 41 into the case 16 in the first embodiment may be changed to substantially the same as those in the second through twelfth embodiments.

The auxiliary inner bag 46 disposed on the bag 42 of the inner bag 41 in the first embodiment may also be provided on the bag 42 in the second through twelfth embodiments. This modification ensures that the rearward portion 32b of the bag 32 of the air bag 31 will be sandwiched between the auxiliary inner bag 46 and the instrument panel 13. Therefore, it becomes possible to more reliably prevent the rearward portion 32b of the bag 32 from being deployed toward the occupant side during an early period of the deployment.

The constructions and portions in the foregoing embodiments may be suitably combined. For example, the strap 90 in the twelfth embodiment may be provided between the inner bag 41 and the air bag 31 in the construction according to any one of the first through eleventh embodiments or the other embodiments.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. An air bag apparatus for a passenger seat disposed in a passenger seat-side instrument panel, comprising:
    an air bag folded and disposed in a case having at one side thereof an opening; and
    an inner bag disposed in the air bag, the air bag and inner bag being arranged in a manner so that the inner bag is inflated prior to inflation of the air bag, the inner bag being arranged to press portions of the air bag against a front glass pane and an instrument panel when inflated.

2. An air bag apparatus for a passenger seat according to claim 1, wherein the inner bag has a supply hole for supplying gas to the air bag.

3. An air bag apparatus for a passenger seat according to claim 1, wherein the inner bag has an upper inflating portion and a lower inflating portion, and the upper inflating portion is formed so as to inflate to a greater size than the lower inflating portion.

4. An air bag apparatus for a passenger seat according to claim 1, wherein the inner bag is formed by two base cloths so that when the inner bag is inflated and deployed, the base cloths face each other in transverse directions relative to the vehicle and the inner bag is inflated and deployed in upward and downward directions relative to the vehicle.

5. An air bag apparatus for a passenger seat according to claim 1, further comprising a restriction member disposed in the inner bag, the restriction member restricting inflation of a central portion of the inner bag to a predetermined amount and defining, at least partially, two inflating portions of the inner bag.

6. An air bag apparatus for a passenger seat according to claim 5, wherein the inner bag is constituted at least in part by an upper face cloth sewed to a lower face cloth, the cloths being constructed and arranged such that the upper cloth is inflated and deployed in an upward direction relative to the vehicle and the lower cloth is inflated and deployed in a downward direction relative to vehicle.

7. An air bag apparatus for a passenger seat according to claim 6, wherein the restriction member extends from an end of at least one of the upper face cloth and the lower face cloth.

8. An air bag apparatus for a passenger seat according to claim 6, wherein the restriction member is disposed in the inner bag at a lower position therein so that an upward deploying portion of the inner bag is inflated and deployed to a greater size than a downward deploying portion of the inner bag.

9. An air bag apparatus for a passenger seat according to claim 1, constructed and arranged so that when inflated, the inner bag assumes a generally gourd shape in a side view.

10. An air bag apparatus for a passenger seat according to claim 1, constructed and arranged so that when inflated, the inner bag contacts the front glass pane and the instrument panel and curves into a generally crescent shape in a side view.

11. An air bag apparatus for a passenger seat according to claim 1, wherein the inner bag has an extension portion that extends in a rearward direction relative to the vehicle, the extension portion pressing a portion of the air bag against the instrument panel.

12. An air bag apparatus for a passenger seat according to claim 1, wherein the inner bag has a forward ejection hole for ejecting gas in a forward direction relative to the vehicle.

13. An air bag apparatus for a passenger seat according to claim 1, wherein before being disposed in the case, the air bag is folded by folding portions of the air bag that face in forward and rearward directions relative to the vehicle and then folding portions of the air bag that face in transverse directions relative to the vehicle.

14. An air bag apparatus for a passenger seat according to claim 13, wherein the inner bag is folded by folding opposite end portions thereof that face in the transverse directions relative to the vehicle while avoiding folding a central portion of the air bag relative to the case, in the transverse directions.

15. An air bag apparatus for a passenger seat according to claim 1, further comprising an inflator having a cylindrical shape and disposed so that an axis thereof extends substantially in a fore-to-aft direction relative to the vehicle.

16. An air bag apparatus for a passenger seat according to claim 15, wherein a portion of the air bag is disposed between an inner wall face of the case and right and left sides of the inflator.

17. An air bag apparatus for a passenger seat according to claim 1, further comprising an air bag cover disposed at the opening of the case, the air bag cover being openable in transverse directions relative to the vehicle in a manner of a double-hinged door.

18. An air bag apparatus for a passenger seat according to claim 1, wherein a site in the inner bag and a site in the air bag that come closest to an occupant side at the time of completion of inflation and deployment of the inner bag and the air bag are interconnected so that the sites remain interconnected during an early period of the inflation of the inner bag and the air bag, and so that the sites are disconnected from each other as the inner bag and the air bag are further inflated.

19. An air bag apparatus for a passenger seat according to claim 1, wherein a site in the inner bag and a site in the air bag that come closest to an occupant side at the time of completion of inflation and deployment of the inner bag and the air bag are interconnected a restriction member that is folded and sewed with a breakable thread so that the folded sections of the restriction member are jointed together.

20. An air bag apparatus for a passenger seat according to claim 19, wherein the interconnected sites in the inner bag and the air bag are directly sewed together using a thread that breaks when the inner bag and the air bag are inflated.

21. An air bag apparatus for a passenger seat according to claim 1, wherein the air bag is fixed to the case and a mouth portion that guides gas into the air bag, and wherein the mouth portion is disposed in a central portion of the case, and an upward deploying portion of the air bag and a downward deploying portion of the air bag are folded and disposed in a space between the mouth portion and one of opposite inner surfaces of that face the mouth portion and a space between the moth portion and the other one of the opposite inner surfaces of the case, respectively.

22. An air bag apparatus for a passenger seat disposed in a passenger seat-side instrument panel, comprising:

an air bag folded and disposed in a case having at one side thereof an opening; and an inner bag disposed in the air bag, the air bag and inner bag being arranged in a manner so that the inner bag is inflated prior to inflation of the air bag, the inner bag being arranged to press portions of the air bag against a front glass pane and an instrument panel when inflated;

wherein the inner bag is formed by two base cloths so that when the inner bag is inflated and deployed, the base cloths face each other in transverse directions relative to the vehicle and the inner bag is inflated and deployed in upward and downward directions relative to the vehicle.

* * * * *